United States Patent
Omori et al.

(10) Patent No.: US 7,856,641 B2
(45) Date of Patent: Dec. 21, 2010

(54) DISK DRIVE DEVICE AND CENTERING MEMBERS THEREFOR

(75) Inventors: Kiyoshi Omori, Tokyo (JP); Noriyoshi Ishii, Chiba (JP); Hideaki Tsutsumi, Tokyo (JP); Shigeru Tamura, Tokyo (JP); Katsunori Takahashi, Tokyo (JP); Yuji Suzuki, Kanagawa (JP); Yoichiro Mitsumoto, Tokyo (JP); Manabu Obata, Kanagawa (JP)

(73) Assignee: Sony Corporation, Tokyo (JP)

( * ) Notice: Subject to any disclaimer, the term of this patent is extended or adjusted under 35 U.S.C. 154(b) by 639 days.

(21) Appl. No.: 11/766,366

(22) Filed: Jun. 21, 2007

(65) Prior Publication Data
US 2008/0005759 A1 Jan. 3, 2008

(30) Foreign Application Priority Data
Jun. 23, 2006 (JP) ............................. 2006-174642
Jun. 23, 2006 (JP) ............................. 2006-174648

(51) Int. Cl.
*G11B 17/04* (2006.01)
(52) U.S. Cl. ...................... 720/623; 720/704; 720/626
(58) Field of Classification Search .......... 720/620–623
See application file for complete search history.

(56) References Cited
U.S. PATENT DOCUMENTS
2005/0198656 A1* 9/2005 Yamamoto et al. .......... 720/616
2005/0229193 A1* 10/2005 Omori et al. ................ 720/604
2006/0245313 A1* 11/2006 Yamada et al. ........... 369/44.11

FOREIGN PATENT DOCUMENTS

| JP | 3111157 | 9/2000 |
|---|---|---|
| JP | 2002-117604 | 4/2002 |
| JP | A 2005-85450 | 3/2005 |
| JP | 2005-100595 | 4/2005 |
| JP | 3111157 | 6/2005 |

* cited by examiner

*Primary Examiner*—Brian E Miller
*Assistant Examiner*—Adam B Dravininkas
(74) *Attorney, Agent, or Firm*—Oblon, Spivak, McClelland, Maier & Neustadt, L.L.P.

(57) ABSTRACT

A disk drive device includes a device main body in which a disk slot for inserting and removing a disk-like recording medium is provided, a disk holding unit that rotatably holds the disk-like recording medium, a main chassis that supports the disk holding unit and a base unit, an arm unit rotatably supported on one or the other side in a plane parallel to the disk-like recording medium, an urging arm that urges the disk-like recording medium, a first centering member that supports the side of the disk-like recording medium, and a second centering member that supports the side of the disk-like recording medium. The first centering member and the second centering member are regulated in positions to support the side of the disk-like recording medium. The first centering member and the second centering member support the disk-like recording medium in a centering position.

14 Claims, 48 Drawing Sheets

DISK DRIVE DEVICE AND CENTERING MEMBERS THEREFOR

CROSS-REFERENCES TO RELATED APPLICATIONS

The present invention contains subject matter related to Japanese Patent Applications JP 2006-174642 and JP 2006-174648 both filed in the Japanese Patent Office on Jun. 23, 2006, the entire contents of which being incorporated herein by reference.

BACKGROUND OF THE INVENTION

1. Field of the Invention

The present invention relates to a disk drive device that records an information signal in and/or reproduces the information signal from an optical disk, and, more particularly to a disk drive device of a so-called slot-in type in which an optical disk is automatically loaded by being directly inserted into a device main body.

2. Description of the Related Art

As optical disks, optical disks such as a CD (Compact Disk), a DVD (Digital Versatile Disk), and a BD (Blu-ray Disk) and magneto-optical disks such as an MO (Magneto Optical) and an MD (Mini Disk) have been widely known. Various disk drive devices corresponding to these disks, disk cartridges, and the like have been placed on the market.

As types of the disk drive devices, for example, there are a type for opening a lid or a door provided in a housing and directly loading a disk onto a turntable, which is seen from the lid or the door, a type for placing a disk on a disk tray that is moved horizontally into and out of a housing to automatically load the disk onto a turntable in the housing when the disk tray is drawn into the housing, and a type for directly loading a disk on a turntable provided on a disk tray. However, in all of the disk drive devices of these types, an operator needs to perform operations for opening and closing the lid or the door, moving the disk tray into and out of the housing, or loading the disk on the turntable.

On the other hand, there are disk drive devices of a so-called slot-in type in which a disk is automatically loaded on a turntable simply by being inserted from a disk slot provided on a front surface of a housing. Some of the disk drive devices of the slot-in type include a pair of guide rollers opposed to each other that hold the disk inserted from the disk slot. By rotating the pair of guide rollers in opposite directions each other, the disk drive devices perform a loading operation for drawing the disk inserted from the disk slot into the housing and an eject operation for ejecting the disk from the slot to the outside of the housing.

In mobile apparatuses such as a notebook type personal computer in which disk drive devices are mounted, a further reduction in size, weight, and thickness is demanded. According to such a demand, there is an increasing demand for a reduction in size, weight, and thickness of the disk drive devices. To meet such a demand, as a disk drive device of the slot-in type, a disk drive device is supplied in which plural rotating arms are arranged. At tips of the rotating arms, contact sections brought into contact with an outer circumference of a disk inserted from a disk slot of a front panel are provided. The rotating arms are rotatably supported at base ends thereof. The disk drive device performs, while rotating these rotating arms in a plane parallel to the disk, a loading operation for drawing the disk into a housing from the disk slot and an eject operation for ejecting the disk from the disk slot to the outside of the housing (see, for example, JP-A-2005-100595 (Patent Document 1)). Among the disk drive devices reduced in thickness in this way, as ultra-thin disk drive devices mounted on a notebook type personal computer and the like, a disk drive device having a thickness of 12.7 mm and a disk drive device further reduced in thickness to 9.5 mm equivalent to the thickness of a hard disk drive (HDD) unit have also been proposed.

In the disk drive device in which the plural rotating arms are rotatably arranged in the plane parallel to the disk, when the disk is conveyed into the housing, a base unit provided with a turntable is lifted to perform a chucking operation for the disk. Chucking of the disk is performed by holding a portion around a center hole of the disk with the turntable and a top plate of the housing and pressing an engaging protrusion of the turntable into the disk center hole.

In the chucking of the disk, when the center hole is not located substantially right above the turntable, the center hole is guided on a taper surface provided in an outer circumference of the engaging protrusion when the engaging protrusion is pressed into the center hole. In this way, a gap between the disk and the turntable is absorbed. When there is a gap between the center hole and the turntable, a large load due to the press-in of the engaging protrusion is applied to the portion around the center hole of the disk and sound caused by the press-in of the engaging protrusion increases. Therefore, a user feels unpleasant or uneasy.

SUMMARY OF THE INVENTION

Therefore, it is desirable to provide a disk drive device that inserts and ejects a disk by rotating plural rotating arms, wherein the disk drive device can realize centering to bring a center hole of the disk to substantially right above a turntable when the disk is drawn into a device main body.

According to an embodiment of the invention, there is provided a disk drive device including a device main body in which a disk slot for inserting and removing a disk-like recording medium is provided on a front surface side thereof, a disk holding unit that is provided in the device main body and rotatably holds the disk-like recording medium, a main chassis that is fixedly arranged in the device main body and supports the disk holding unit and a base unit provided with an optical pickup for recording an information signal in and/or reproducing the information signal from the disk-like recording medium, an arm unit rotatably supported on one or the other side in a plane parallel to the disk-like recording medium held by the disk holding unit in a direction orthogonal to an inserting and removing direction of the disk-like recording medium of the device main body, an urging arm that is provided at a tip of the arm unit, has a support section that supports a side of the disk-like recording medium when the disk-like recording medium is inserted, and urges the disk-like recording medium, a first centering member that is provided on the one side of the device main body and supports the side of the disk-like recording medium when the disk-like recording medium is inserted, and a second centering member that is provided on the other side in the plane parallel to the disk-like recording medium held by the disk holding unit in the direction orthogonal to the inserting and removing direction of the disk-like recording medium of the disk main body and supports the side of the disk-like recording medium. The first centering member and the second centering member are regulated in positions with respect to the main chassis to support the side of the disk-like recording medium. The first centering member and the second centering member support the disk-like recording medium in a centering position at three points around the disk holding unit in conjunction with the urging arm.

In the disk drive device according to the embodiment of the invention, when the disk-like recording medium is drawn into the device main body until the center hole is located near the disk holding unit, the first centering member is regulated to such a centering position. In the disk drive device, the second centering member is also regulated to the centering position of the disk-like recording medium. Therefore, the disk drive device according to the embodiment of the invention can surely realize centering by supporting the disk-like recording medium with the first centering member, the second centering member, and the urging arm that gives an urging force to the disk-like recording medium. Consequently, it is possible to prevent chucking sound from being caused by performing chucking in a state in which the center hole of the disk-like recording medium and the turntable of the disk holding unit deviate from each other and prevent a load on the disk-like recording medium or the disk holding unit.

DESCRIPTION OF THE PREFERRED EMBODIMENTS

Figure 1:
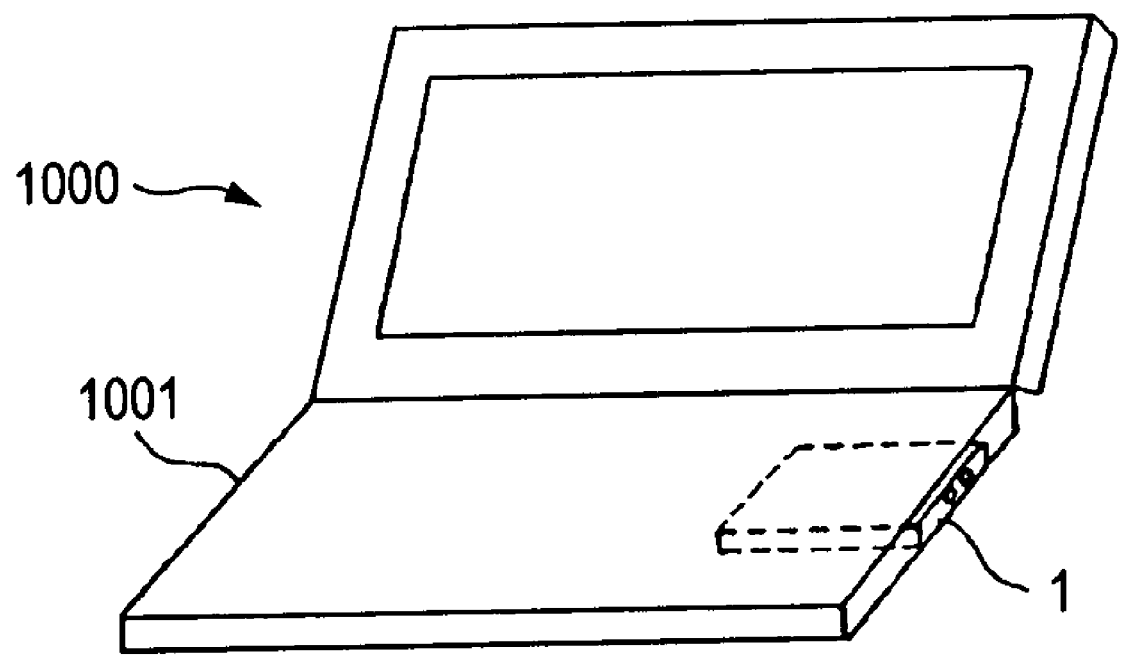
FIG. 1 is an external perspective view showing an electronic apparatus in which a disk drive device according to an embodiment of the invention is mounted.
Figure 2:
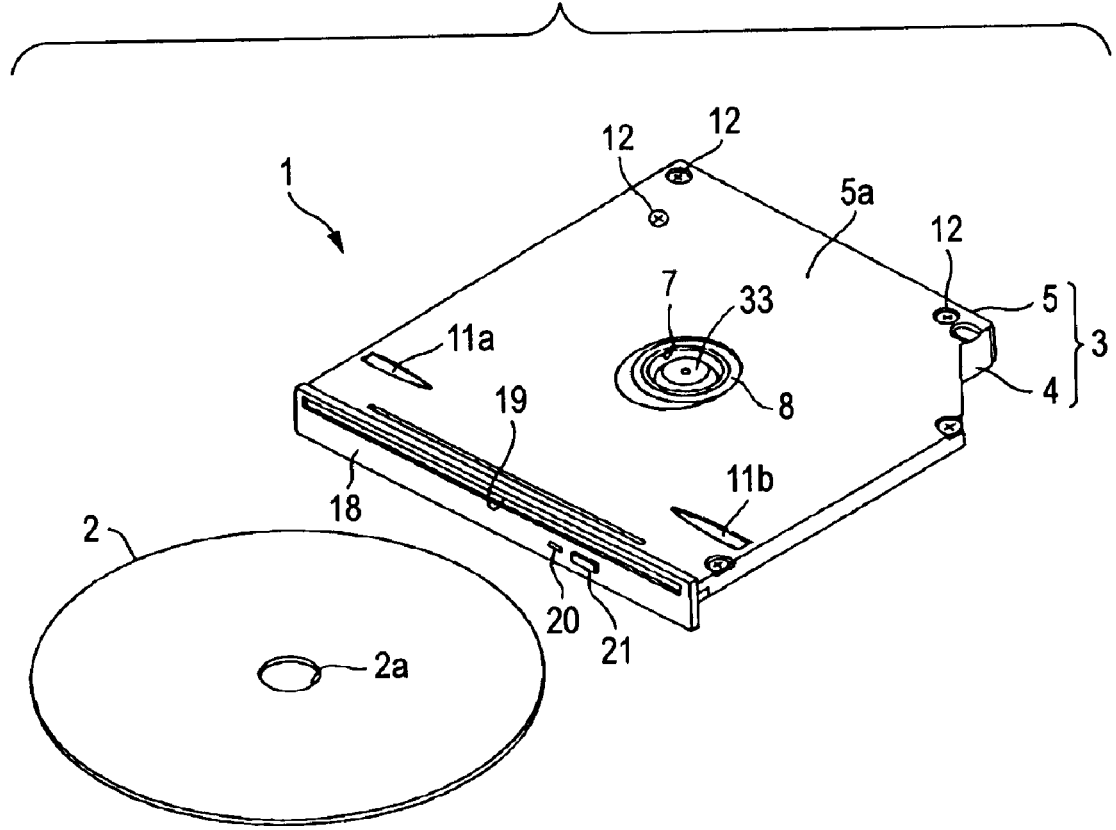
FIG. 2 is an external perspective view showing the disk drive device according to the embodiment of the invention.

A disk drive device according to an embodiment of the invention will be hereinafter explained in detail with reference to the accompanying drawings. This disk drive device is, for example, as shown in FIG. 1, a disk drive device 1 of a slot-in type mounted on a device main body 1001 of a notebook type personal computer 1000. This disk drive device 1 has, as shown in FIG. 2, a structure in which the entire device is reduced in thickness to, for example, about 12.7 mm. The disk drive device 1 is capable of recording an information signal in and reproducing the information signal from an optical disk 2 such as a CD (Compact Disk), a DVD (Digital Versatile Disk), or a BD (Blu-ray Disc).

Figure 3:
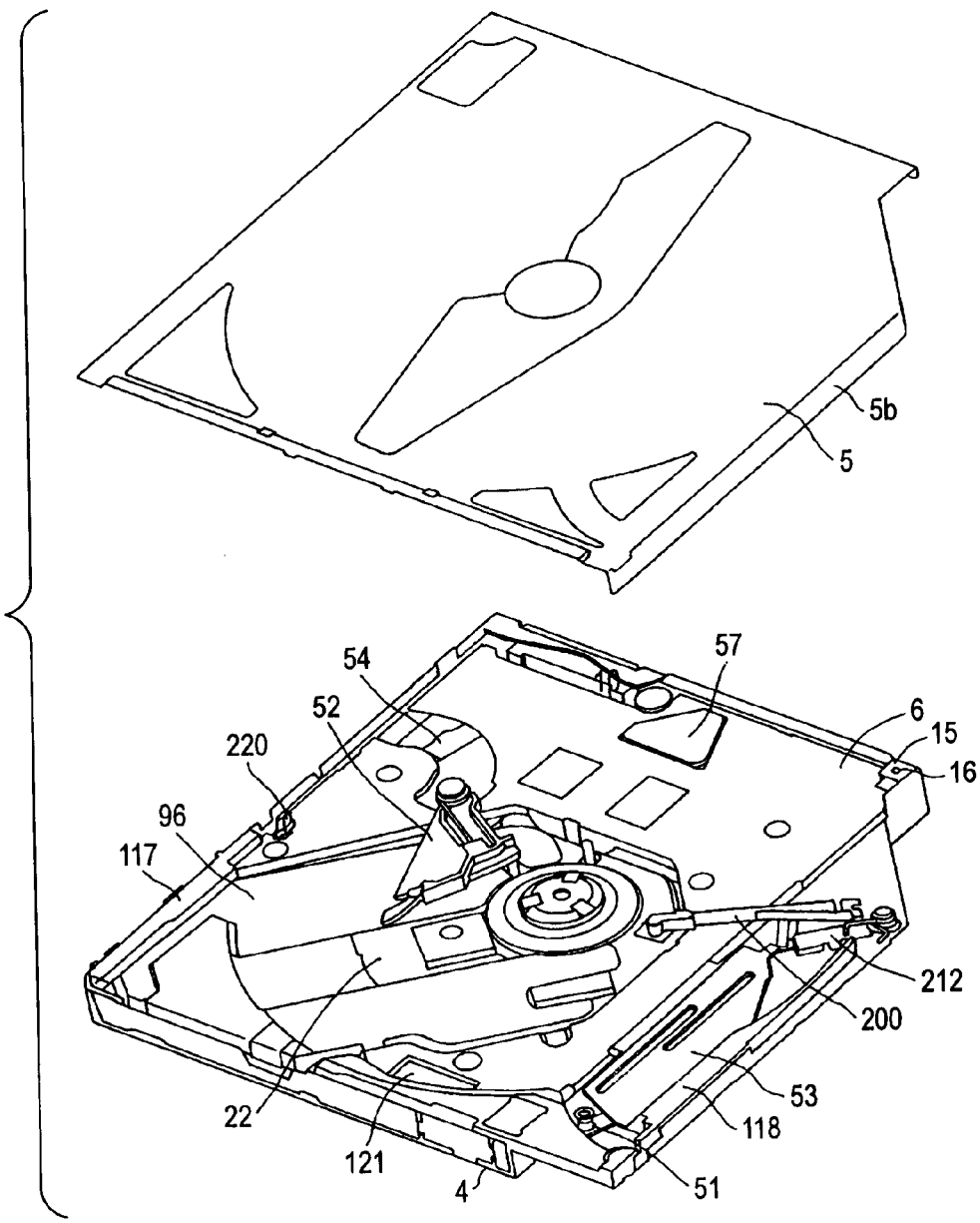
FIG. 3 is a perspective view showing the inside of the disk drive device according to the embodiment of the invention.
Figure 4:
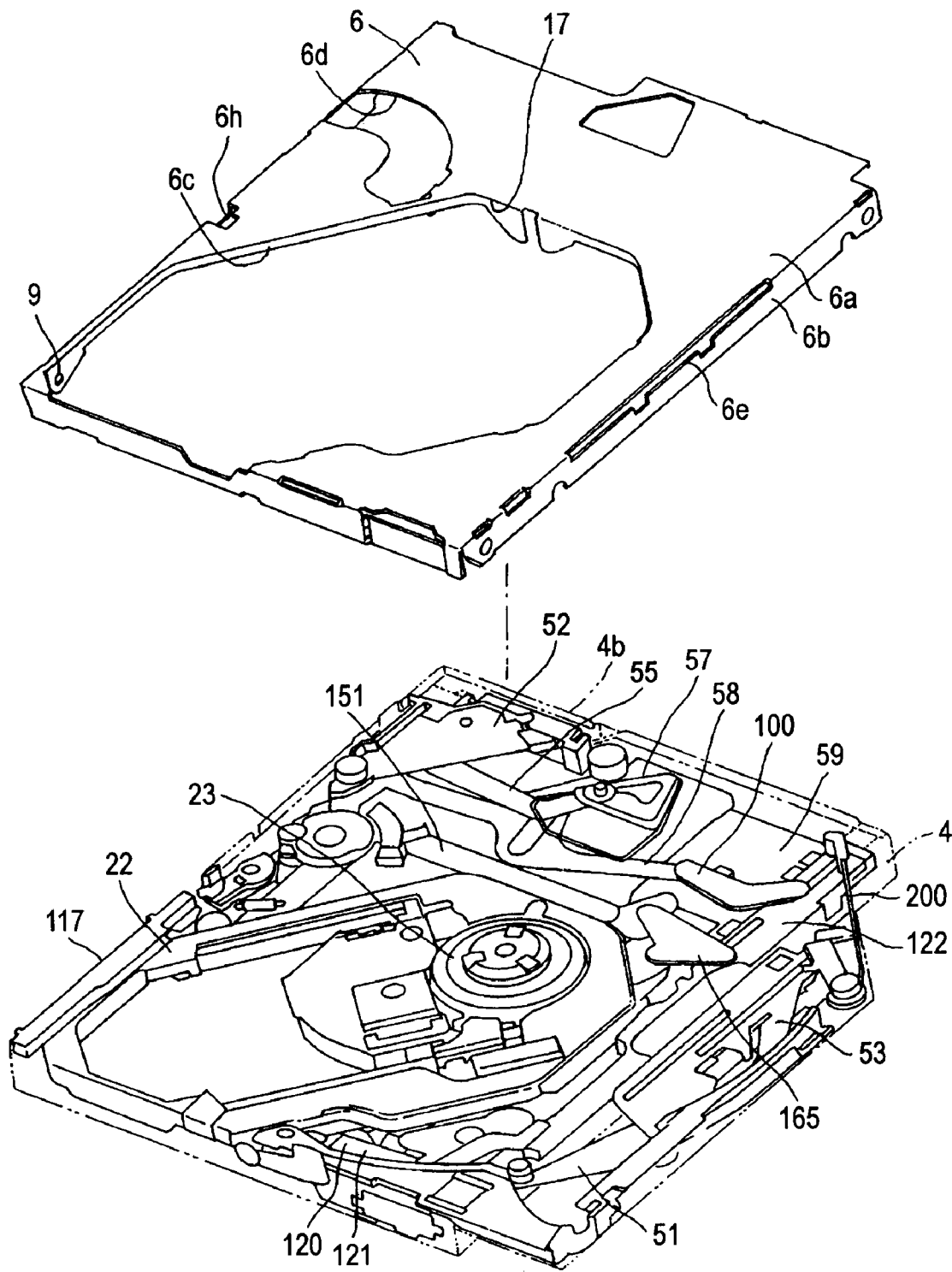
FIG. 4 is a perspective view showing the disk drive device from which a main chassis is removed.
Figure 5:
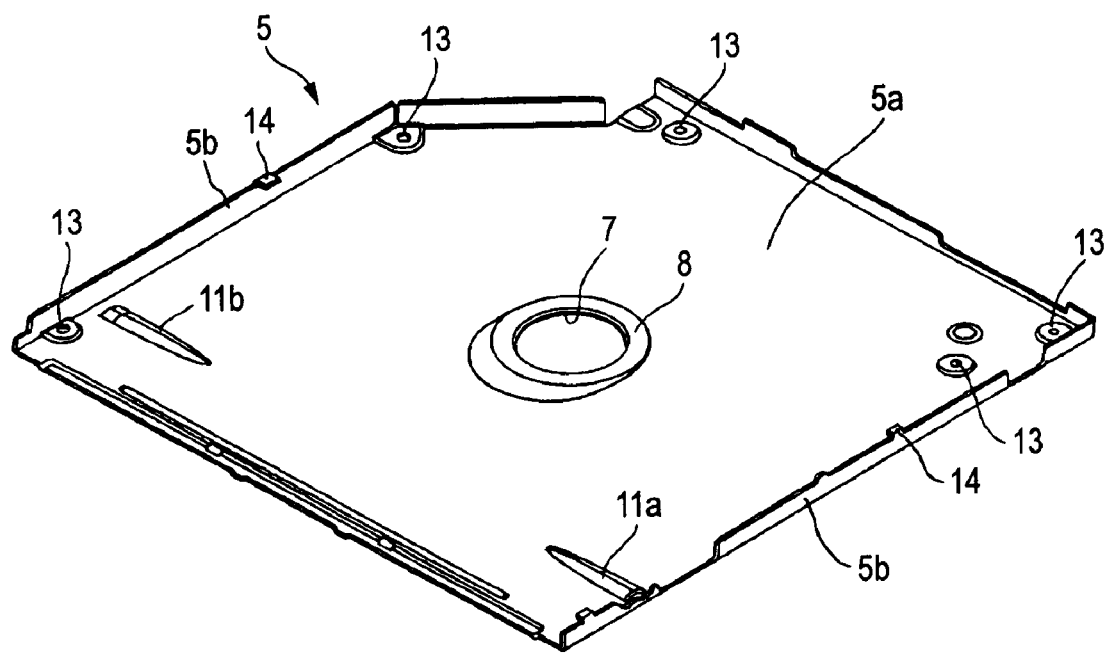
FIG. 5 is an external perspective view showing a top cover.

First, a specific structure of the disk drive device 1 will be explained. As shown in FIGS. 3 to 5, the disk drive device 1 includes a housing 3 serving as an outer housing of the device main body 1001. The housing 3 is formed by a bottom case 4 of a substantially flat box shape serving as a lower housing and a top cover 5 serving as a top plate that covers an upper opening of the bottom case 4. In the housing 3, a main chassis 6 is provided. The main chassis 6 exposes a base unit 22 described later upward and covers a driving mechanism 120 that provides a driving force for disk conveyance and a disk conveying mechanism 50 to which the driving force of the driving mechanism 120 is transmitted.

As shown in FIGS. 2 and 5, the top cover 5 is made of a thin sheet metal and has a top plate section 5a that closes the upper opening of the bottom case 4 and a pair of side plate sections 5b that are formed by slightly bending the periphery of the top plate section 5a along both sides of the bottom case 4. An opening 7 of a substantially circular shape is formed substantially in the center of the top plate section 5a. The opening 7 is an opening for exposing an engaging protrusion 33a of a turntable 23a, which is engaged with a center hole 2a of the optical disk 2, to the outside when a chucking operation described later is performed. The periphery of the opening 7 of the top plate section 5a forms a contact protrusion 8 slightly protruded to the inner side of the housing 3 to be brought into contact with the periphery of the center hole 2a of the optical disk 2 held on the turntable 23a.

On a front surface side of the top plate section 5a, a pair of guide protrusions 11a and 11b that guide the optical disk 2 inserted from a disk slot 19 described later while regulating the optical disk 2 in the height direction are formed to swell toward the inside of the housing 3. The pair of guide protrusions 11a and 11b have, in substantially symmetrical positions across a center line along the inserting direction of the optical disk 2 through the opening 7, a substantially partial conical shape elevated to draw an arc in an inserting direction of the optical disk 2 and elevated such that the arc continuously reduces in diameter from an outer side to an inner side thereof over a direction substantially orthogonal to the inserting direction of the optical disk 2. In other words, the pair of guide protrusions 11a and 11b have a shape obtained by dividing a cone along an axial direction thereof and turning vertexes of the divided cones to the inner side and are continuously reduced in height and thickness from the outer side to the inner side.

With such a shape, the pair of guide protrusions 11a and 11b can smoothly guide the optical disk 2, which is inserted from the disk slot 19, to the inside of the housing 3 while correcting deviation in a width direction of the optical disk 2. Since the guide protrusions 11a and 11b of such a shape are provided, the top cover 5 can improve rigidity of the top plate section 5a. Processing for reducing a frictional resistance with the optical disk 2 is applied to a principal surface on the inner side of the top plate section 5a.

The bottom case 4 is made of a sheet metal formed in a substantially flag box shape and a bottom surface thereof is formed in a substantially rectangular shape. On one side of the bottom case 4, a deck section 4a set higher than this bottom surface and extended to the outer side is provided. In the deck section 4a, a loading arm 51 described later that draws the optical disk 2 into the housing 3, a deck arm 200 that prevents wrong insertion of a small-diameter optical disk 101 and realizes centering of the large-diameter optical disk 2, and a regulation arm 212 that controls an urging force of the deck arm 200 are rotatably supported.

A circuit board 59 on which electronic components such as an IC chip forming a driving control circuit, connectors for realizing electric connection of the components, detection switches for detecting operations of the components, and the like are arranged is attached to the bottom surface of the bottom case 4 by screwing or the like. A connector opening 4b that exposes the connectors mounted on the circuit board 59 to the outside is provided in a part of an outer peripheral wall of the bottom case 4.

The top cover 5 is attached to the bottom case 4 by screwing. Specifically, as shown in FIG. 5, plural through holes 13 through which screws 12 are inserted are formed in an outer peripheral edge of the top plate section 5a of the top cover 5. Plural guide pieces 14 bent to the inner side at a substantially right angle are provided in side plate sections 5b on both sides of the top cover 5. On the other hand, as shown in FIG. 3, plural fixing pieces 15 bent to the inner side at a substantially right angle are provided in an outer peripheral edge of the bottom case 4. Screw holes 16 corresponding to the through holes 13 of the top cover 5 are formed in these fixing pieces 15. Plural guide slits, details of which are not shown, for preventing the plural guide pieces 14 of the top cover 5 from coming off are formed in both side surfaces of the bottom case 4.

In attaching the top cover 5 to the bottom case 4, the top cover 5 is slid from a front surface side to a rear surface side of the bottom case 4 in a state in which the plural guide pieces 14 of the top cover 5 are engaged with the plural guide slits of the bottom case 4. Consequently, the top plate section 5a of the top cover 5 closes the upper opening of the bottom case 4. In this state, the screws 12 are screwed in the screw holes 16 of the bottom case 4 through the plural through holes 13 of the top cover 5. In this way, the housing 3 shown in FIG. 2 is formed.

As shown in FIG. 2, a front panel 18 of a substantially rectangular flat shape is attached to the front surface of the housing 3. A disk slot 19 of a rectangular shape, into and out of which the optical disk 2 is move horizontally, is provided in this front panel 18. In other words, it is possible to insert the optical disk 2 into the housing from this disk slot 19 and eject the optical disk 2 from the disk slot 19 to the outside of the housing 3. Not-shown panel curtains are formed in both sides in a direction orthogonal to a longitudinal direction of the disk slot 19. The panel curtains are made of non-woven fabric or the like cut in a long shape and bonded to a rear surface side of the front panel 18 by an adhesive or the like. Therefore, the panel curtains can prevent dust and the like from entering the housing 3. Further, the panel curtains come into slide contact with a disk surface when the optical disk 2 is inserted and removed. Therefore, the panel curtains can remove dust and the like adhering to the optical disk 2.

A display unit 20 that indicates a state of access to the optical disk 2 with lighting and an eject button 21 that is pressed in ejecting the optical disk 2 are provided on the front surface of the front panel 18.

Near one side of the bottom case 4 on which the deck section 4a is provided, a pair of guide projections 124 for sliding a slider 122 of the driving mechanism 120 described later along the side are protrudingly provided apart from each other along the side (see FIG. 9).

As shown in FIGS. 3 and 4, the main chassis 6 is attached to the bottom surface of the bottom case 4 by screwing. The main chassis 6 is arranged to partition the inside of the bottom case 4 into an upper part and a lower part at the height substantially equal to the height of the deck section 4a above the circuit board 59. Consequently, in the housing 3, an area further on the top cover 5 side than the main chassis 6 is formed as a disk conveyance area in which the loading arm 51, the eject arm 52, and the deck arm 200 are exposed to rotate freely. An area further on the bottom case 4 side than the main chassis 6 is formed as an area in which the driving mechanism 120 including a driving motor 121 and a slider 122 and first and second link arms 54 and 55, an operation arm 58, and a loop cam 57 of the disk conveying mechanism 50 that transmits a driving force of the driving motor 121 to the eject arm 52 are disposed.

The main chassis 6 is made of a sheet metal of a substantially flat shape and has an upper surface 6a that covers the bottom case 4 from the rear surface side to the one side, on which the deck section 4a is formed, of the bottom case 4 and a pair of side plate sections 6b obtained by bending the periphery of the upper surface 6a along both the sides of the bottom case 4. In the main chassis 6, a base opening 6c and an eject arm opening 6d that expose the base unit 22 and the eject arm 52 of the disk conveying mechanism 50 on a conveyance area of the optical disk 2, respectively, are formed in the upper surface 6a. A side plate opening 6e through which a loading cam plate 53 coupled to the slider 122 slid by the driving motor 121 is inserted is formed in the side plate section 6b on the side on which the deck section 4a is provided.

The eject arm 52 of the disk conveying mechanism 50 that conveys the optical disk 2 over the inside and the outside of the housing 3, the operation arm 58 that transmits the driving force of the driving mechanism 120 and operates the eject arm 52, and the loop cam 57 that guides the movement of the second link arm 55 are locked to the upper surface 6a of the main chassis 6 on the bottom case 4 side. The upper surface 6a is adjacent to the base unit 22. A side edge of the upper surface 6a opposed to the disk slot 19 is formed as an edge section 17 on which a pickup unit 90 and a second pickup unit 250 provided in the eject arm 52 described later slide.

A locking section 98 to which a helical tension spring 56 that urges the eject arm 52 in an ejecting direction of the optical disk 2 via the first link arm 54 is formed in a sidewall near a corner on the rear surface side of the housing 3 to which the loop cam 57 is locked and on the other side on which the eject arm 52 and the first and the second link arms 54 and 55 are provided.

In the main chassis 6, in the side plate sections 6b on both the sides, plural guide pieces 6f are provided and through holes 6g for fixing the main chassis 6 to the bottom case 4 are provided. On the other hand, in the bottom case 4, screw holes 4c are formed in positions corresponding to the through holes 6g. The main chassis 6 is fixed by screwing screws in the screw holes 4c and the through holes 6g.

Moreover, in the main chassis 6, a centering guide opening 6h through which a guide piece 221 of a centering guide 220 described later is projected is formed near the eject arm opening 6d.

Figure 6:
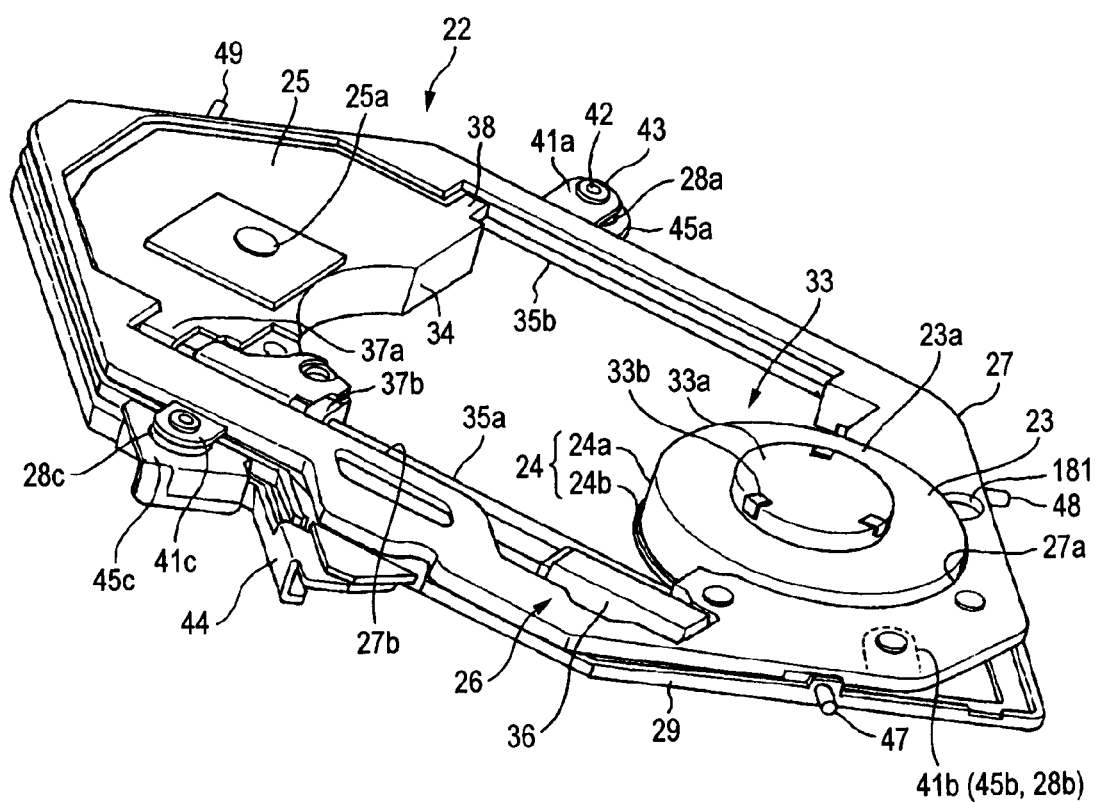
FIG. 6 is a perspective view showing a base unit.

The disk drive device 1 includes the base unit 22 constituting a drive main body on the bottom surface of the bottom case 4. As shown in FIG. 6, the base unit 22 has a base chassis 27 formed by a frame body of a substantially rectangular shape. This base chassis 27 is supported by a sub-chassis 29 via plural dampers 28a to 28c. The base chassis 27 is disposed on the bottom case 4 via the sub-chassis 29. Consequently, one end side in the longitudinal direction of the base unit 22 is located substantially in the center of the housing 3. In the base unit 22, a disk mounting unit 23 on which the optical disk 2 inserted from the disk slot 19 into the housing 3 is mounted and a disk rotation driving mechanism 24 that drives to rotate the optical disk 2 mounted on the disk mounting unit 23 are provided on the one side in the longitudinal direction. The base unit 22 has an optical pickup 25 that writes a signal in or reads out the signal from the optical disk 2 driven to rotate by the disk rotation driving mechanism 24 and a pickup feeding mechanism 26 that feeds the optical pickup 25 in a radial direction of the optical disk 2 by conveying the optical pickup 25 over the longitudinal direction. The optical pickup 25 and the pickup feeding mechanism 26 are integrally provided on the base chassis 27. Since the base chassis 27 is supported by the sub-chassis 29, the base unit 22 is lifted and lowered with respect to the optical disk 2 integrally with the sub-chassis 29 by a base elevating mechanism 150 described later.

The base unit 22 is exposed on the disk conveyance area from the base opening 6c of the main chassis 6 such that the disk mounting unit 23 is located in substantially the center on the bottom surface of the bottom case 4. It is possible to lift and lower the base unit 22 with the base elevating mechanism 150 described later. In an initial state, the base unit 22 is located below the optical disk 2 inserted from the disk slot 19 into the housing 3. According to loading operation for the optical disk 2, the base unit 22 is lifted and rotatably engages the optical disk 2. After a recording and reproducing operation, the base unit 22 is lowered by the base elevating mechanism 150, released from the engagement with the optical disk 2, and retracted from the conveyance area of the optical disk 2.

The base chassis 27 is formed by punching a sheet metal in a predetermined shape and slightly bending the periphery thereof downward. On a principal surface of the base chassis 27, a table opening 27a of a substantially semicircular shape that exposes the turntable 23a of the disk mounting unit 23 described later upward and a pickup opening 27b of a substantially rectangular shape that exposes an object lens 25a of the optical pickup 25 described later upward are continuously formed. As shown in FIG. 3, a decorative plate 30 in which openings corresponding to the openings 27a and 27b are formed is attached to an upper surface of the base chassis 27.

In the base chassis 27, a guide plate 32 that prevents contact of the optical disk 2 with the base chassis 27 and guides the optical disk 2 to a support section 88 of the eject arm 52 is formed at an end on the opposite side of the disk mounting unit 23. A not-shown fiber sheet is bonded to the guide plate 32. Thus, even when the optical disk 2 is slid, it is possible to prevent a signal recording surface of the optical disk 2 from being scratched.

In the base chassis 27, coupling pieces 41a and 41b coupled to the sub-chassis 29 are protrudingly provided on both the sides in the longitudinal direction via the dampers 28a and 28b. Insert-through holes 43 that are continued to coupling pieces 45a and 45b formed in the sub-chassis 29 and through which stepped screws 42 are inserted are drilled in the respective coupling pieces 41a and 41b.

The disk mounting unit 23 has the turntable 23a driven to rotate by the disk rotation driving mechanism 24. A chucking mechanism 33 for mounting the optical disk 2 is provided in the center of the turntable 23a. This chucking mechanism 33 has an engaging protrusion 33a engaged with the center hole 2a of the optical disk 2 and plural locking pawls 33b that lock the periphery of the center hole 2a of the optical disk 2 engaged with the engaging protrusion 33a. The chucking mechanism 33 holds the optical disk 2 on the turntable 23a.

The disk rotation driving mechanism 24 has a spindle motor 24a of a flat shape that drives to rotate the optical disk 2 integrally with the turntable 23a. This spindle motor 24a is attached to a lower surface of the base chassis 27 by screwing via a support plate 24b such that the turntable 23a provided on the upper surface slightly projects from the table opening 27a of the base chassis 27.

The optical pickup 25 has an optical block that condenses a light beam emitted from a semiconductor laser serving as a light source with the object lens 25a to irradiate the light beam on the signal recording surface of the optical disk 2 and detects a return light beam reflected by the signal recording surface of the optical disk 2 with a photodetector formed by a light-receiving element and the like. The optical pickup 25 writes a signal in or reads out the signal from the optical disk 2.

The optical pickup 25 also has an object lens driving mechanisms such as a two-axis actuator that drives to displace the object lens 25a in an optical axis direction (referred to as focusing direction) and a direction orthogonal to a recording track of the optical disk 2 (referred to as tracking direction). The optical pickup 25 performs, on the basis of a detection signal from the optical disk 2 detected by the photodetector, driving control such as focus servo for focusing the object lens 25a on the signal recording surface of the optical disk 2 while displacing the object lens 25a in the focusing direction and the tracking direction using the two-axis actuator and tracking servo for causing a spot of the light beam condensed by the object lens 25a to track the recording track. As the object lens driving mechanism, a three-axis actuator may be used which makes it possible to adjust skew of the object lens 25a with respect to the signal recording surface of the optical disk 2 to irradiate the light beam condensed by the object lens 25a vertically to the signal recording surface of the optical disk 2 in addition to such focusing control and tracking control.

The pickup feeding mechanism 26 has a pickup base 34 mounted with the optical pickup 25, a pair of guide shafts 35a and 35b that support this pickup base 34 to be slidable in the radial direction of the optical disk 2, and a displacement driving mechanism 36 that drives to displace the pickup base 34 supported by these pair of guide hafts 35a and 35b in the radial direction of the optical disk 2.

In the pickup base 34, a pair of guide pieces 37a and 37b having formed therein guide holes through which one guide shaft 35a of the pair of guide shafts 35a and 35b is inserted and a guide piece 38 having formed therein a guide groove that holds the other guide shaft 35b are formed to project from sides opposite to each other. Consequently, the pickup base 34 is slidably supported by the pair of guide shafts 35a and 35b.

The pair of guide shafts 35a and 35b are arranged on the lower surface of the base chassis 27 to be parallel to the radial direction of the optical disk 2. The pair of guide shafts 35a and 35b guide the pickup base 34, the optical pickup 25 of which is exposed from the pickup opening 27b of the base chassis 27, over the inner and the outer peripheries of the optical disk 2.

The displacement driving mechanism 36 converts rotational driving of the driving motor 31 attached to the base chassis 27 into linear driving via a gear and a rack (not shown) and drives to displace the pickup base 34 in a direction along the pair of guide shafts 35a and 35b, i.e., the radial direction of the optical disk 2. For example, a stepping motor including a lead screw is used as the displacement driving mechanism 36.

The sub-chassis 29 that supports such a base chassis 27 via the dampers 28 will be explained. The sub-chassis 29 is lifted and lowered by the base elevating mechanism 150 described later according to the conveyance of the optical disk 2 to bring the base chassis 27 closer to or apart from the optical disk 2. The sub-chassis 29 has a shape substantially identical to an external shape of the base chassis 27 and is formed by a frame body of a substantially rectangular shape slightly larger than the base chassis 27. The sub-chassis 29 is coupled to the base chassis 27 to form the base unit 22 integrally with the base chassis 27. The sub-chassis 29 is provided along the side on which the guide shaft 35a is provided. A reinforcing chassis 44 for reinforcing the sub-chassis 29 is integrally attached to the sub-chassis 29. In the sub-chassis 29, coupling pieces 45a and 45b coupled to the base chassis 27, to which the dampers 28a and 28b are attached, are formed. The coupling piece 45a is provided on one side extending over the longitudinal direction and in a position corresponding to the coupling piece 41a of the base chassis 27. The coupling piece 45b is protrudingly provided on the other side extending over the longitudinal direction and at an end on the disk mounting unit 23 corresponding to the coupling piece 41b of the base chassis 27.

Figure 7:
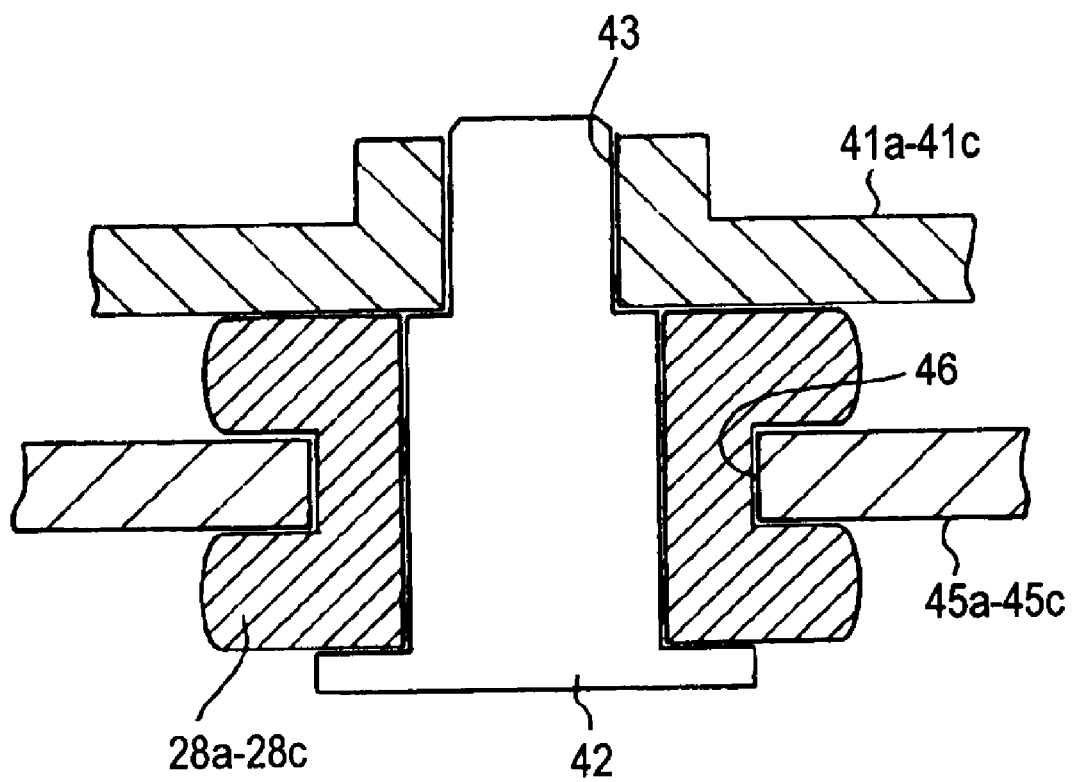
FIG. 7 is a sectional view showing a coupling section of a base chassis and a sub-chassis.

At an end on the opposite side of the disk mounting unit 23 on the other side in the longitudinal direction, a coupling piece is not provided in the sub-chassis 29. A coupling piece 45c is provided in the reinforcing chassis 44 fixed to the sub-chassis 29 in association with the coupling piece 41c of the base chassis 27. In the respective coupling pieces 45a to 45c, as shown in FIG. 7, insert-through holes 46 continued to the respective insert-through holes 43 of the respective coupling pieces 41a to 41c of the base chassis 27 are drilled. The dampers 28a to 28c are attached to the coupling pieces 45a to 45c, respectively. The coupling pieces 45a to 45c are coupled to the coupling pieces 41a to 41c of the base chassis 27 via the dampers 28a to 28c. The stepped screws 42 are inserted through the respective insert-through holes 43 and 46.

As shown in FIG. 6, the sub-chassis 29 has a first support shaft 47 located on the disk mounting unit 23 side on a side opposed to the slider 122 described later and engaged with and supported by a first cam slit 130 of the slider 122, a second support shaft 48 located on the disk mounting unit 23 side on a side opposed to a sub-slider 151 and engaged with and supported by a second cam slit 170 of the sub-slider 151, and a third support shaft 49 located on a front surface side on a side on the opposite side of the side opposed to the slider 122 and rotatably supported by a shaft hole 9 provided in the side plate section 6b of the main chassis 6.

Therefore, in the sub-chassis 29, the first support shaft 47 slides in the first cam slit 130 and the second support shaft 48 slides in the second cam slit 170 in association with the slide of the slider 122 and the sub-slider 151. Consequently, the disk mounting unit 23 side is rotated with the third support shaft 49 as a fulcrum to make it possible to lift and lower the base chassis 27.

On the bottom surface of the bottom case 4, as shown in FIG. 3, a support pin 10 (not shown) that prevents the eject arm 52 from bending downward when the eject arm 52 rotates near the disk mounting unit 23 is vertically provided. The support pin 10 prevents the optical disk 2 from colliding with the disk mounting unit 23 to be damaged when the eject arm 52 bends downward. The support pin 10 is located near the disk mounting unit 23 of the base unit 22, projected upward from the bottom surface of the bottom case 4, and inserted through an insert-through hole 30a drilled in the decorative plate 30 to be exposed on the disk conveyance area.

Figure 8:
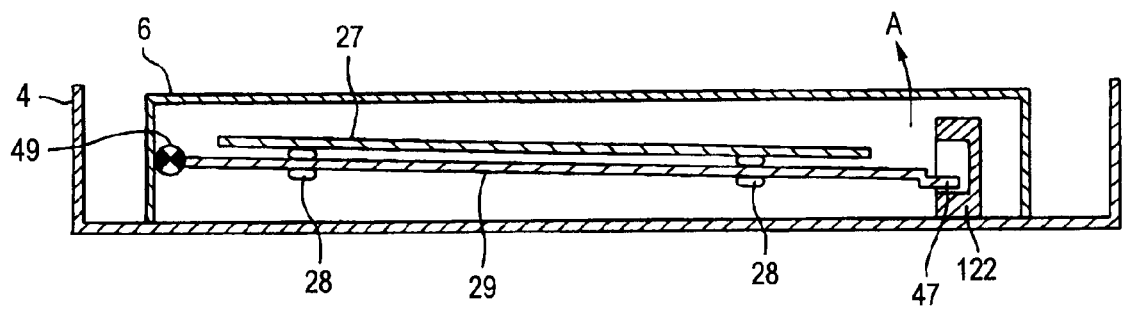
FIG. 8 is a diagram for explaining a support structure by a damper between the base chassis and the sub-chassis in the base unit.

As shown in a schematic diagram shown in FIG. 8, the base unit 22 having such a structure is lifted and lowered in an arrow A direction and a direction opposite to the arrow A direction. In this case, the base chassis 27 is supported by only the sub-chassis 29 via the respective dampers 28. Since all paths through which vibration from the outside is transmitted pass through the sub-chassis 29 attached with the dampers 28, resistance against a shock is improved. Since an excess weight including the weight of the dampers 28 is not applied to the base chassis 27, i.e., a total weight of objects to which a shock is transmitted is small because dampers is not provided, shock resistance is further improved.

In the disk drive device 1, when the main chassis 6 is fixed to the bottom case 4, the main chassis 6 may be fixed via the dampers. Specifically, as shown in FIG. 9, in the main chassis 6, the dampers 28 are provided between the respective guide pieces 6f and the screw holes 4c of the bottom case 4 and fixed by the stepped screws.

Figure 10:
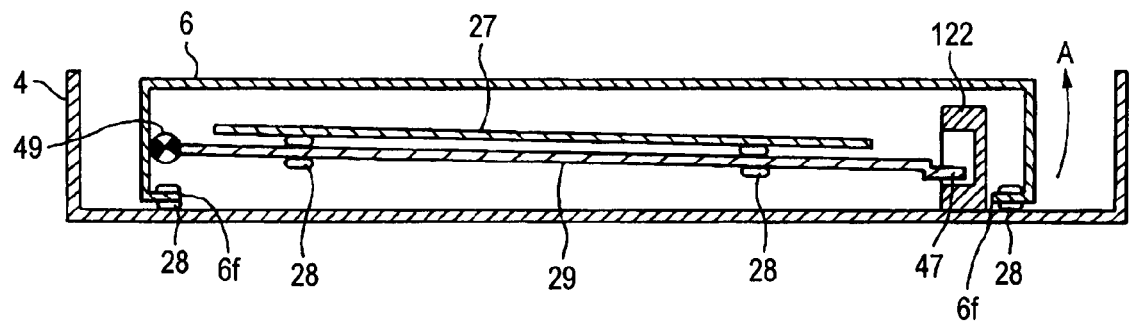
FIG. 10 is a sectional view showing another example of the disk drive device.

As shown in a schematic diagram in FIG. 10, in the base unit 22 fixed in this way, the sub-chassis 29 is supported by the main chassis 6 and the main chassis 6 is fixed to the bottom case 4 via the dampers 28. In this case, the base chassis 27 is supported by only the sub-chassis 29 via the dampers 28a to 28c and the sub-chassis 29 is supported by the main chassis 6. The main chassis 6 is fixed to the bottom case 4 via the dampers 28. Paths through which a shock from the outside is transmitted pass through the main chassis 6 attached with the dampers 28 and the sub-chassis 29 attached with the dampers 28a to 28c. Since the shock is transmitted via the dampers arranged at two stages, resistance against a shock is further improved.

Figure 9:
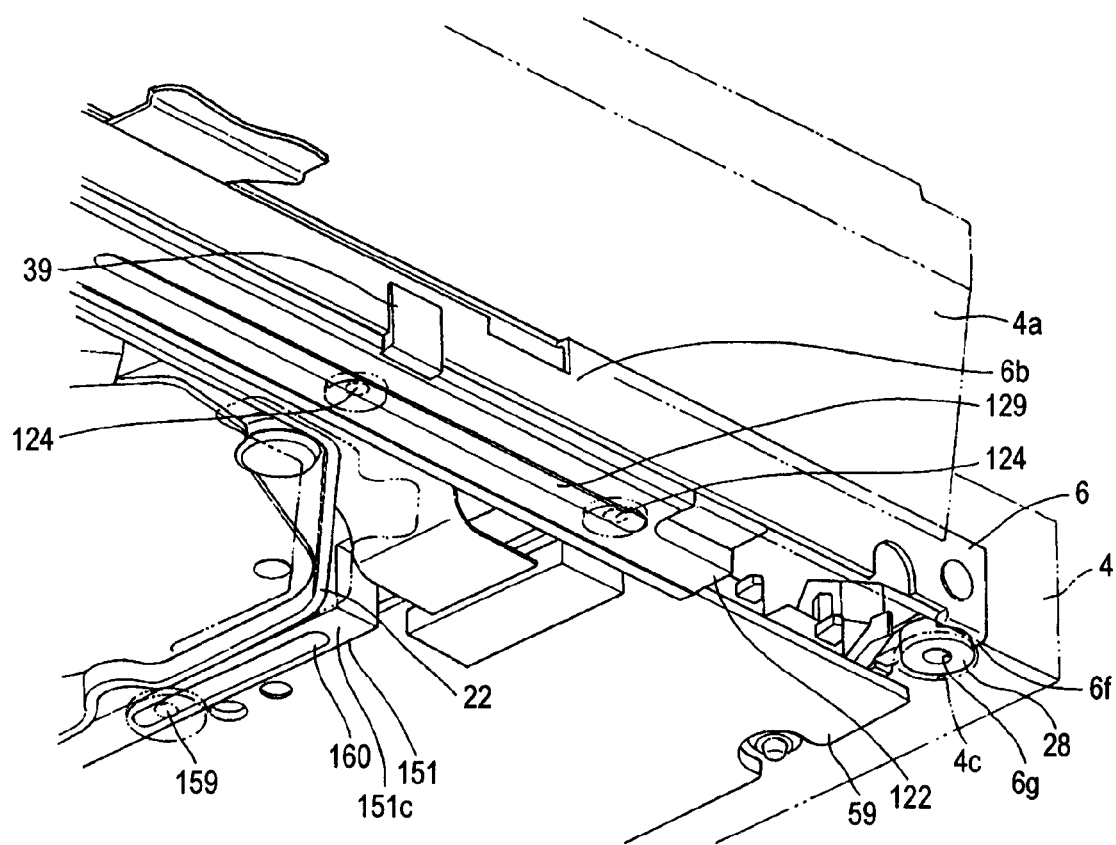
FIG. 9 is a perspective view showing another example of the disk drive device.

As shown in FIG. 9, a cushioning material 39 may be further provided between a substantially middle section of the side plate section 6b of the main chassis 6 and the bottom case 4. The cushioning material 39 is formed of an elastic member such as a thin rubber piece in order to block, when the side plate section 6b and the bottom case 4 come into direct contact with each other because of amplitude of vibration due to a shock, paths through which the shock is transmitted. An adhesive layer is formed over the surface of the cushioning material 39. This adhesive layer is bonded to the side plate section 6b of the main chassis 6.

Consequently, even when the clearance between the bottom case 4 and the main chassis 6 is narrowed and the main chassis 6 is connected to the inside of the bottom case 4 via the dampers 28, it is possible to prevent a situation in which the side plate section 6b of the main chassis 6 comes into contact with the bottom case 4 and disturbance is transmitted to the main chassis 6 and the base chassis 27 via a portion of the contact.

As shown in FIGS. 11 to 19, the disk drive device 1 includes a disk conveying mechanism 50 that conveys the optical disk 2 between a disk inserting and removing position where the optical disk 2 is inserted in and removed from the disk the disk slot 19 and a disk mounting position where the optical disk 2 is mounted on the turntable 23a of the disk mounting unit 23.

This disk conveying mechanism 50 has, as support members moved between the upper surface 6a of the main chassis 6 and the principal surface of the top plate section 5a opposed to the disk mounting unit 23, the loading arm 51 and the eject arm 52 that are swingable in a plane parallel to the principal surface of the optical disk 2, the loading cam plate 53 that transmits a driving force from the driving mechanism 120 described later to the loading arm 51, the first link arm 54 that is engaged with the eject arm 52 and rotates the eject arm 52 in the ejecting direction of the optical disk 2, a second link arm 55 coupled to the first link arm 54, the helical tension spring 56 laid over between the first link arm 54 and the main chassis 6, the loop cam 57 that is engaged with a guide protrusion 113 of the second link arm 55 and guides the second link arm 55, and the operation arm 58 that is coupled to the driving mechanism 120 to move the first link arm 54 in a direction in which the eject arm 52 inserts or ejects the optical disk 2.

When the eject arm 52 is rotated to a predetermined position according to the insertion of the optical disk 2 from the disk slot 19, the disk conveying mechanism 50 automatically draws the optical disk 2 to the disk mounting unit 23 using the loading arm 51. The disk conveying mechanism 50 ejects the optical disk 2 according to the rotation of the eject arm 52 to the front surface side of the housing 3. Specifically, in the disk conveying mechanism 50, during a period from the insertion of the optical disk 2 until the eject arm 52 is rotated to the predetermined position and an operation for drawing in the optical disk 2 is started, a rotation support member 71 of the eject arm 52 is rotated to a left guide wall 117 side of the housing 3 and the guide protrusion 113 formed at the tip of the second link arm 55 is guided by the loop cam 57 to be moved in a direction different from a rotating direction of an engaging hole 80 in which the first link arm 54 of the rotation support member 71 is engaged. Consequently, the movement of the first link arm 54 coupled to the rotation support member 71 and the second link arm 55 is regulated, the helical tension spring 56 laid over between the first link arm 54 and the main chassis 6 expands, and the eject arm 52 is rotated in the inserting direction while being urged in the ejecting direction.

In the disk conveying mechanism 50, in the operation for drawing in the optical disk 2, the guide protrusion 113 of the second link arm 55 is guided by the loop cam 57 to be moved in a direction same as the rotating direction of the engaging hole 80 in which the first link arm 54 of the rotation support member 71 is engaged. Therefore, the helical tension spring 56 expanded is contracted and the urging force in the ejecting direction of the eject arm 52 is reduced.

Moreover, in the disk conveying mechanism 50, at the time of ejection of the optical disk 2, the guide protrusion 113 of the second link arm 55 is guided by the loop cam 57 to be moved in the direction same as the rotating direction of the engaging hole 80 in which the first link arm 54 of the rotation support ember 71 of the eject arm 52 rotated in the ejecting direction of the optical disk 2 is engaged. Therefore, the eject arm 52 is rotated to eject the optical disk 2 in a state in which the urging force by the helical tension spring 56 does not act.

Consequently, in an insertion process in which the optical disk 2 is inserted to the predetermined position by a user, since the helical tension spring 56 is expanded, it is possible to allow the urging force in the ejecting direction to act. Thus, even when the insertion of the optical disk 2 by the user is stopped, it is possible to prevent the optical disk 2 from being left untouched in a state in which the optical disk 2 is inserted into the housing 3 halfway. In a process for drawing in the optical disk 2 with the loading arm 51, since the helical tension spring 56 contracts, it is possible to eliminate the urging force in the ejecting direction acting on the eject arm 52. Thus, it is possible to perform a smooth draw-in operation. In a process for ejecting the optical disk 2, since the first link arm 54 and the locking section of the main chassis 6 are brought close to each other and the contracted state of the helical tension spring 56 is maintained, the urging force in the ejecting direction by the helical tension spring 56 given to the eject arm 52 does not act. Thus, the eject arm 52 is rotated according to operation of the operation arm 58 subjected to the driving force of the driving mechanism 120. It is possible to stably eject, without relying on an elastic force, the optical disk 2 to a predetermined stop position where the center hole 2a of the optical disk 2 is ejected to the outside of the housing 3.

The respective components of such a disk conveying mechanism 50 will be hereinafter explained in detail.

Figure 20:
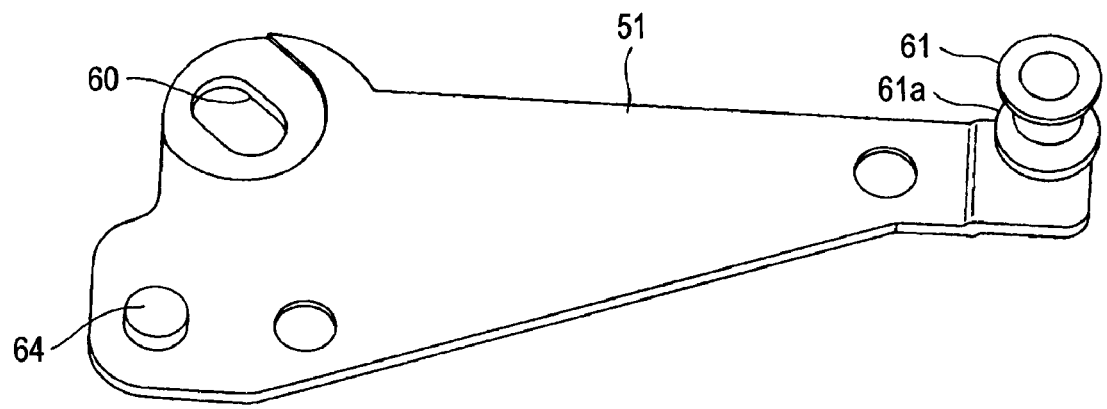
FIG. 20 is a perspective view showing the loading arm.
Figure 21:
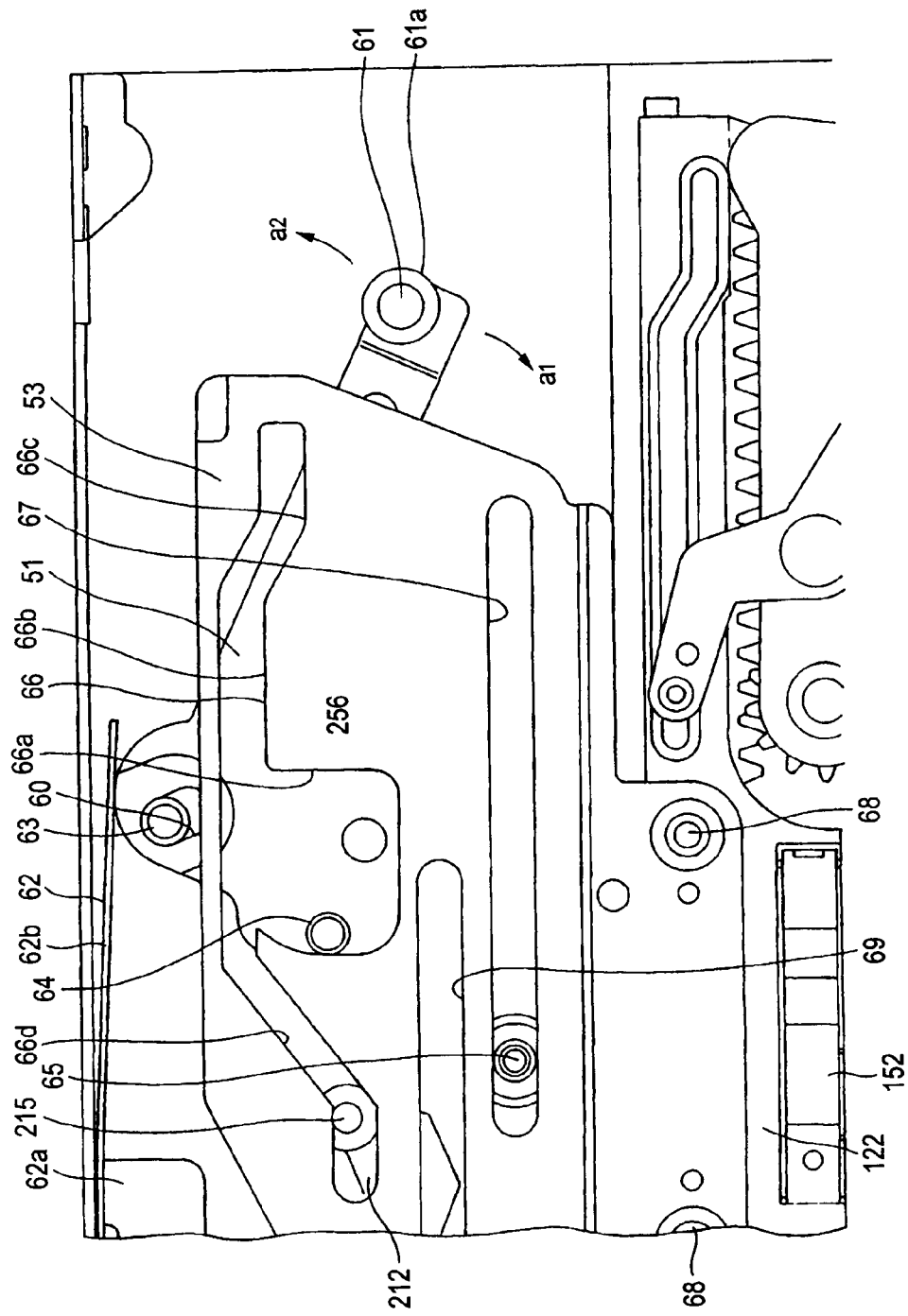
FIG. 21 is a plan view showing the loading arm.

The loading arm 51 draws the optical disk 2 onto the disk mounting unit 23. A base end of the loading arm 51 is rotatably supported on the deck section 4a of the bottom case 4 further to the disk slot 19 side than the disk mounting unit 23. A tip of the loading arm 51 is rotatable in an arrow $a_1$ direction and an arrow $a_2$ direction in FIG. 11. Specifically, as shown in FIGS. 20 and 21, the loading arm 51 includes an arm main body 51a made of a sheet metal of a flat shape and an insert-through holes 60 is protrudingly provided at one end of this arm main body 51a. Since the insert-through holes 60 is engaged with a rotation support member 63 of a substantially cylindrical shape provided protrudingly from the deck section 4a, the loading arm 51 is supported to be rotatable in the arrow $a_1$ direction in FIG. 21 for loading the optical disk 2 and the arrow $a_2$ direction in FIG. 21 for ejecting the optical disk 2 on the deck section 4a with the rotation support member 63 as a fulcrum.

The insert-throughholes 60 is formed in a long hole shape. Therefore, the loading arm 51 is rotated in the arrow $a_1$ direction and the arrow $a_2$ direction in the figure while moving along the insert-throughholes 60. Consequently, as described later, in the process for inserting and drawing in the optical disk 2 and the process for ejecting the optical disk 2, the loading arm 51 can absorb shift of rotation timing that occurs between the loading arm 51 and the eject arm 52 according to a stroke of the slider 122 and perform smooth insertion and ejection of the optical disk 2.

In the loading arm 51, a contact section 61 brought into contact with the outer circumference of the optical disk 2 inserted from the disk slot 19 is provided to project upward at the tip of the arm main body 51a. A small-diameter rotating roller 61a is rotatably attached to the contact section 61. The contact section 61 is made of resin softer than the optical disk 2. A center portion brought into contact with the outer circumference of the optical disk 2 inserted from the disk slot 19 bends to the inner side. The contact section 61 has a substantially drum-like shape with both ends thereof regulating movement in the height direction of the optical disk 2 as a flange section expanded in diameter.

Since a section near the insert-throughholes 60 is pressed against a leaf spring 62 from a side thereof, the loading arm 51 is typically urged to rotate in the arrow $a_1$ direction in FIG. 21 for urging the optical disk 2 from the disk slot 19 side to the disk mounting section 23 side with the insert-through holes 60 as a fulcrum by the urging force of this leaf spring 62. The leaf spring 62 that urges the loading arm 51 is formed by a base section 62a fixed onto the deck section 4a and an arm section 62b that is extended from one end of the base section 62a and urges the loading arm 51.

Moreover, in the loading arm 51, an engaging protrusion 64 inserted through and engaged with a first cam groove 66 of the loading cam plate 53 described later is protrudingly provided. This engaging protrusion 64 moves along the first cam groove 66 of the loading cam plate 53. Thus, the loading arm 51 is rotated while regulating the urging force of the leaf spring 62.

The loading cam plate 53 is made of a sheet metal of a flat shape and is engaged with the slider 122 of the driving mechanism 120 described later to be moved back and forth on the deck section 4a according to the movement of the slider 122. Consequently, the loading cam plate 53 rotates the loading arm 51 and the regulation arm 212 that regulates an urging force of the deck arm 200 described later. The loading cam plate 53 is placed on the loading arm 51 and the regulation arm 212 rotatably supported on the deck section 4a. The engaging protrusion 64 of the loading arm 51 and a rotation guide section 215 of the regulation arm 212 are inserted through the loading cam plate 53. Consequently, the loading cam plate 53 regulates the rotation of the loading arm 51 and the regulation arm 212 according to operations for inserting and ejecting the optical disk 2.

Figure 22A:
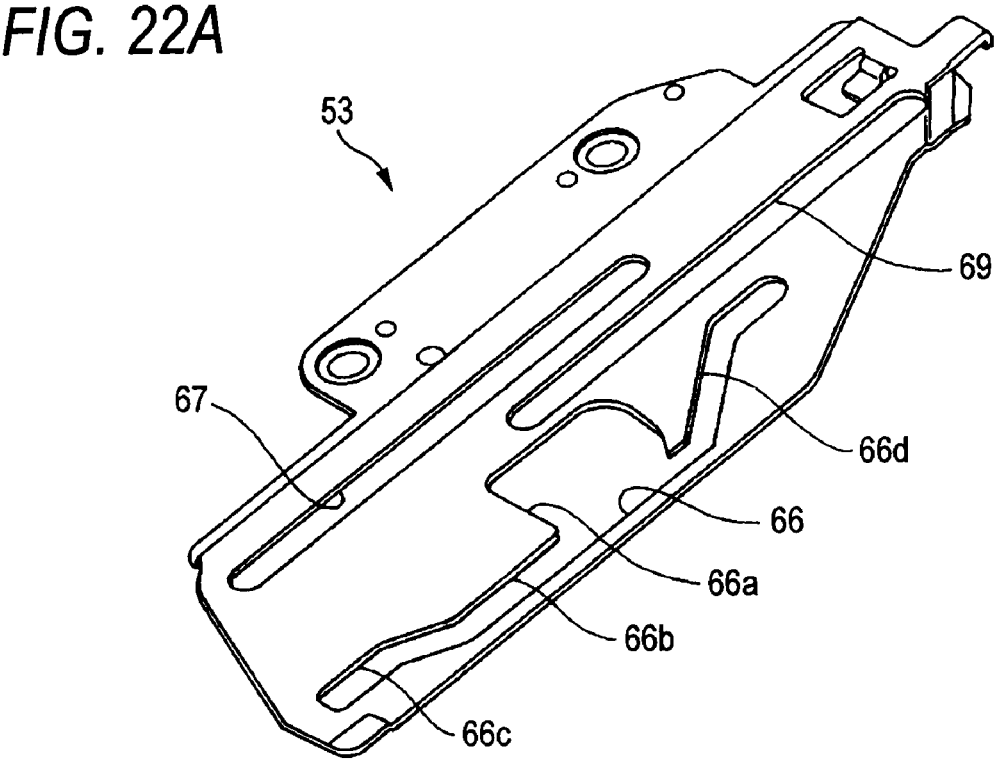
FIG. 22A is a perspective view of a front surface side of a loading cam plate.
Figure 22B:
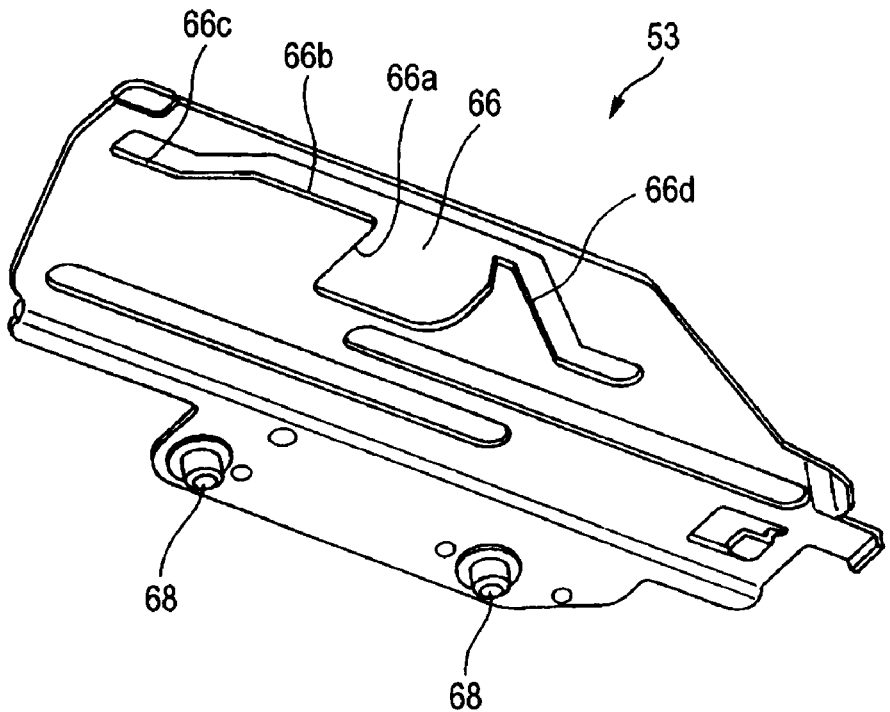
FIG. 22B is a perspective view of a rear surface side of the loading cam plate.

On such a loading cam plate 53, as shown in FIGS. 22A and 22B, a first cam groove 66 through which the engaging protrusion 64 protrudingly provided in the loading arm 51 and the rotation guide section 215 of the regulation arm 212 are inserted, a second cam groove 67 through which a guide protrusion 65 protrudingly provided in the deck section 4a is inserted, a pair of engaging projections 68 that engage with the slider 122, and a third cam groove 69 through which a rotation support pin 217 that rotatably supports the regulation arm 212 on the deck section 4a are formed.

Since the engaging protrusion 64 is slid, the first cam groove 66 regulates the rotation of the loading arm 51 urged in the loading direction of the optical disk 2 by the leaf spring 62. Since the rotation guide section 215 is slid, the first cam groove 66 rotates the regulation arm 212 to control an urging force of a coil spring 203 locked to the deck arm 200.

Figure 11:
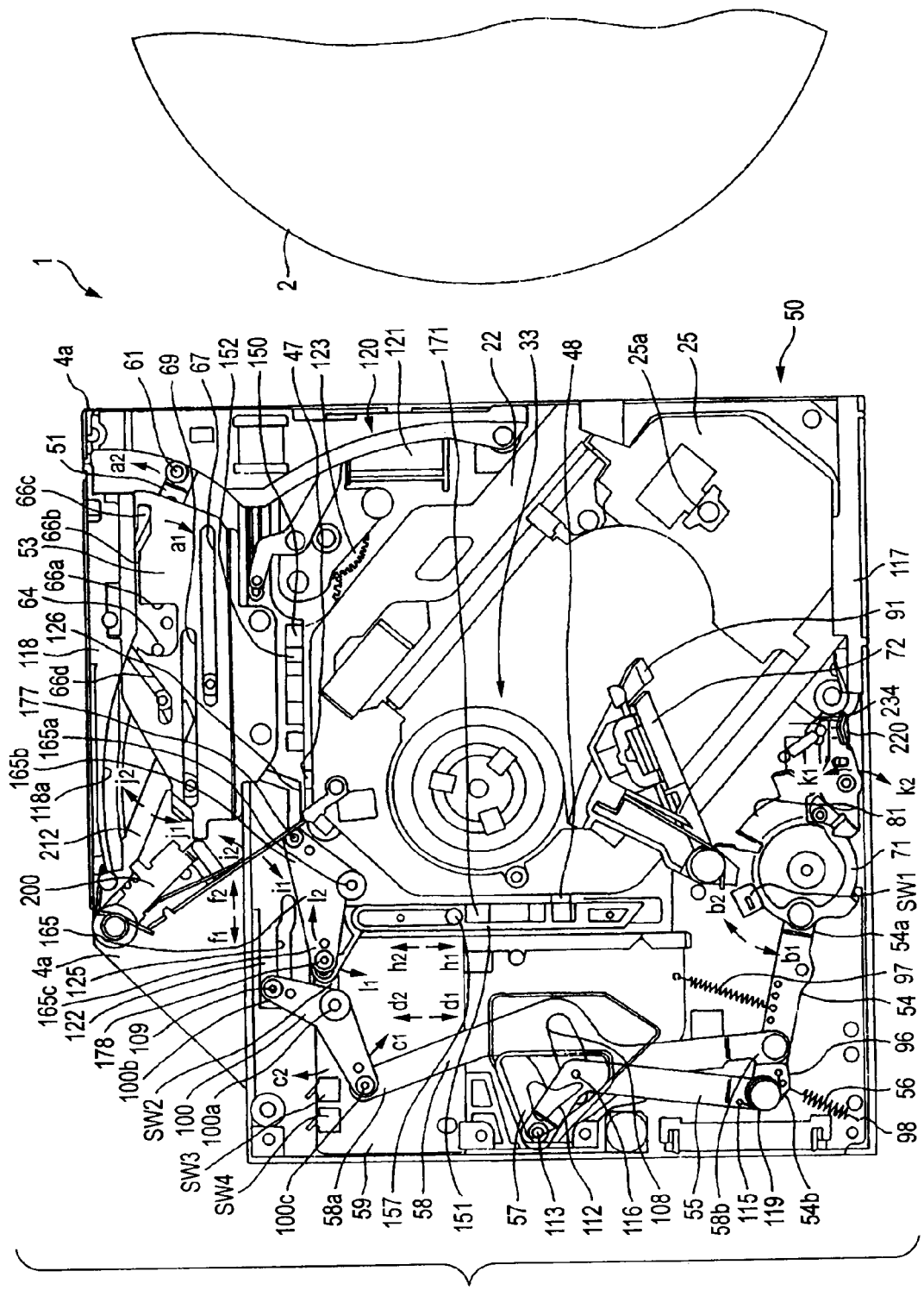
FIG. 11 is a plan view showing a disk drive device put on standby for insertion of an optical disk.

As shown in FIGS. 11 and 21, the first cam groove 66 includes a first guide section 66a that regulates the engaging protrusion 64 to rotate the loading arm 51 in the arrow $a_1$ direction in FIG. 11, which is a direction for drawing in the optical disk 2, a second guide section 66b that is formed adjacent to and continuous from the first guide section 66a and regulates a rotating position of the loading arm 51 to support the optical disk 2 in the centering position, a third guide section 66c that is formed continuously from the second guide section 66b and guides the engaging protrusion 64 such that the loading arm 51 rotates in the arrow $a_2$ direction in FIG. 11 away from the outer circumference of the optical disk 2 mounted on the disk mounting unit 23, and a fourth guide section 66d that guides the rotation guide section 215 provided on the opposite side of the second guide section 66b via the first guide section 66a to rotate the regulation arm 212.

The first guide section 66a is formed in a direction substantially orthogonal to the moving direction of the loading cam plate 53. The loading cam plate 53 is moved in an arrow $f_1$ direction to the rear surface side in the housing 3. Thus, the first guide section 66a comes into contact with the engaging protrusion 64 from the front surface side to rotate the loading arm 51 in the arrow $a_1$ direction in FIG. 11. The second guide section 66b is formed substantially parallel to the moving direction of the loading cam plate 53. The second guide section 66b regulates the rotation of the loading arm 51 rotated in the arrow $a_1$ direction for drawing in the optical disk 2 by the first guide section 66a and realizes centering of the optical disk 2. The third guide section 66c is bent further to an inner peripheral side of the housing 3 than the second guide section 66b and guides the engaging protrusion 64 to space apart the loading arm 51 from the side of the optical disk 2 mounted on the disk mounting unit 23 and allow the optical disk 2 to rotate. The fourth guide section 66d guides the rotation guide section 215 of the regulation arm 212. The fourth guide section 66d rotates the regulation arm 212 according to the slide of the loading cam plate 53 and controls the urging force by the deck arm 200 described later.

Figure 14:
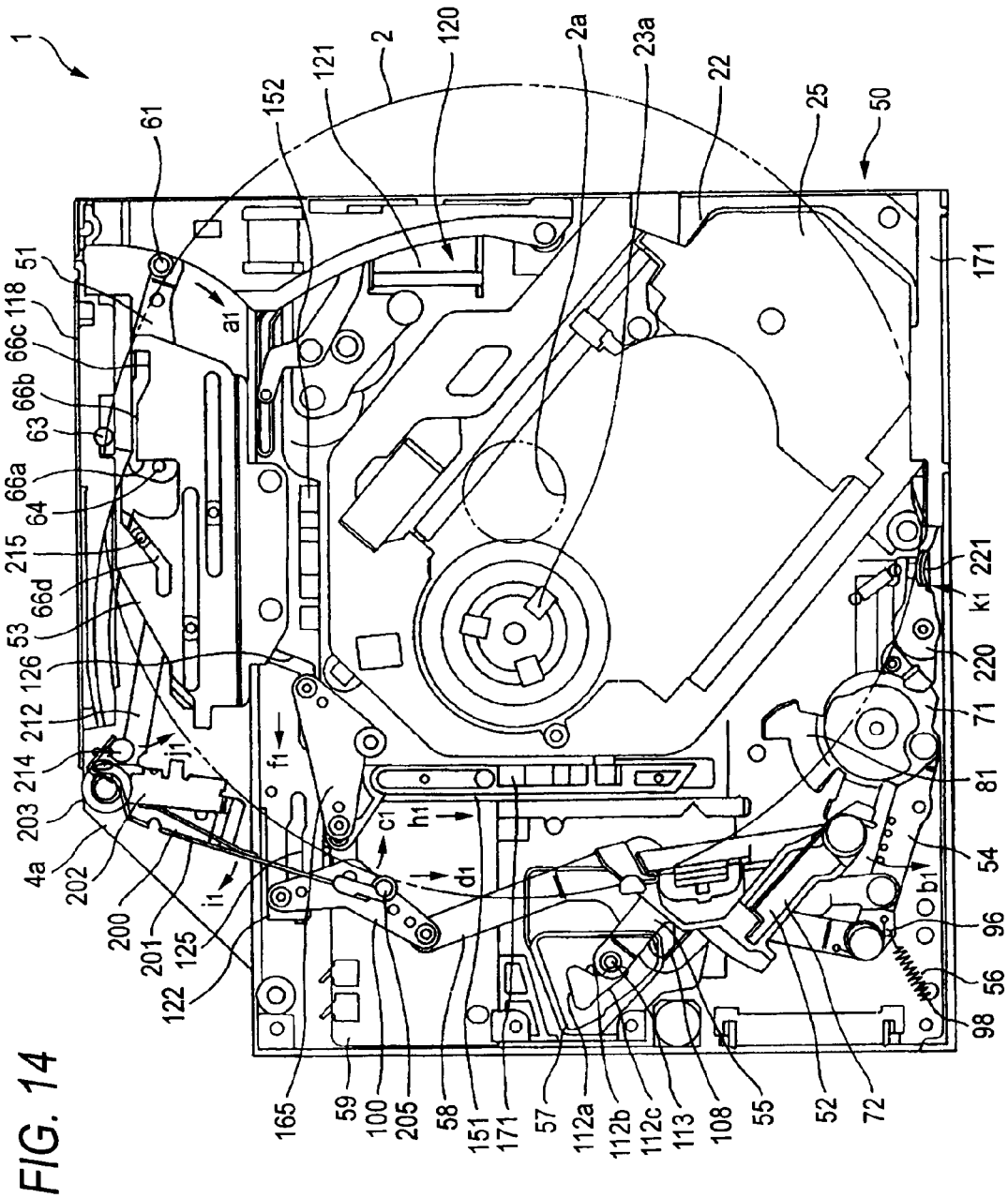
FIG. 14 is a plan view showing the disk drive device that is drawing in the optical disk.

In the first cam groove 66, in a state of standby for insertion of the optical disk 2, as shown in FIG. 11, the first guide section 66a and the engaging protrusion 64 are spaced apart from each other and the engaging protrusion 64 of the loading arm 51 urged to rotate in the arrow $a_1$ direction by the leaf spring 62 is brought into contact with the side opposed to the first guide section 66a. Consequently, the loading cam plate 53 performs positioning of the loading arm 51 in the state of standby for insertion of the optical disk 2. When the optical disk 2 is inserted into the housing 3 and the loading cam plate 53 is moved to the rear surface side of the housing 3 by the slider 122, as shown in FIG. 14, in the first cam groove 66, the engaging protrusion 64 is brought into contact with the first guide section 66a and rotates the loading arm 51 in the arrow $a_1$ direction in FIG. 14, which is the direction for drawing in the optical disk 2.

Figure 15:
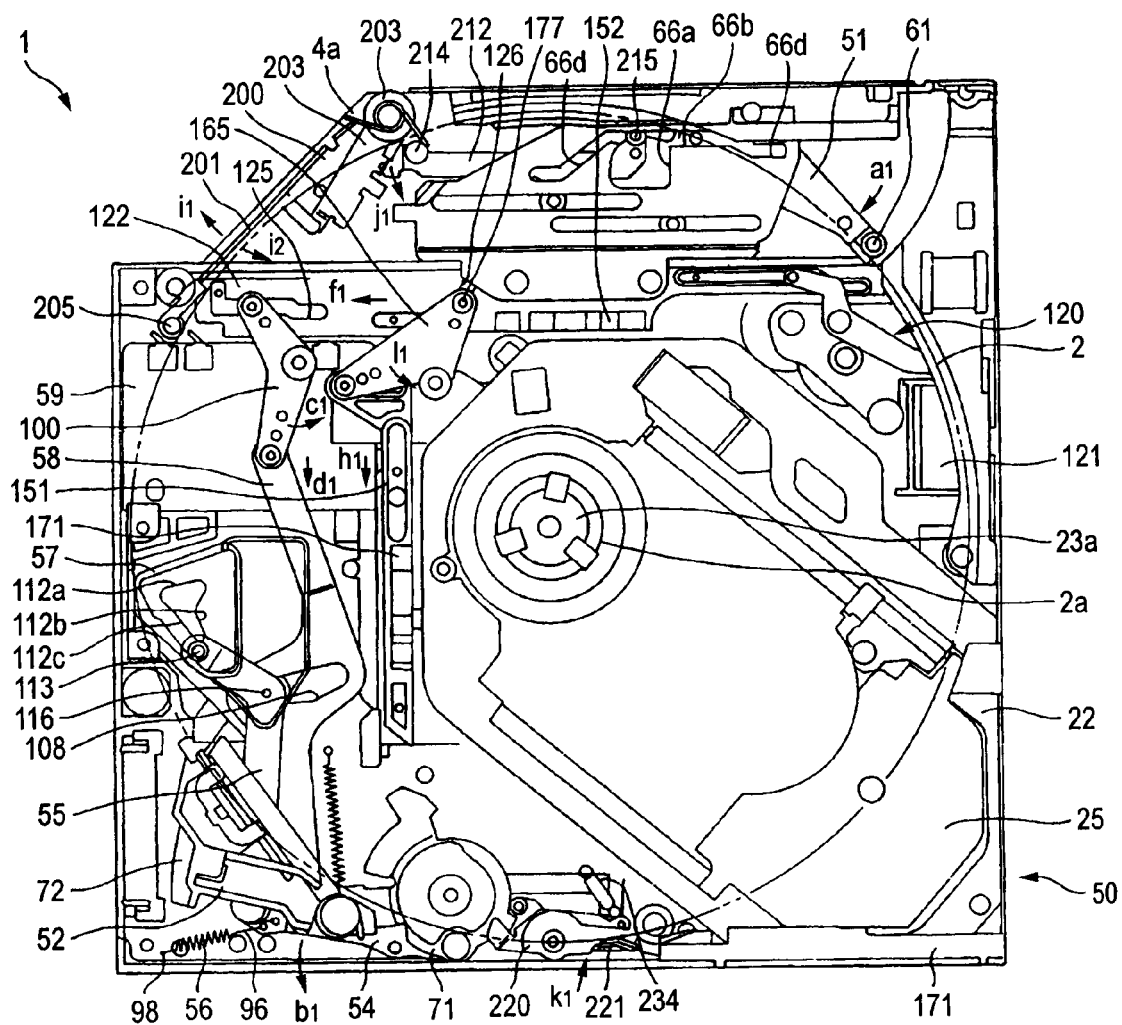
FIG. 15 is a plan view showing the disk drive device that has drawn in the optical disk to a centering position.
Figure 16:
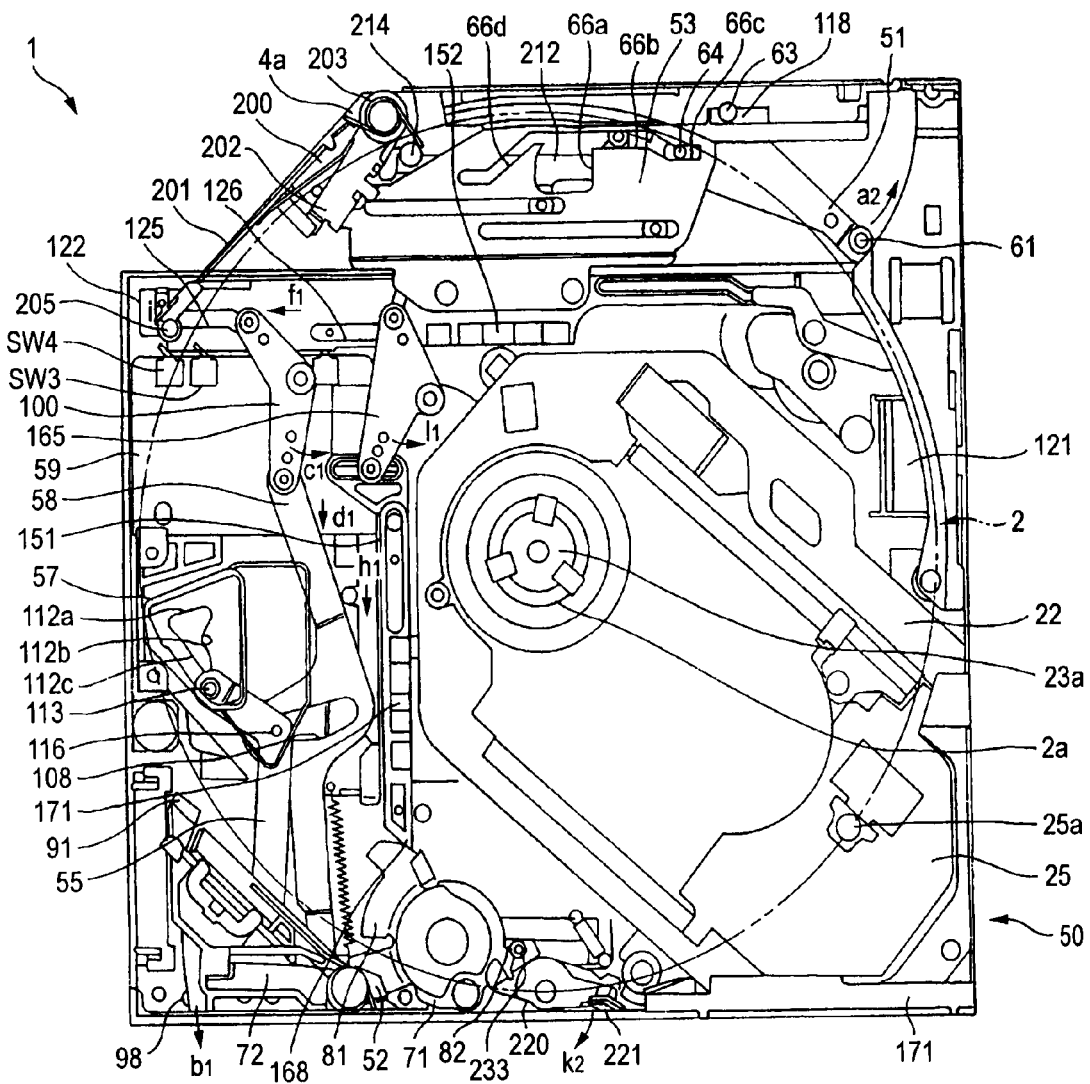
FIG. 16 is a plan view showing the disk drive device that records a signal in and reproduces the signal from the optical disk.

In the first cam groove 66, when the center hole 2a of the optical disk 2 is conveyed to be located on the turntable 23a of the disk mounting unit 23, as shown in FIG. 15, the engaging protrusion 64 enters the second guide section 66b. In the loading arm 51, since a relative angle of the engaging protrusion 64 and the insert-through holes 60 does not change in the second guide section 66b, the contact section 61 is not rotated in the arrow $a_1$ direction and supports the optical disk 2 in the centering position. Thereafter, when the chucking of the optical disk 2 is finished, in the first cam groove 66, as shown in FIG. 16, the engaging protrusion 64 is guided by the third guide section 66c and rotates the loading arm 51 in the arrow $a_2$ direction in FIG. 16 away from the optical disk 2.

In the first cam groove 66, when the loading cam plate 53 is moved to the rear surface side of the housing 3, the rotation guide section 215 of the regulation arm 212 is guided by the fourth guide section 66d to swing. The regulation arm 212 moves a spring locking section 214 to which the other end 203b of the coil spring 203, which urges to rotate the deck arm 200, is locked and prevents an urging force of the coil spring 203 from increasing as the optical disk 2 is inserted into the housing 3 more.

Figure 17:
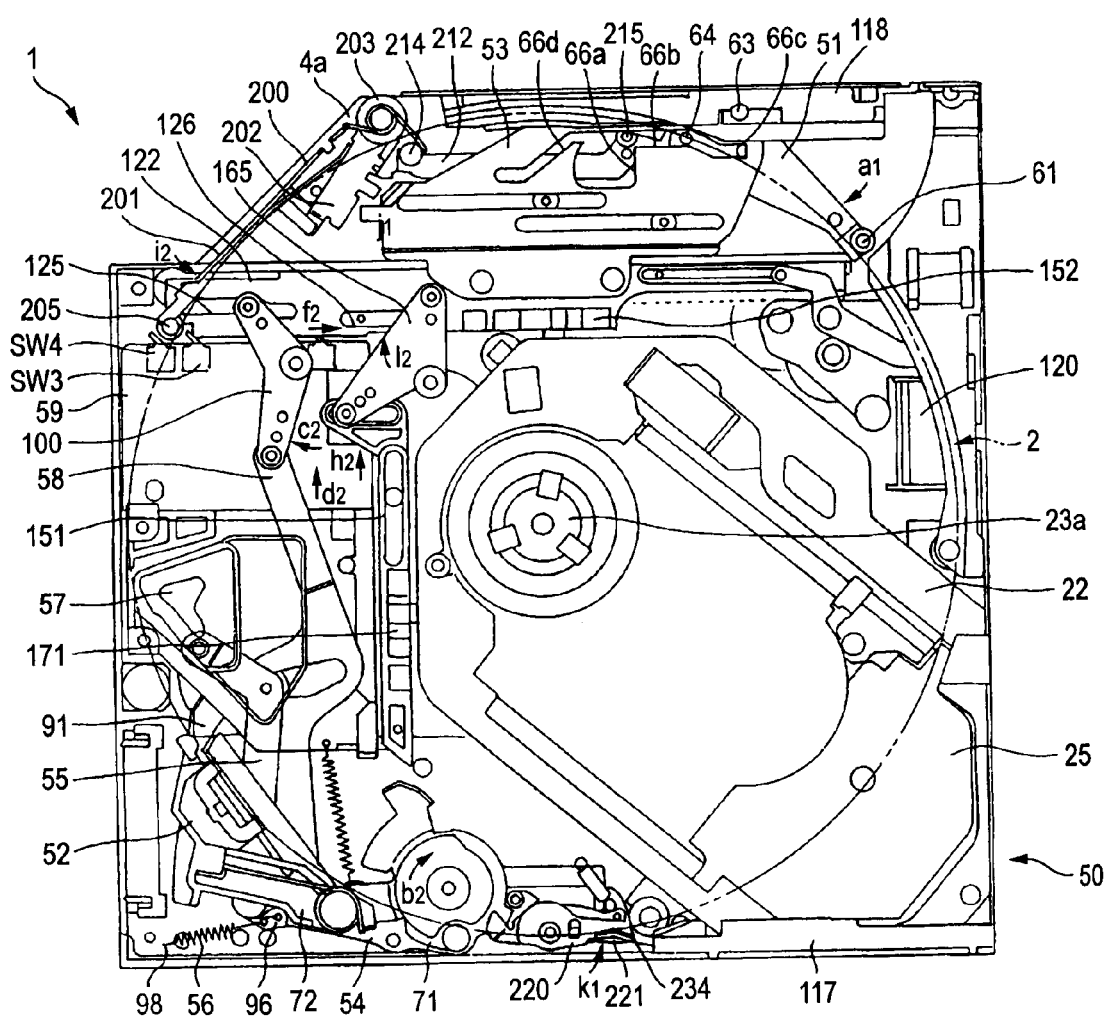
FIG. 17 is a disk drive device that is supporting a disk side with various arms in a process for ejecting the optical disk.

At the time of ejection of the optical disk 2, according to the movement of the slider 122 in an arrow $f_2$ direction to the front surface side, when the loading cam plate 53 is moved in the same direction, as shown in FIG. 17, the engaging protrusion 64 moves from the third guide section 66c to the second guide section 66b. Consequently, the loading arm 51 is rotated in the arrow $a_1$ direction in FIG. 17, which is a loading direction of the optical disk 2, and the contact section 61 is brought into contact with the optical disk 2 from the side and the front surface side of the optical disk 2.

Figure 18:
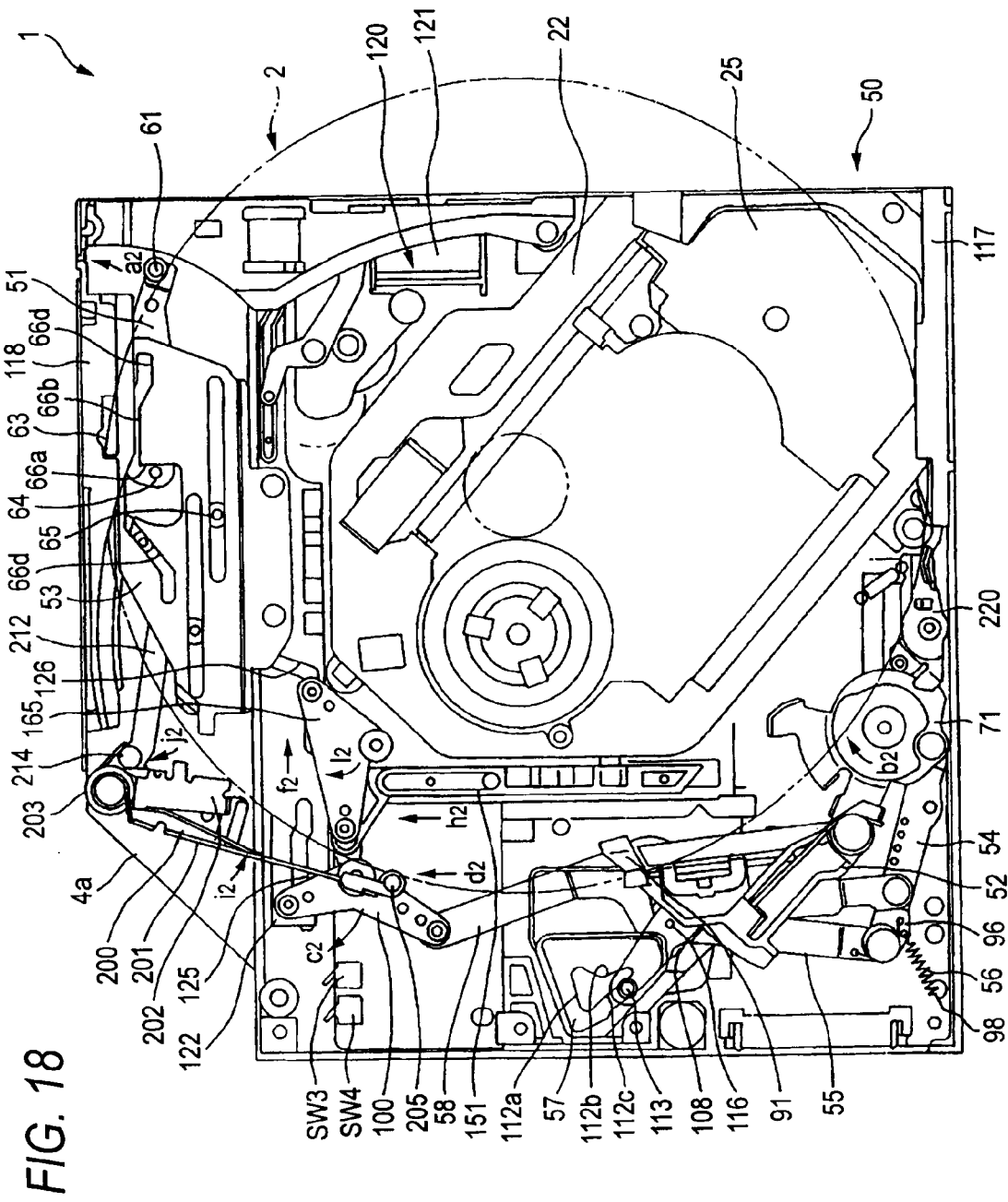
FIG. 18 is a plan view showing the disk drive device that is ejecting the optical disk.

When the loading cam plate 53 is further moved in the arrow $f_2$ direction and the engaging protrusion 64 is moved from the second guide section 66b to the first guide section 66a, as shown in FIG. 18, in the loading arm 51, the contact section 61 is allowed to rotate in the arrow $a_2$ direction as the first guide section 66a is moved in the arrow $f_2$ direction. The eject arm 52 is subjected to the driving force of the driving mechanism 120 to be rotated in an arrow $b_2$ direction for ejecting the optical disk 2. Therefore, the loading arm 51 is pressed by the optical disk 2, which is conveyed in the ejecting direction, to be rotated in the arrow $a_2$ direction.

At this point, the loading arm 51 is rotated while being urged in the arrow $a_1$ direction, which is the inserting direction of the optical disk 2, by the leaf spring 62. Consequently, at the time of ejection of the optical disk 2, the disk conveying mechanism 50 pushes out the optical disk 2 to a predetermined ejecting position while holding the optical disk 2 with the loading arm 51 and the eject arm 52. Thus, the loading arm 51 can prevent the optical disk 2 from suddenly springing out.

When the ejection of the optical disk 2 is finished, as shown in FIG. 11, the engaging protrusion 64 is locked to the side of the loading cam plate 53 opposed to the first guide section 66a of the first cam groove 66. Consequently, the engaging protrusion 64 is regulated from rotating in the arrow $a_1$ direction and the loading arm 51 stands by for insertion of the optical disk 2.

The second cam groove 67 is inserted through the guide protrusion 65 protrudingly provided in the deck section 4a to guide the movement of the loading cam plate 53. The second cam groove 67 is a linear cam groove parallel to the moving direction of the slider 122. Since the guide protrusion 65 slides according to the movement of the slider 122, the second cam groove 67 guides the loading cam plate 53 in the moving direction of the slider 122.

The pair of engaging protrusions 68 engaging with the slider 122 are formed on one side of the loading cam plate 53 to be spaced apart from each other. These engaging protrusions 68 are provided protrudingly downward and extended to the bottom surface side of the bottom case 4 to be engaged with engaging recesses 127 of the slider 122 disposed along a side of the bottom case 4. Consequently, the loading cam plate 53 and the slider 122 are integrated and, according to the movement of the slider 122, the loading cam plate 53 is also slid.

Since the other side on the opposite side of one side on which such engaging protrusions 68 are formed is slidably inserted through a clearance provided between a right guide wall 118 and the deck section 4a, the loading cam plate 53 is prevented from floating from the deck section 4a.

The third cam groove 69 is inserted through the rotation support pin 217 that is vertically provided on the deck section 4a and rotatably supports the regulation arm 212 on the deck section 4a. Like the second cam groove 67, the third cam groove 69 is also a linear cam groove parallel to the moving direction of the slider 122. According to the movement of the slider 122, the third cam groove 69 is slid by the rotation support pin 217 to guide the loading cam plate 53 in the moving direction of the slider 122.

Figure 23:
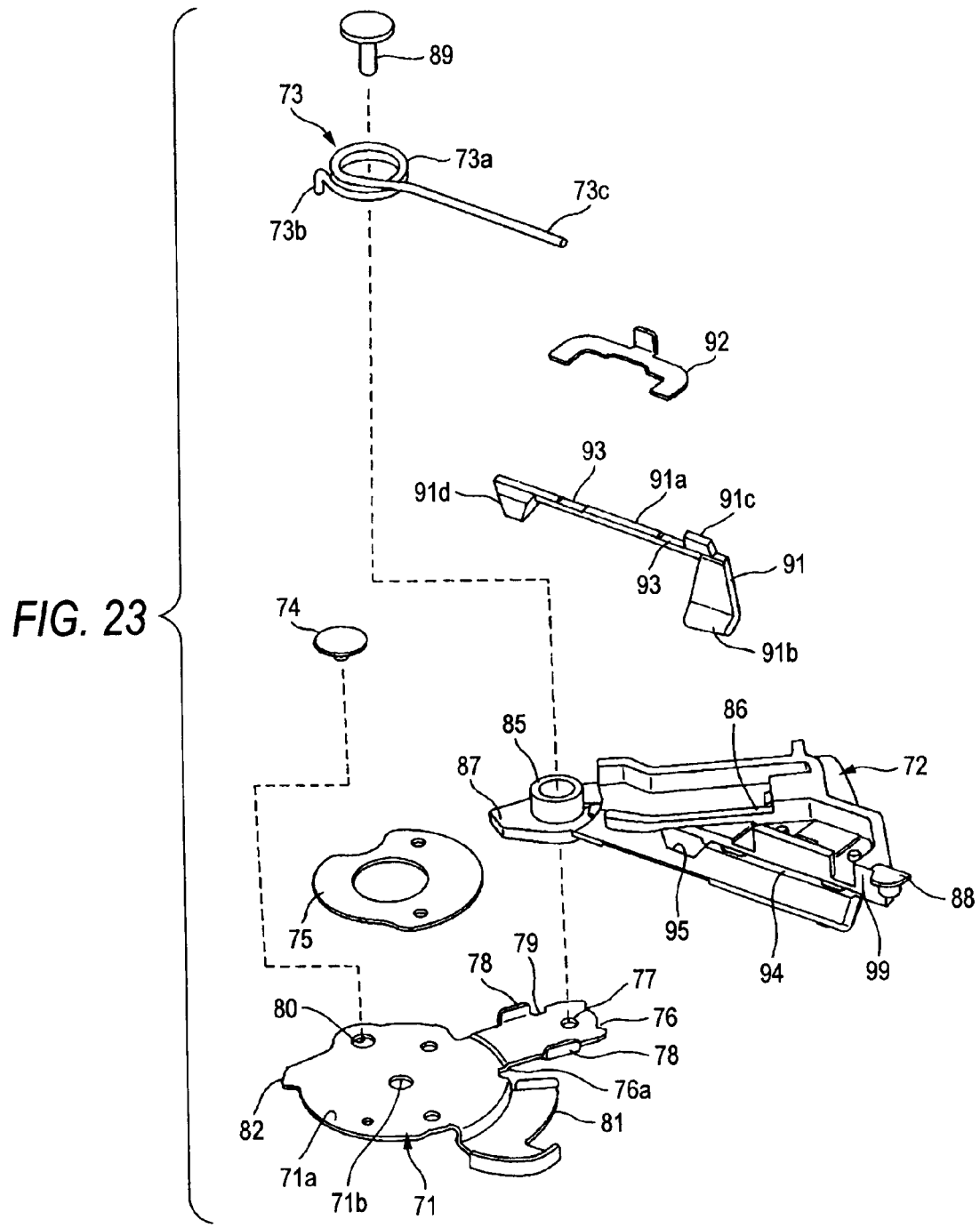
FIG. 23 is a disassembled perspective view showing an eject arm.
Figure 24:
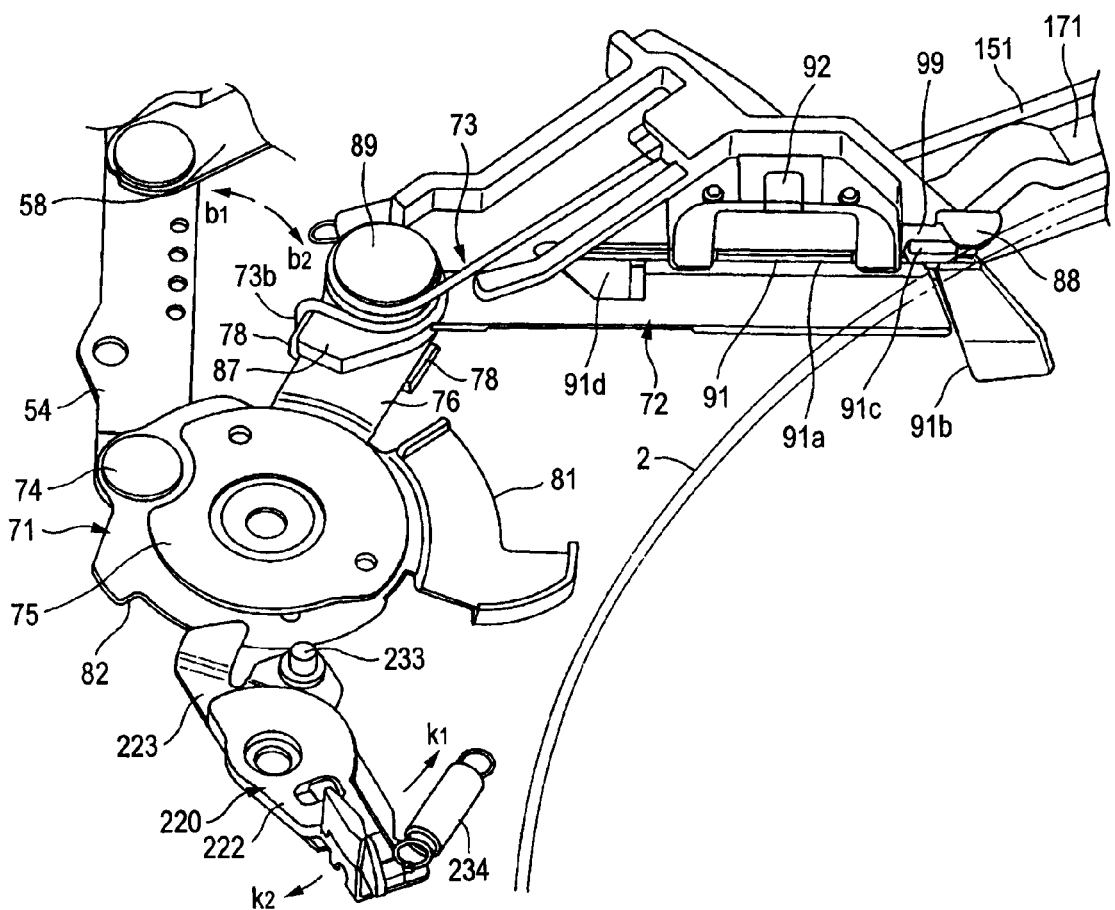
FIG. 24 is a perspective view showing the eject arm.

The eject arm 52 that ejects the optical disk 2 from the disk mounting unit 23 to the outside of the disk slot 19 is disposed on a side on the opposite side of the side on which the loading arm 51 is formed and further on the rear surface side of the housing 3 than the disk mounting unit 23. The eject arm 52 is rotated in an arrow $b_1$ direction in FIG. 11 for conveying the optical disk 2 to the disk mounting unit 23 side and an arrow $b_2$ direction in FIG. 11 for ejecting the optical disk 2 to the disk slot 19 side while being operated by the first and the second link arms 54 and 55 and the operation arm 58 described later. As shown in FIGS. 23 and 24, the eject arm 52 includes the rotation support member 71 rotatably supported on the main chassis 6, a push-out arm 72 that is rotatably engaged with the rotation support member 71 and pushes out the optical disk 2, and a coil spring 73 that urges the push-out arm 72 in the ejecting direction of the optical disk 2.

The rotation support member 71 is made of a sheet metal of a substantially circular shape and rotatably attached to the upper surface 6a of the main chassis 6 from the opposite side of the disk conveyance area of the upper surface 6a. An attaching port 71b for attachment to the main chassis 6 is drilled in substantially the center of a principal surface 71a of the rotation support member 71. A spacer 75 is disposed between the rotation support member 71 and the main chassis 6. The rotation support member 71 is rotatably attached to the main chassis 6 via this spacer 75.

In the rotation support member 71, an engaging piece 76 with which the push-out arm 72 and the coil spring 73 are engaged is formed. The engaging piece 76 is provided above the principal surface 71*a* by being formed to be bent from a leading end of a vertical wall 76*a* vertically provided from the principal surface 71*a*. The rotation support member 71 is projected to the upper surface 6*a* side from the eject arm opening 6*d* of the main chassis 6. In the engaging piece 76, an opening 77 that is continued from an engaging protrusion 85 of the push-out arm 72 and rotatably caulked by a caulking shaft 89, a pair of rotation regulating walls 78 that regulate a rotation area of the push-out arm 72 when a side of the push-out arm 72 is brought into contact with the rotation regulating walls 78, and an engaging recess 79 to which one arm 73*b* of the coil spring 73 is locked are formed. The rotation regulating walls 78 are formed to rise from both left and right sides of the engaging piece 76. A regulating protrusion 87 formed in the push-out arm 72 is disposed between the rotation regulating walls 78 to regulate the rotation area of the push-out arm 72.

In the rotation support member 71, an engaging hole 80 with which the first link arm 54 described later is engaged is formed in the principal surface 71*a*. The engaging hole 80 communicates with a through hole formed at one end 54*a* of the first link arm 54 and rotatably coupled to the first link arm 54 by a screw 74.

In the rotation support member 71, a bent piece 81 is formed from one side portion of the principal surface 71*a*. The bent piece 81 is bent downward from the principal surface 71*a* to be a bumping piece that is bumped against the sub-slider 151 of the base elevating mechanism 150 described later. When the rotation support member 71 is rotated in the arrow $b_1$ direction in FIG. 11 for conveying the optical disk 2 to the disk mounting unit 23 side according to the insertion of the optical disk 2, the rotation support member 71 presses a switch of a first switch SW1 mounted on the circuit board 59. Consequently, the disk drive device 1 can detect that the eject arm 52 pressed by the optical disk 2 has rotated to the rear surface side of the housing 3 and can detect timing for driving the driving mechanism 120.

Moreover, in the rotation support member 71, a rotation piece 82 for rotating the centering guide 220 described later to be spaced apart from the side of the optical disk 2 conveyed to the disk mounting unit 23 is provided. When the optical disk 2 is conveyed to the centering position where it is possible to mount the optical disk 2 on the disk mounting unit 23, the rotation piece 82 is brought into contact with a cam shaft 233 of the centering guide 220 according to the rotation of the rotation support member 71. The rotation piece 82 rotates the centering guide 220 to be spaced apart from the optical disk 2 and allows the optical disk 2 to rotate freely.

The push-out arm 72 rotatably engaged with the engaging piece 76 is a resin molded member formed in a substantially triangular shape. The push-out arm 72 has an engaging protrusion 85 with which the opening 77 of the engaging piece 76 is engaged by insertion, a locking wall 86 to which the other arm 73*c* of the coil spring 73 is locked, and a support section 88 that supports the side on the insertion end side of the optical disk 2. The engaging protrusion 85 is a hollow cylindrical body formed at one vertex of the substantial triangle. A hollow portion communicates with the opening 77 drilled in the engaging piece 76 of the rotation support member 71 and is inserted through a cylindrical section 73*a* of the coil spring 73 and caulked with the engaging piece 76 by the caulking shaft 89. Consequently, the push-out arm 72 is allowed to rotate freely with the engaging protrusion 85 as a fulcrum on the engaging piece 76.

The engaging protrusion 85 is inserted through the cylindrical section 73*a*, one arm 73*b* is locked to the engaging recess 79 formed in the engaging piece 76, and the other arm 73*c* is locked to the locking wall 86 formed in the push-out arm 72. Consequently, the coil spring 73 engaged with the engaging piece 76 by the caulking shaft 89 together with the push-out arm 72 urges the push-out arm rotatably supported by the engaging piece 76 to rotate in the ejecting direction of the optical disk 2 with the engaging protrusion 85 as a fulcrum.

In the push-out arm 72, the regulating protrusion 87 that determines a rotation area on the engaging piece 76 is formed near the engaging protrusion 85. The push-out arm 72 located between the rotation regulating walls 78 vertically provided in the engaging piece 76 is rotated on the engaging piece 76. Thus, the regulating protrusion 87 is reciprocatingly moved between the rotation regulating walls 78. Therefore, since the regulating protrusion 87 is brought into contact with any one of the rotation regulating walls 78, the rotation area of the push-out arm 72 on the engaging piece 76 is determined.

Figure 25:
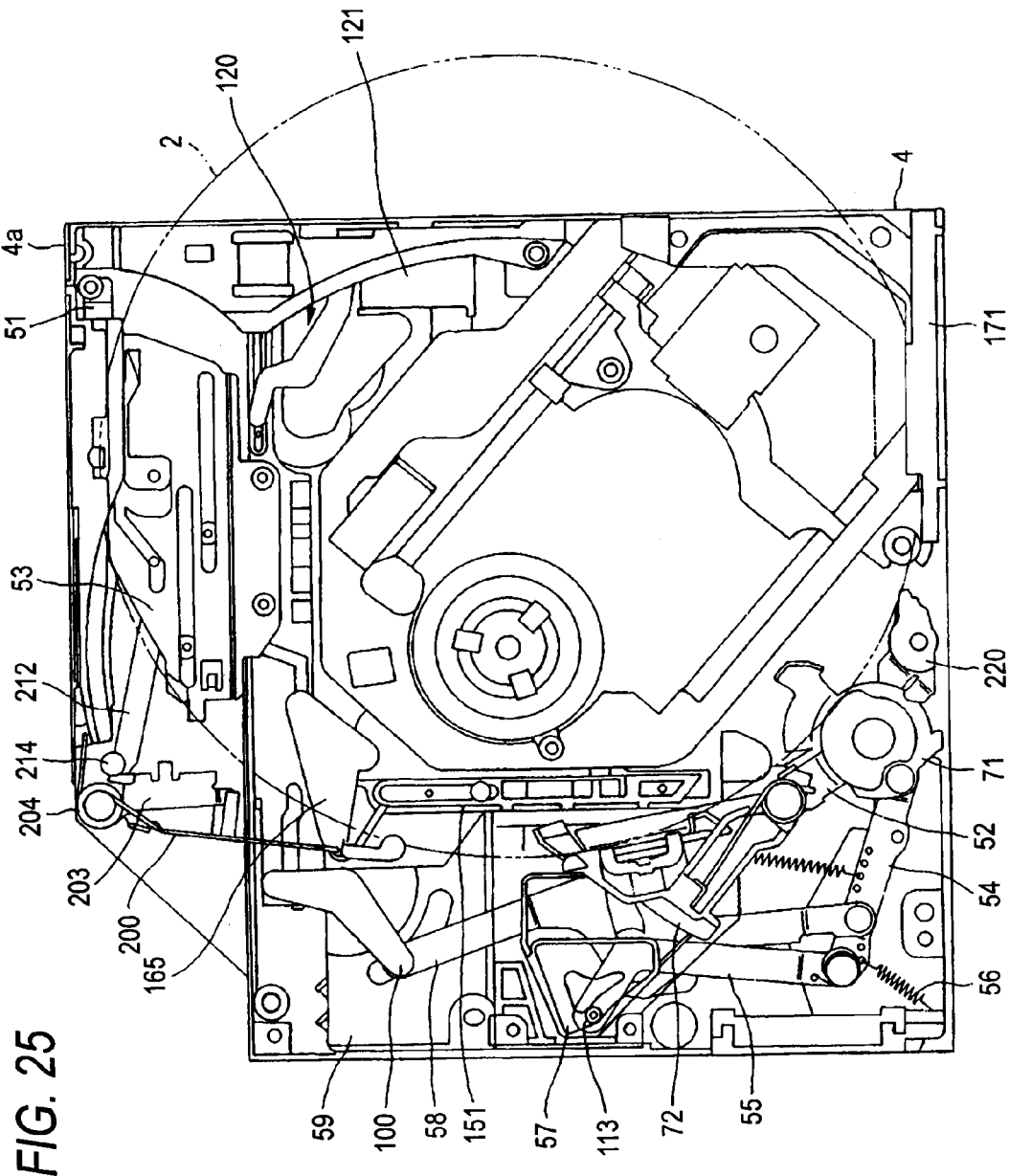
FIG. 25 is a plan view for explaining actions performed by the eject arm when there is an obstacle on a disk conveyance area in the process for ejecting the optical disk.

Such a push-out arm 72 is rotatably engaged with the rotation support member 71 and urged to rotate to the disk slot 19 side with a predetermined spring force by the coil spring 73. Therefore, when the eject arm 52 is rotated in the arrow $b_2$ direction in FIG. 25 for ejecting the optical disk 2 to the outside of the housing 3 by the first link arm 54 and the operation arm 58 subjected to the driving force of the driving mechanism 120 described later, even if a force in the arrow $b_1$ direction acts on the eject arm 52 because of an obstacle on the conveyance area of the optical disk 2, the push-up arm 72 subjected to a force in a direction opposite to the ejecting direction of the optical disk 2 is rotated in the arrow $b_1$ direction against the urging force of the coil spring 73 with the opening 77 of the rotation support member 71 as a fulcrum. Consequently, it is possible to prevent a situation in which a driving force for rotating the eject arm 52 in the arrow $b_2$ direction and a force acting in a direction opposite to the direction of the driving force are opposed to each other. Therefore, an excess load is not applied to the motor and the like of the driving mechanism 120 that drives the first link arm 54 and the operation arm 58 to rotate the eject arm 52 in the arrow $b_2$ direction in FIG. 25. Further, since the optical disk 2 is held by the urging force in the ejecting direction by the eject arm 52 and the force acting in the opposite direction, it is possible to prevent the optical disk 2 from being broken.

In the push-out arm 72, as shown in FIGS. 23 and 24, a pickup unit 90 that prevents the optical disk 2 from sinking to the bottom case 4 side is provided at the tip thereof. The pickup unit 90 has a pickup arm 91 that supports the optical disk 2 from below and a pressing member 92 that presses the pickup arm 91 to make it possible to catch the optical disk 2.

The pickup arm 91 has a shaft section 91*a* of a bar shape, a support piece 91*b* that is provided on one end side of the shaft section 91*a* and supports the optical disk 2, a bumping piece 91*c* that is vertically provided near the support piece 91*b* and against which the outer peripheral surface of the optical disk 2 inserted into the housing 3 is bumped, and a sliding piece 91*d* that is provided at the other end of the shaft section 91*a* and slid on the upper surface 6*a* of the main chassis 6 according to the rotation of the eject arm 52 and rotates the shaft section 91*a* in a direction in which the support piece 91*b* rises.

The shaft section 91*a* is formed in a substantially columnar shape. The support piece 91*b* and the bumping piece 91*c* are protrudingly provided on one end side of the shaft section 91*a* and the sliding piece 91*d* is protrudingly provided on the other end side thereof. The shaft section 91*a* is rotatably supported by a bearing section 94 formed in the push-out arm 72. The support piece 91*b* supports the outer circumference on the insertion end side of the optical disk 2 inserted while being inclined to the bottom case 4 side to prevent collision with the optical pickup 25 and the like and return the optical disk 2 to the regular conveyance area. The support piece 91*b* is formed in a substantially rectangular plate shape, reduced in thickness to a leading end side in the longitudinal direction, and provided with a slope. When the bumping piece 91*c* is bumped against the outer peripheral surface of the optical disk 2, since the bumping piece 91*c* is supported by a support wall 99 vertically provided in the push-out arm 72, the rotation of the shaft section 91*a* is regulated. The bumping piece 91*c* is vertically provided in a direction substantially orthogonal to an extending direction of the support piece 91*b* from the shaft section 91*a*. When the bumping piece 91*c* is supported by the support wall 99, the support piece 91*b* is rotated onto the regular conveyance area of the optical disk 2. Since the sliding piece 91*d* is provided protrudingly from the shaft section 91*a*, the sliding piece 91*d* is exposed to a lower surface side of the push-out arm 72 from an opening 95 drilled in the push-out arm 72. The sliding piece 91*d* rotates the support piece 91*b* to the regular conveyance area of the optical disk 2 and holds the support piece 91*b* in the regular conveyance area by sliding on the upper surface of the main chassis 6.

Pressed sections 93 pressed by the pressing member 92 are formed in the shaft section 91*a*. Since the shaft section 91*a* is provided in a substantially D shape in section, the pressed sections 93 are planarized and pressed by the pressing member 92 formed in a flat shape. The pressing member 92 that presses the pressed sections 93 is a leaf spring member formed in a substantially C shape and is attached to the push-out arm 72. Thus, the pressing member 92 typically urges the shaft section 91*a* to rotate such that the support piece 91*b* of the pickup arm 91 is inclined downward. At this point, since the pressing member 92 presses flat portions of the pressed sections 93 formed in the substantially D shape in section, the pressing member 92 can surely urges the pickup arm 91 to rotate such that the support piece 91*b* faces downward. Consequently, the sliding piece 91*d* of the pickup arm 91 is projected to the lower surface side of the push-out arm 72 from the opening 95 formed in the push-out arm 72 and the push-out arm 72 is rotated to the rear surface side of the housing 3. Thus, the sliding piece 91*d* is allowed to come into contact with the edge section 17 of the main chassis 6.

In a state in which such a pickup arm 91 is put on standby for insertion of the optical disk 2, such the eject arm 52 is rotated to the front surface side of the housing 3. Thus, since the sliding piece 91*d* is spaced apart from the edge section 17 of the main chassis 6 and the shaft section 91*a* is urged by the pressing member 92, the support piece 91*b* is inclined downward. When the optical disk 2 is inserted, since the outer peripheral surface of the optical disk 2 is bumped against the bumping piece 91*c*, the shaft section 91*a* is rotated against the urging force of the pressing member 92 and the support piece 91*b* is lifted to the top cover 5 side. Consequently, the pickup arm 91 is rotated to the rear surface side of the housing 3 while supporting the lower surface side of the optical disk 2 with the support piece 91*b*. Thereafter, when the push-out arm 72 rotates on the upper surface of the main chassis 6, in the pickup arm 91, the sliding piece 91*d* exposed to the lower surface side of the push-out arm 72 from the opening 95 is slid on the upper surface 6*a* from the edge section 17 of the main chassis 6. Thus, a state in which the support piece 91*b* is lifted to the top cover 5 side is held. Therefore, after the optical disk 2 is conveyed to the disk mounting unit 23, even when the push-out arm 72 is spaced apart from the optical disk 2, the support piece 91*b* is rotated to the bottom case 4 side by the urging force of the pressing member 92 and does not slide on the upper surface of the main chassis 6.

When the optical disk 2 is inserted with the insertion end thereof inclined to the bottom case 4 side, the outer peripheral surface on the insertion end side of the optical disk 2 is supported by the support piece 91*b* rotated to the bottom case 4 side in the insertion standby state. Thus, it is possible to prevent a situation in which the optical disk 2 collides with the other components disposed on the bottom case 4 side, for example, the turntable 23*a* and the optical pickup 25.

When the optical disk 2 is inserted in the inclined state, the eject arm 52 and the push-out arm 72 are rotated in the arrow $b_1$ direction. Thus, in the pickup arm 91, since the sliding piece 91*d* is brought into contact with the edge section 17 of the main chassis 6, the shaft section 91*a* is rotated against the urging force of the pressing member 92 and the support piece 91*b* is rotated to the top cover 5 side. A rotation area of the support piece 91*b* is regulated when the bumping piece 91*c* provided in the shaft section 91*a* is supported by the support wall 99 vertically provided in the push-out arm 72. Since the support piece 91*b* is rotated, the outer circumference of the optical disk 2 is bumped against the bumping piece 91*c*. Consequently, the pickup arm 91 can return the optical disk 2 inserted while being inclined to the bottom case 4 side to the regular conveyance area.

In the push-out arm 72, a support section 88 that holds the outer circumference of the optical disk 2 in conjunction with the support piece 91*b* is protrudingly provided near the support piece 91*b* of the pickup arm 91. The support section 88 is extended in a direction same as the direction of the support piece 91*b* from a leading end of a vertical wall vertically provided from the principal surface of the push-out arm 72. The push-out arm 72 receives the side on the insertion end side of the optical disk 2 with the bumping piece 91*c* and the vertical wall of the support section 88 and holds the insertion end side of the optical disk 2 with the support section 88 and the support piece 91*b*. When the optical disk 2 is inserted and drawn in, the push-out arm 72 is rotated to the rear surface side of the housing 3. When the optical disk 2 is ejected, the push-out arm 72 pushes out the optical disk 2 to the front surface side of the housing 3.

A distance between the support section 88 and the support piece 91*b* rotated onto the regular conveyance area is formed slightly larger than the thickness of the optical disk 2. Thus, the support section 88 does not hold the optical disk 2 firmly. Therefore, the eject arm 52 can prevent inclination of the optical disk 2 with the support section 88 and the support piece 91*b* according to the rotation in the arrow $b_1$ direction and the arrow $b_2$ direction and smoothly release the optical disk 2 and hold the optical disk 2 at the time of ejection.

A push-out arm and a pickup unit related to the eject arm 52 may be formed as described below.

Figure 26:
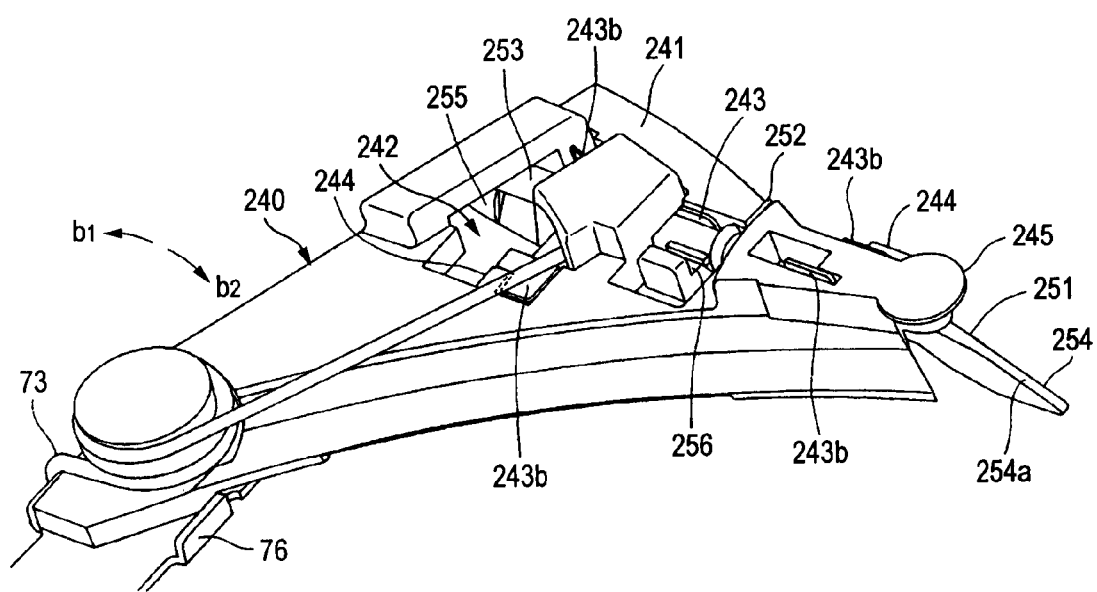
FIG. 26 is a perspective view showing another eject arm.
Figure 27:
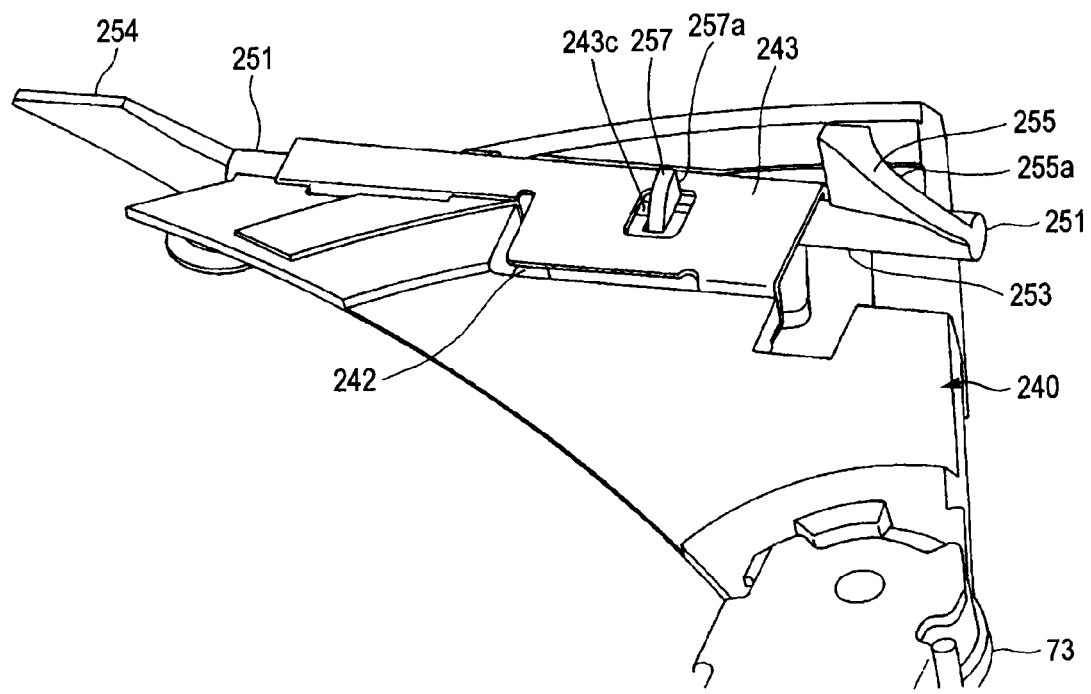
FIG. 27 is a perspective view showing the another eject arm from a rear surface side thereof.

As shown in FIGS. 26 and 27, like the push-out arm 72 attached to the eject arm 52, a second push-out arm 240 is rotatably attached to the opening 77 drilled in the engaging piece 76 of the rotation support member 71 and is urged to rotate in the arrow $b_2$ direction in FIG. 26, which is the ejecting direction of the optical disk 2, by the coil spring 73. The second push-out arm 240 is a resin molded member formed in a substantially triangular shape. In the second push-out arm 240, a pickup support section 241 in which a second pickup unit 250 is provided on an opposite side of a vertex supported by the engaging piece 76 and a holding piece 245 that holds the side on the insertion end side of the optical disk 2 in conjunction with the pickup arm 251 of the second pickup unit 250 are formed.

The pickup support section 241 includes a housing recess 242 in which the pickup arm 251 is rotatably housed and locking sections 244 to which a support plate 243 that supports the pickup arm 251 in the housing recess 242 is locked. The housing recess 242 is provided along one side of the second push-out arm 240 according to the pickup arm 251 of a bar shape and intermittently supports an upper part of the pickup arm 251 along the longitudinal direction. Plural locking pieces 243b formed in the support plate 243 are locked to the locking sections 244. Thus, the locking sections 244 lock the support plate 243 to the pickup support section 241 from a rear surface side of the housing recess 242.

Figure 28:
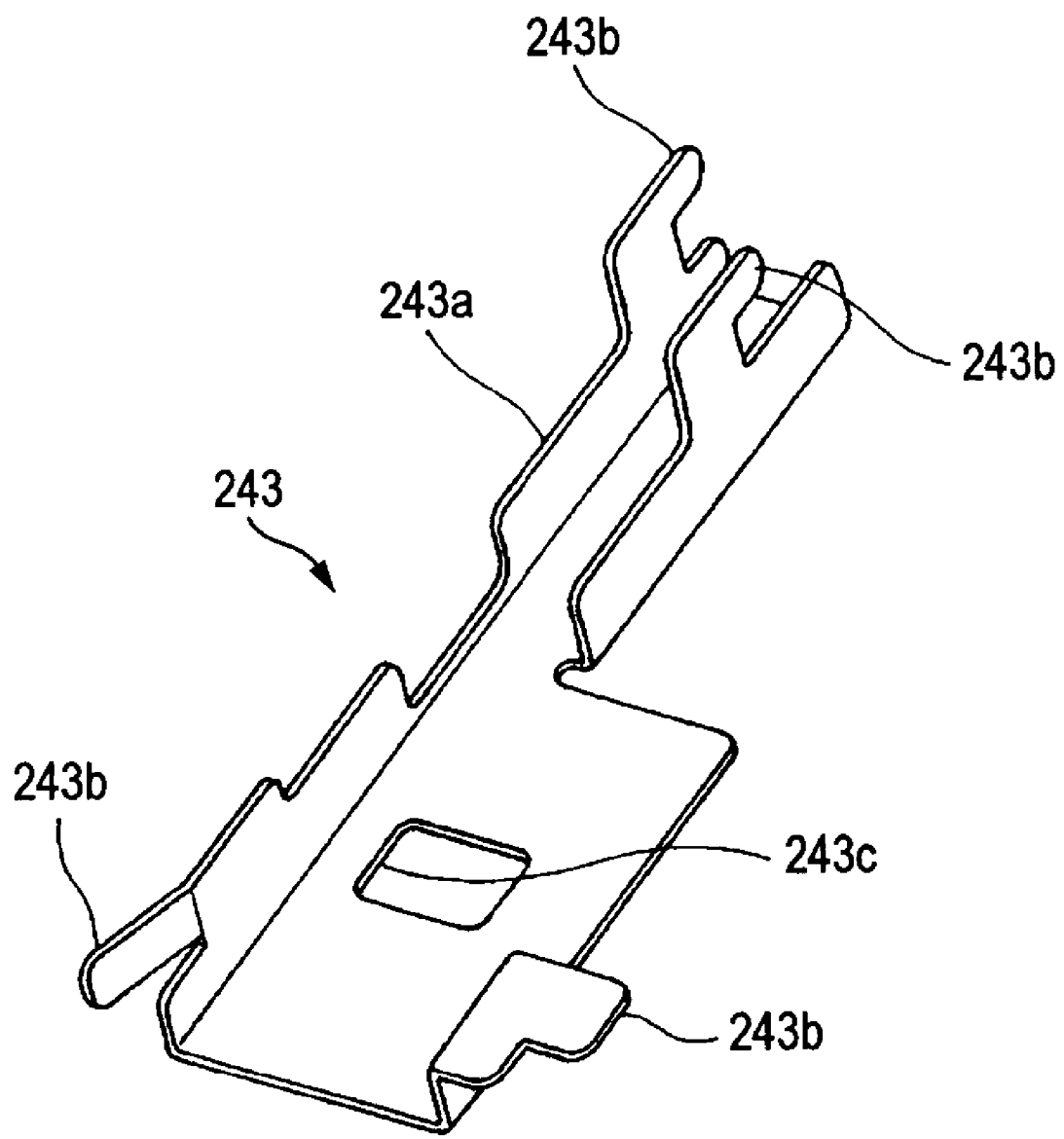
FIG. 28 is a perspective view showing a support plate used in the another eject arm.

The support plate 243 is locked to the pickup support section 241 from a rear surface side of the second push-out arm 240 to rotatably support the pickup arm 251 on the pickup support section 241. As shown in FIG. 28, the support plate 243 includes a housing section 243a that is obtained by forming a metal plate in a substantially C shape and houses the pickup arm 251 and the plural locking pieces 243b locked to the plural locking sections 244 provided in the pickup support section 241. Since the pickup arm 251 is housed in the housing section 243a and the locking pieces 243b are locked to the locking sections 244, the support plate 243 is prevented from falling from the pickup support section 241. A locking hole 243c that regulates a rotation range of the pickup roller 251 is drilled in the support plate 243. A locking protrusion 257 protrudingly provided in the pickup arm 251 is inserted through this locking hole 243c and an locking surface 257a of this locking protrusion 257 is locked to the locking hole 243c. Consequently, it is possible to determine a rotation range of the support section 254 of the pickup roller 251.

Like the support section 88 of the push-out arm 72, the holding piece 245 holds the outer circumference of the optical disk 2 in conjunction with the pickup arm 251. The holding piece 245 is formed to be extended in a direction same as the direction of the support section 254 of the pickup arm 251 from a leading end of a vertical wall vertically provided from a principal surface of the second pushup arm 240.

Figure 29A:
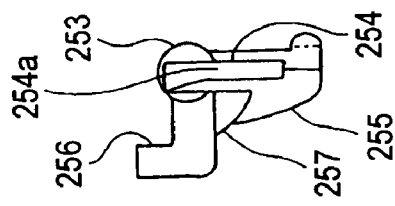
FIGS. 29A to 29C are diagrams showing a pickup arm of a second pickup unit.
Figure 29B:
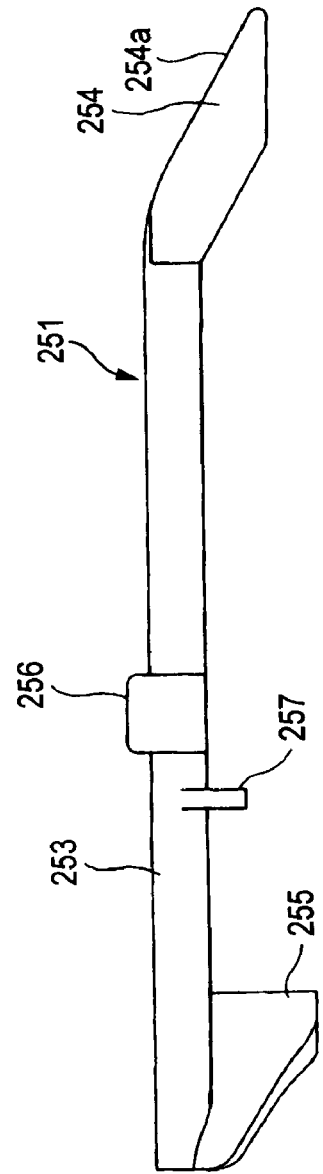
Figure 29C:
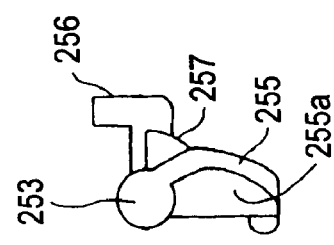

As shown in FIGS. 26 and 27, the second pickup unit 250 includes the pickup arm 251 and a coil spring 252 that urges to rotate this pickup arm 251. The pickup arm 251 supports the outer circumference of the optical disk 2 obliquely inserted to prevent collision of the optical disk 2 with the optical pickup 25 and the like and guide the optical disk 2 to the regular conveyance area. As shown in FIGS. 29A to 29C, the second pickup unit 250 includes an arm main body 253 of a columnar shape, the support section 254 that is formed at a leading end of the arm main body 253 and supports the outer circumference of the optical disk 2, a sliding section 255 that is formed at a rear end of the arm main body 253 and slides on the upper surface 6a of the main chassis 6 to rotate the arm main body 253, a spring locking section 256 that is provided protrudingly from an outer circumference of the arm main body 253 and to which one end of the coil spring 252 is locked, and the locking protrusion 257 that is provided protrudingly from the outer circumference of the arm main body 253 and inserted through the locking hole 243c of the support plate 243.

The arm main body 253 is housed in the housing recess 242 provided in the second push-out arm 240 and rotatably held by the housing section 243a of the support plate 243. The spring locking section 256 and the locking protrusion 257 are protrudingly provided on the outer circumference of the arm main body 253.

The support section 254 formed at the leading end of the arm main body 253 is formed in a flat shape as a whole. As shown in FIG. 29A, the support section 254 is formed to be in an acute shape toward a tip thereof in a side view. In a state of standby for insertion of the optical disk 2, the support section 254 is supported with a principal surface 254a thereof set in a direction substantially orthogonal to the principal surface of the optical disk 2. At this point, since the principal surface 254a is inclined to the bottom case 4 side, when the optical disk 2 is inserted while being inclined to the bottom case 4 side, the support section 254 can support the side on the insertion end side of the optical disk 2.

In the sliding section 255 formed at the rear end of the arm main body 253, a vertical wall including a curved surface is vertically provided from the arm main body 253. As shown in FIG. 29C, a side of the sliding section 255 brought into contact with the edge section 17 of the main chassis 6 when the eject arm 52 is rotated in the arrow $b_1$ direction is formed as a curved surface 255a. When the eject arm 52 is rotated in the arrow $b_1$ direction, the sliding unit 255 is brought into contact with the edge section 17 of the main chassis 6 to rotate the arm main body 253 and the support section 254. The sliding section 255 comes into contact with the main chassis 6 and the arm main body 253 rotates. Thus, in the support section 254, the principal surface 254a rotated in the direction substantially orthogonal to the principal surface of the optical disk 2 becomes substantially parallel to the principal surface of the optical disk 2.

A winding section is inserted through the coil spring 252, which urges to rotate the pickup arm 251, by the arm main body 253. The coil spring 252 is locked to a principal surface of the second push-out arm 240 at one end and locked to the spring locking section 256 provided in the arm main body 253 of the pickup arm 251 at the other end. The coil spring 252 is locked to the push-out arm 240 at one end and locked to the spring locking section 256 of the pickup arm 251 at the other end to urge to rotate the pickup arm 251.

Figure 30:
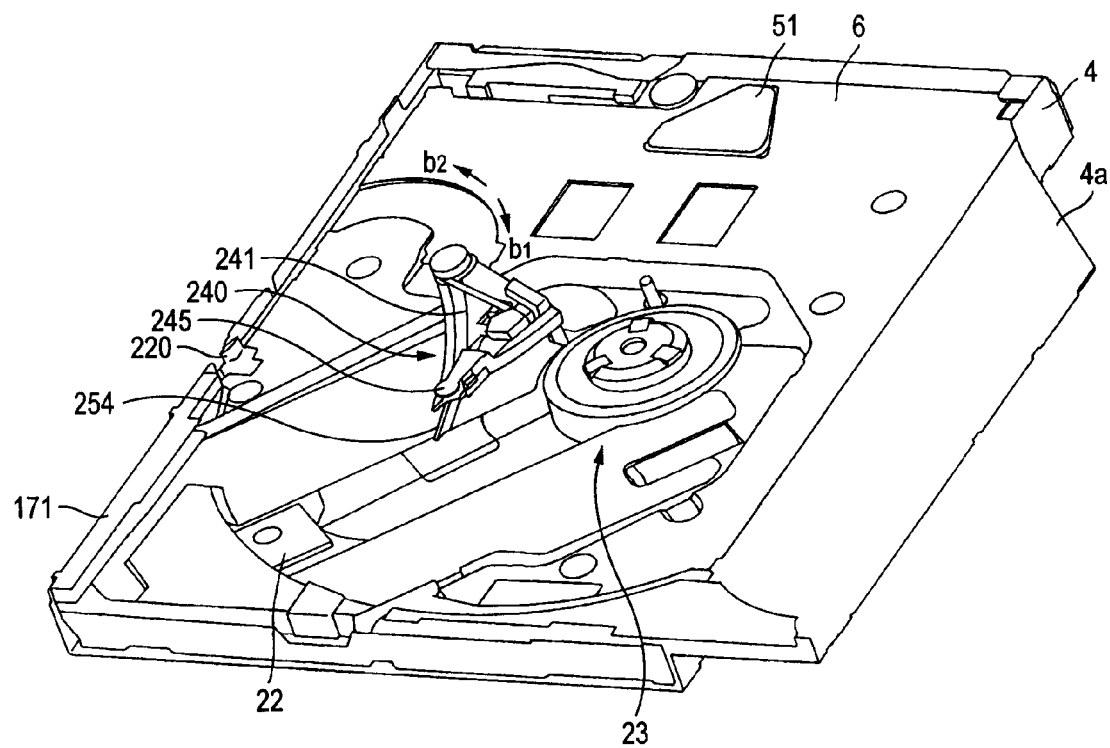
FIG. 30 is a perspective view showing a disk drive device including the another eject arm.

Since the arm main body 253 is housed in the housing recess 242 of the second push-out arm 240 and the locking protrusion 257 is inserted through the locking hole 243c of the support plate 243 attached from the rear surface side of the second push-out arm 240, the pickup arm 251 is supported by the pickup support section 241 of the second push-out arm 240. At this point, in the pickup arm 251, since the spring locking section 256 urged by the coil spring 252 is brought into contact with a principal surface of the support plate 243, the principal surface 254a of the support section 254 is held to be set in the direction substantially orthogonal to the principal surface of the optical disk 2. As shown in FIG. 30, the support section 254 is put on standby for insertion of the optical disk 2 in a state in which the principal surface 254a is inclined to the bottom case 4 side.

Figure 31:
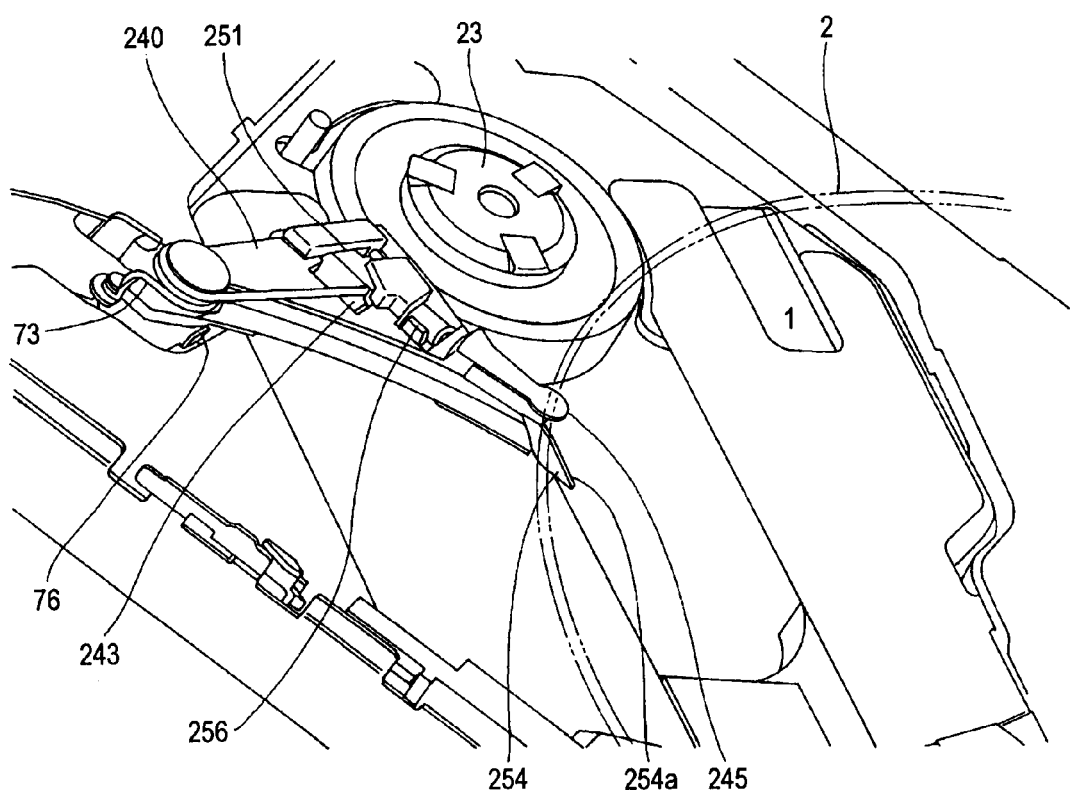
FIG. 31 is a perspective view showing a second push-out arm that is supporting the optical disk in the second pickup unit.

When the optical disk 2 is inserted into the housing 3, the side on the insertion end side of the optical disk 2 comes into contact with the vertical wall on which the holding piece 245 is provided and the second push-out arm 240 is rotated to in the arrow $b_1$ direction. At this point, as shown in FIG. 31, when a leading end of the optical disk 2 is inserted while being inclined to the bottom case 4 side, the leading end of the optical disk 2 is supported by the support section 254. Therefore, even when the optical disk 2 is inserted while being inclined to the bottom case 4 side, it is possible to prevent the outer circumference of the optical disk 2 from colliding with the turntable 23a, the optical pickup 25, and the like of the base unit 22 disposed in the bottom case 4. The outer circumference on the insertion end side of the optical disk 2 is guided by the principal surface 254a of the support section 254 to be moved to the regular conveyance area.

Figure 32:
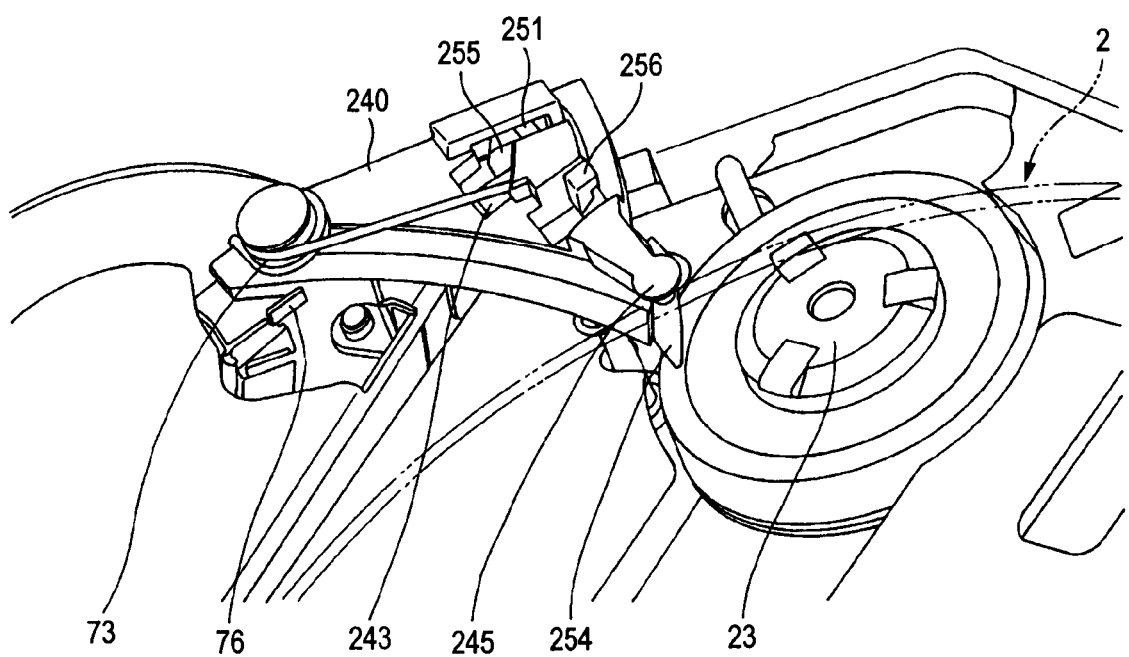
FIG. 32 is a perspective view showing the second push-out arm that is guiding the optical disk in the second pickup unit.

When the eject arm 52 is rotated in the arrow $b_1$ direction in a state in which the optical disk 2 is supported by the support unit 254, in the pickup arm 251, since the curved surface 255a of the sliding section 255 is brought into contact with the edge section 17 of the main chassis 6, the arm main body 253 is rotated against an urging force of the coil spring 252. Consequently, as shown in FIG. 32, the support section 254 is rotated from the state in which the principal surface thereof is set in the direction substantially orthogonal to the principal surface of the optical disk 2 to a state in which the principal surface thereof is substantially parallel to the principal surface of the optical disk 2. The support section 254 guides the optical disk 2 inserted in the inclined state to the regular conveyance area and holds the optical disk 2 in conjunction with the holding piece 245 vertically provided in the second push-out arm 240.

In the process for drawing in the optical disk 2, when the eject arm 52 is further rotated in the arrow $b_1$ direction, in the pickup arm 251, since the sliding section 255 slides on the upper surface 6a of the main chassis 6, the support section 254 is moved while the state in which the principal surface thereof is substantially parallel to the principal surface of the optical disk 2 is maintained. Therefore, the pickup arm 251 is rotated to the rear surface side of the housing 3 at the time of insertion and the draw-in and pushes out the optical disk 2 to the front surface side of the housing 3 at the time of ejection while holding the optical disk 2 in conjunction with the holding piece 245.

A distance between the holding piece 245 and the support section 254 rotated onto the regular conveyance area is formed slightly larger than the thickness of the optical disk 2. Thus, the holding piece 245 does not hold the optical disk 2 firmly. Therefore, the eject arm 52 can prevent inclination of the optical disk 2 with the holding piece 245 and the support section 254 according to the rotation in the arrow $b_1$ direction and the arrow $b_2$ direction and smoothly release the optical disk 2 and hold the optical disk 2 at the time of ejection.

The first link arm 54 rotatably engaged with the rotation support member 71 of the eject arm 52 will be explained. The first link arm 54 is operated by the operation arm 58 described later to rotate the eject arm 52 in the arrow $b_1$ direction or the arrow $b_2$ direction in FIG. 11, which is the inserting direction or the ejecting direction of the optical disk 2. The first link arm 54 is made of a metal plate formed in a substantially rectangular shape. An end 54a in the longitudinal direction thereof is rotatably engaged in the engaging hole 80 of the rotation support member 71 and the other end 54b in the longitudinal direction thereof is rotatably engaged with the second link arm 55. A locking section 96 to which one end of the helical tension spring 56 laid over between the first link arm 54 and the main chassis 6 is locked is formed at the other end. The other end 58b of the operation arm 58 is attached to substantially the middle in the longitudinal direction.

The first link arm 54 may lock an urging coil spring 97 between the first link arm 54 and the loop cam 57. The urging coil spring 97 is provided for a case in which, in the process for ejecting the optical disk 2, the power of the slider 122 is not sufficiently transmitted to the rotation support member 71 of the eject arm 52 via the first link arm 54. The urging coil spring 97 rotates the eject arm 52 to the ejecting position for the optical disk 2.

The urging coil spring 97 is locked to a loop cam plate 111 of the loop cam 57 at one end and attached to substantially the middle of the first link arm 54 at the other end. Consequently, the urging coil spring 97 urges the rotation support member 71 to rotate in the arrow $b_2$ direction in FIG. 19 via the first link arm 54 in the process for ejecting the optical disk 2. Therefore, the eject arm 52 can convey the optical disk 2 to the predetermined ejecting position. In the disk conveying mechanism 50, the urging coil spring 97 is not essential and is used as an auxiliary. In the disk conveying mechanism 50, usually, the eject arm 52 is rotated in the arrow $b_2$ direction according to a slide action of the slider 122 rather than the urging force of the urging coil spring 97 to convey the optical disk 2 to the predetermined ejecting position.

The helical tension spring 56 locked to the locking section 96 formed at the tip of the first link arm 54 urges to rotate the eject arm 52 in the arrow $b_2$ direction FIG. 11, which is the ejecting direction of the optical disk 2 via the first link arm 54 to give an urging force in the ejecting direction to the eject arm 52 at the time of insertion of the optical disk 2. In other words, when the eject arm 52 is rotated in the arrow $b_1$ direction according to the insertion of the optical disk 2, one end 54a of the first link arm 54 coupled to the rotation support member 71 is also rotated in the arrow $b_1$ direction. At this point, since one end locked to the locking section 98 of the main chassis 6 and one end locked to the locking section 96 of the first link arm 54 are spaced apart, the helical tension spring 56 locked to the locking section 96 of the first link arm 54 is extended. Therefore, since one end 54a of the first link arm 54 and the rotation support member 71 locked to the first link arm 54 are drawn back in a direction opposite to the arrow $b_1$ direction by the urging force of the helical tension spring 56, the eject arm 52 gives an urging force in the arrow $b_2$ direction, which is the ejecting direction of the optical disk 2, to the optical disk 2 at a predetermined force.

Consequently, when the user inserts the optical disk 2, the disk drive device 1 can cause the user to insert the optical disk 2 while giving the urging force in the arrow $b_2$ direction opposite to the inserting direction t the optical disk 2 with the eject arm 52. Therefore, even if the user stops the insertion of the optical disk 2 halfway, it is possible to push back the optical disk 2 to the ejecting position and prevent a situation in which the optical disk 2 is left in a halfway position in the housing 3.

When the optical disk 2 is inserted into the hosing 3 to some degree, the driving mechanism 120 described later is driven and the operation for drawing in the optical disk 2 by the loading arm 51 is performed. The first link arm 54 is moved by the operation arm 58 subjected to the driving force of the driving motor 121. Thus, the urging force in the arrow $b_2$ direction by the helical tension spring 56 does not act on the eject arm 52. At the time of ejection of the optical disk 2, the first link arm 54 is guided to prevent the locking section 96 and the locking section 98 of the main chassis 6 from being spaced apart. Thus, the helical tension spring 56 is not extended and the urging force in the ejecting direction does not act on the eject arm 52 and the optical disk 2.

Figure 33:
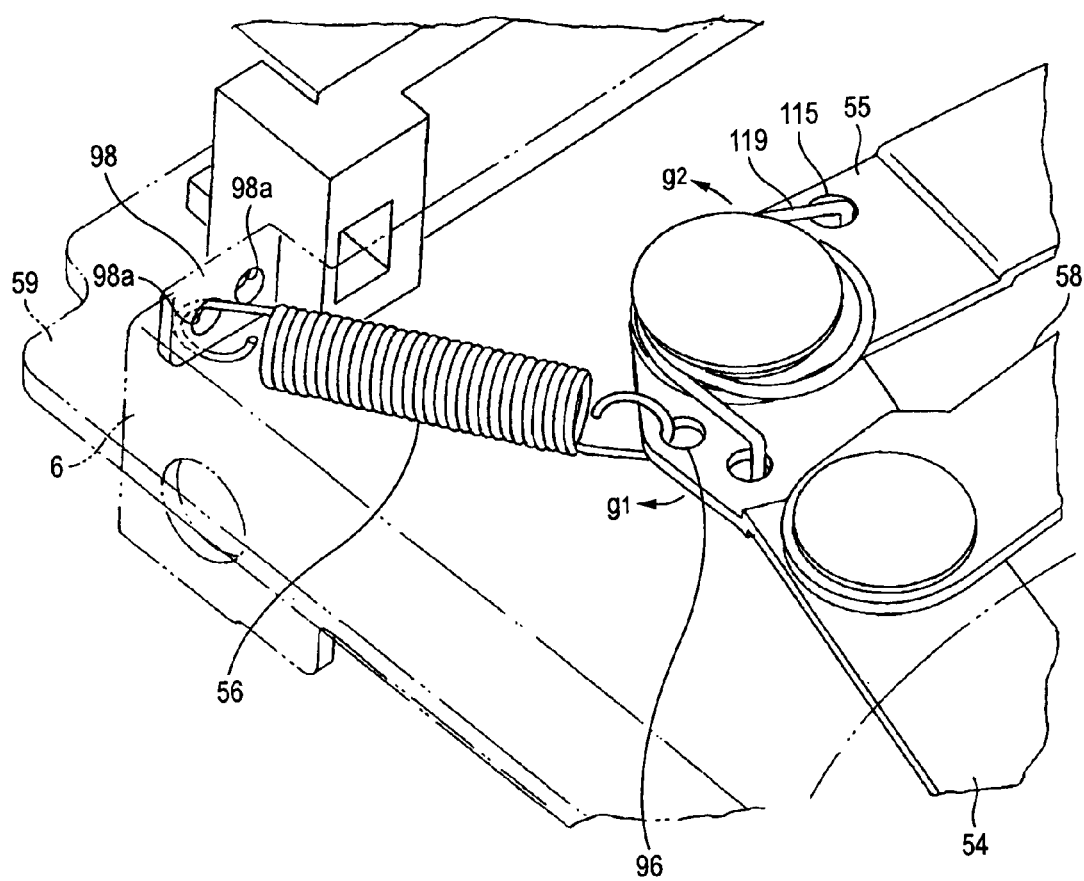
FIG. 33 is a perspective view showing a locking unit that is provided in the main chassis and locks one end of a helical tension spring.

In the locking section 98 of the main chassis 6 to which the helical tension spring 56 is locked between locking section 98 and the locking section 96 of the first link arm 54, as shown in FIG. 33, plural locking holes 98a are formed. It is possible to change the locking holes 98a to change an extension length of the helical tension spring 56 at the time of insertion of the optical disk 2 and change the urging force in the ejecting direction. It is also possible to form plural locking holes in the locking section 96 formed in the first link arm 54. It is also possible to form plural locking holes in both the locking section 96 and the locking section 98.

It is possible to adjust the extension length of the helical tension spring 56 by providing the plural locking holes in the locking sections 96 and 98 of the first link arm 54 and/or the main chassis 6. It is possible to cause a desired ejecting force simply by changing a locking position to the locking holes without preparing plural helical tension springs 56 having different capacities. It is also possible to change the urging force in the ejecting direction of the eject arm 52 by the helical tension spring 56 by preparing plural helical tension springs having different capacities. However, since it is necessary to prepare plural kinds of helical tension springs, the number of components increases and management of components by a service department is complicated. Therefore, it is possible to eliminate a burden of using the plural kinds of helical tension springs by forming plural locking holes in the locking sections 96 and 98 of the first link arm 54 and the main chassis 6.

The second link arm 55 rotatably locked to the other end 54b of the first link arm 54 is made of a sheet metal of a long shape. The guide protrusion 113 guided by a guide groove 114 of the loop cam 57 is protrudingly provided at one end 55a and a locking hole rotatably locked to the other end 54b of the first link arm 54 is formed at the other end 55b. Since the guide protrusion 113 is guided by the loop cam 57, the second link arm 55 controls a distance between the locking section 96 of the first link arm 54 and the locking section 98 of the main chassis 6.

In the second link arm 55, an engaging protrusion 116 engaged in a cam groove 108 formed in the operation arm 58 described later is formed. Since the engaging protrusion 116 of the second link arm 55 is engaged in the cam groove 108, the disk conveying mechanism 50 can rotate the eject arm 52 according to the movement of the slider 122 and can stably eject the optical disk 2 to the predetermined ejecting position.

When the panel curtains provided in the disk slot 19 of the front panel 18 come into slide contact with the optical disk 2 and a load is applied to the optical disk 2 during ejection of the optical disk 2, the rotation support member 71 of the eject arm 52 and the first link arm 54 are urged in the arrow $b_1$ direction. When the second link arm 55 and the operation arm 58 are not locked to the engaging protrusion 116, even if the operation arm 58 is moved in an arrow $d_2$ direction according to the slide in the arrow $f_2$ direction of the slider 122, the first link arm 54 simply rotates in the arrow $d_2$ direction with respect to the rotation support member 71 with the engaging hole 80 as a fulcrum. The first link arm 54 may be unable to move the eject arm 52 in the arrow $b_2$ direction. The second link arm 55 simply rotates with respect to the first link arm 54.

On the other hand, when the second link arm 55 is engaged with the operation arm 58 by the engaging protrusion 116, according to the movement in the arrow $d_2$ direction of the operation arm 58, the engaging protrusion 116 is brought into contact with a sidewall of the cam groove 108 and the second link arm 55 may be unable to freely rotate with respect to the first link arm 54. In other words, since the engaging protrusion 116 of the second link arm 55 is brought into contact with the sidewall of the cam groove 108, the rotation in the arrow $d_2$ direction of the first link arm 54 is regulated. Therefore, during ejection of the optical disk 2, even if the eject arm 52 is urged in the arrow $b_1$ direction, when the operation arm 58 is moved in the arrow $d_2$ direction, the first link arm 54 is moved in the arrow $d_2$ direction against the urging force in the arrow $b_1$ direction and rotates the eject arm 52 in the arrow $b_2$ direction. Consequently, rotation in the arrow $b_2$ direction of the eject arm 52 corresponding to a slide amount in the arrow $f_2$ direction of the slider 122 is realized and the eject arm 52 can surely eject the optical disk 2 to the predetermined ejecting position.

In the second link arm 55, a locking hole 115 is formed at an end thereof engaged with the first link arm 54. A helical torsion spring 119 is locked to the locking hole 115. The helical torsion spring 119 is locked to the first link arm 54 at one end and locked to the locking hole 115 of the second link arm 55 at the other end. The helical torsion spring 119 urges to rotate the first link arm 54 and the second link arm 55 in a direction in which an angle formed by the first link arm 54 and the second link arm 55 increases, i.e., arrows $g_1$ and $g_2$ directions in FIG. 33 in which the first link arm 54 and the second link arm 55 move away from each other. Consequently, in the second link arm 55, the guide protrusion 113 can overcome a projection 112e provided in the loop cam 57 described later and can be guided from a draw-in guide wall 112b to an ejection guide wall 112c.

Figure 34A:
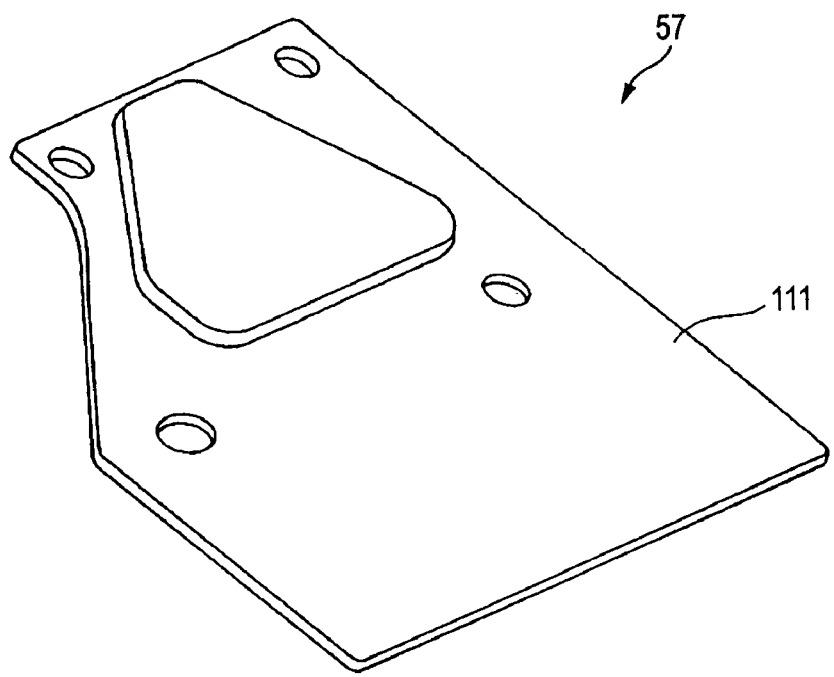
FIG. 34A is a perspective view showing a loop cam plate viewed from the side of a surface for attachment to the main chassis.
Figure 34B:
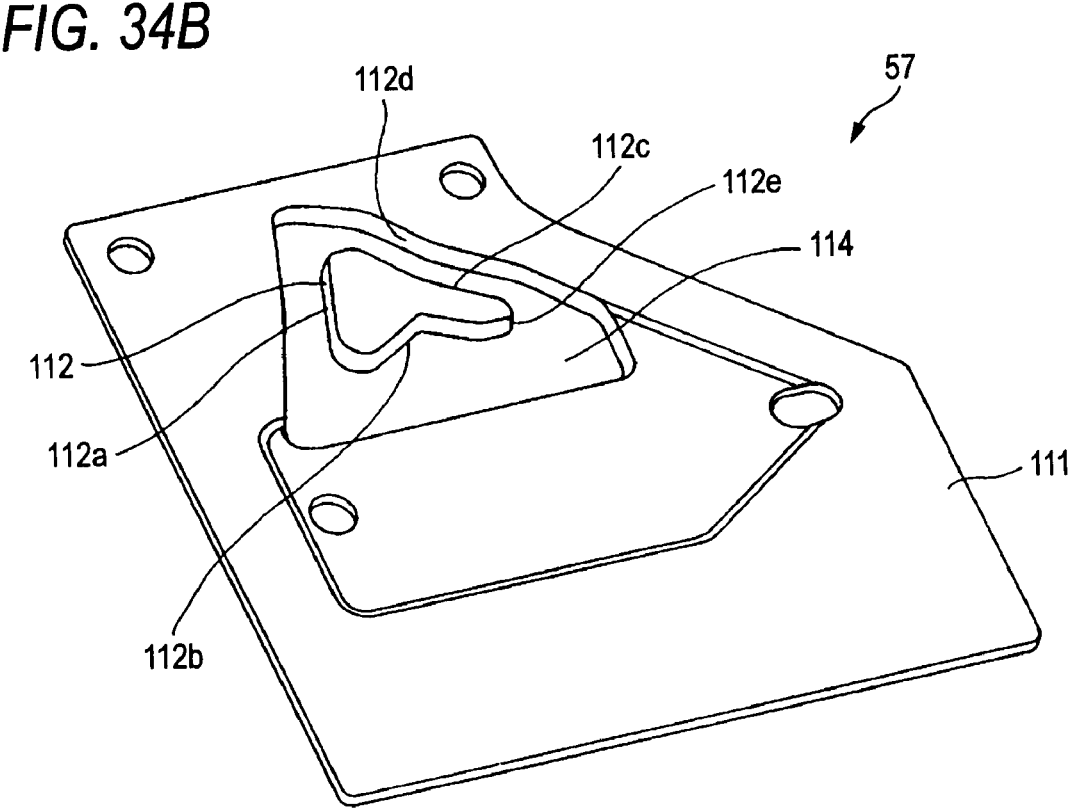
FIG. 34B is a perspective view showing the loop cam plate viewed from the side of a surface in which a guide groove is formed.

The loop cam 57 that guides the movement of the guide protrusion 113 of the second link arm 55 has an insertion guide section that guides the first and the second link arms 54 and 55 to generate an urging force in the ejecting direction of the eject arm 52 at the time of insertion of the optical disk 2 and a draw-in guide section and an ejection guide section that guide the first and the second link arms 54 and the 55 not to generate an urging force in the ejecting direction of the eject arm 52 at the time of draw-in and ejection of the optical disk 2. These guide sections are continuously formed in an annular shape. As shown in FIGS. 34A and 34B, the loop cam 57 is formed in the loop cam plate 111 of a substantially tabular shape. The loop cam plate 111 is attached to the side on the bottom case 4 side of the upper surface 6a of the main chassis 6. A cam wall 112 of a substantially annular shape is vertically provided toward the bottom case 4 side on the loop cam plate 111. The guide protrusion 113 of the second link arm 55 turns around the cam wall 112 in the operations of insertion, draw-in, and ejection of the optical disk 2. In the cam wall 112, an insertion guide wall 112a on which the guide protrusion 113 slides at the time of insertion of the optical disk 2, a draw-in guide wall 112b on which the guide protrusion 113 slides at the time of draw-in of the optical disk 2, and an ejection guide wall 112c on which the guide protrusion 113 slides at the time of ejection of the optical disk 2 are continued in an annular shape. These guide walls are surrounded by an outer periphery 112d to form the guide groove 114 of an annular shape in which the guide protrusion 113 moves. In the loop cam 57, a projection 112e that prevents backward movement of the guide protrusion 113 is formed between the draw-in guide wall 112b and the ejection guide wall 112c.

As shown in FIG. 11, the insertion guide wall 112a is formed in a front surface direction of the housing 3 toward the right guide wall 118 side, the draw-in guide wall 112b is formed from the right guide wall 118 side to the left guide wall 117 side, and the ejection guide wall 112c is formed in a rear surface direction of the housing 3 from the left guide wall 117 side to the right guide wall 118 side.

The operation arm 58 that is coupled to the first link arm 54 and the driving mechanism 120 and operates the eject arm 52 is made of a metal plate of a long shape. One end 58a in the longitudinal direction thereof is rotatably engaged with a third link arm 100 coupled to the slider 122 of the driving mechanism 120 and the other end 58b thereof is rotatably engaged with the first link arm 54. In the operation arm 58, the cam groove 108 through which the engaging protrusion 116 formed in the second link arm 55 is inserted is formed in the center in the longitudinal direction.

As described above, the cam groove 108 is engaged with the engaging protrusion 116 of the second link arm 55 to rotate the eject arm 52 according to the slide motion of the slider 122. The cam groove 108 is formed in a long hole shape such that the engaging protrusion 116 is movable when the second link arm 55 turns around the loop cam 57. The cam groove 108 is formed over a direction substantially orthogonal to the arrow $d_1$ direction and the arrow $d_2$ direction in FIG. 11, which is a moving direction of the operation arm 58. Consequently, since the engaging protrusion 116 is brought into contact with the sidewall of the cam groove 108, the operation arm 58 can regulate the rotation of the second link arm 55 and can regulate the rotation in the arrow $d_2$ direction of the first link arm 54.

According to the slide action of the slider 122, the operation arm 58 is moved in the arrow $d_1$ direction and the arrow $d_2$ direction in FIG. 11, which is a substantial left to right direction, via the third link arm 100 and rotates the first link arm 54 and the eject arm 52. Specifically, when the operation arm 58 is moved in the arrow $d_1$ direction in FIG. 11 by the third link arm 100, the operation arm 58 presses the first link arm 54 in the same direction to rotate the eject arm 52 in the arrow $b_1$ direction in FIG. 11, which is the inserting direction of the optical disk 2. When the operation arm 58 is moved in the arrow $d_2$ direction in FIG. 11 by the third link arm 100, the operation arm 58 moves the first link arm 54 in the same direction to rotate the eject arm 52 in the arrow $b_2$ direction in FIG. 11, which is the ejecting direction of the optical disk 2.

The third link arm 100 rotatably engaged with one end 58a of the operation arm 58 is made of a metal plate of a substantially L shape. Since a bent section 100a is rotatably attached to the main chassis 6, the third link arm 100 is supported rotatably in an arrow $c_1$ direction and an arrow $c_2$ direction in FIG. 11. An engaging protrusion 109 formed at one end 100b extended from the bent section 100a is engaged with the slider 122 and the other end 100c is rotatably engaged with the operation arm 58. Consequently, when the slider 122 is subjected to the driving force of the driving motor 121 of the driving mechanism 120 and conveyed in the arrow $f_1$ direction in FIG. 11, the third link arm 100 is guided by a first guide groove 125 formed in the slider 122 and rotated in the arrow $c_1$ direction in FIG. 11 to move the operation arm 58 in the arrow $d_1$ direction in the figure. When the slider 122 is conveyed in the arrow $f_2$ direction in FIG. 11, the third link arm 100 is guided by the first guide groove 125 and rotated in the arrow $c_2$ direction in the figure to move the operation arm 58 in the arrow $d_2$ direction in the figure.

The left and the right guide walls 117 and 118 disposed on both the left and the right sides of the disk conveyance area guide insertion and ejection of the optical disk 2 when the side of the optical disk 2 is slid on the guide walls. The left and the right guide walls 117 and 118 are formed of synthetic resin or the like softer than the optical disk 2. The right guide wall 118 is disposed on the deck section 4a and the left guide wall 117 is disposed on the main chassis 6. Both the guide walls are fixed by screws, an adhesive tape, or the like.

In the left and the right guide walls 117 and 118, sidewalls 117a and 118a are vertically provided. The sidewalls 117a and 118a are provided in positions a predetermined clearance apart from the side of the optical disk 2 conveyed to the centering position and do not come into contact with the side of the optical disk 2 driven to rotate.

Operations from insertion to ejection of the optical disk 2 by the disk conveying mechanism 50 constituted as described above will be explained. A conveyance state of the optical disk 2 is monitored by detecting depression states of first to fourth switches SW1 to SW4 mounted on the circuit board 59. As shown in FIG. 11, the first switch SW1 is disposed in a rotation area of the rotation support member 71 of the eject arm 52. When the first switch SW1 is depressed by the bent piece 81 formed in the rotation support member 71 according to the rotation of the eject arm 52, H/L is switched. As shown in FIG. 11, the second to the fourth switches SW2 to SW4 are arrayed on a moving area of the slider 122. When the slider 122 is slid in the arrow $f_1$ direction or the arrow $f_2$ direction, H/L is sequentially switched.

The disk drive device 1 monitors depression states and time of depression of the first to the fourth switches SW1 to SW4 with a microcomputer to detect a conveyance state of the optical disk 2 and drives the driving motor 121, the spindle motor 24a, and the displacement driving mechanism 36 that moves the optical pickup 25, and the like.

Before insertion of the optical disk 2, as shown in FIG. 11, the slider 122 is slid in the arrow $f_2$ direction to the disk slot 19 side. Consequently, the loading arm 51 stays such that the engaging protrusion 64 is locked to the side opposed to the first guide section 66a formed in the first cam groove 66 of the loading cam plate 53 and the contact section 61 is rotated to and held in a position retracted from the conveyance area of the optical disk 2. The third link arm 100 engaged with the slider 122 is rotated in the arrow $c_2$ direction in FIG. 11. Consequently, the eject arm 52 rotated by the operation arm 58 and the first link arm 54 is rotated in the arrow $b_2$ direction in FIG. 11. Since the slider 122 is slid in the arrow $f_2$ direction, the sub-slider 151 is slid in an $h_2$ direction in the figure. Consequently, the sub-chassis 29 constituting the base unit 22 is lowered to the bottom case 4 side and retracted from the conveyance area of the optical disk 2.

Figure 12:
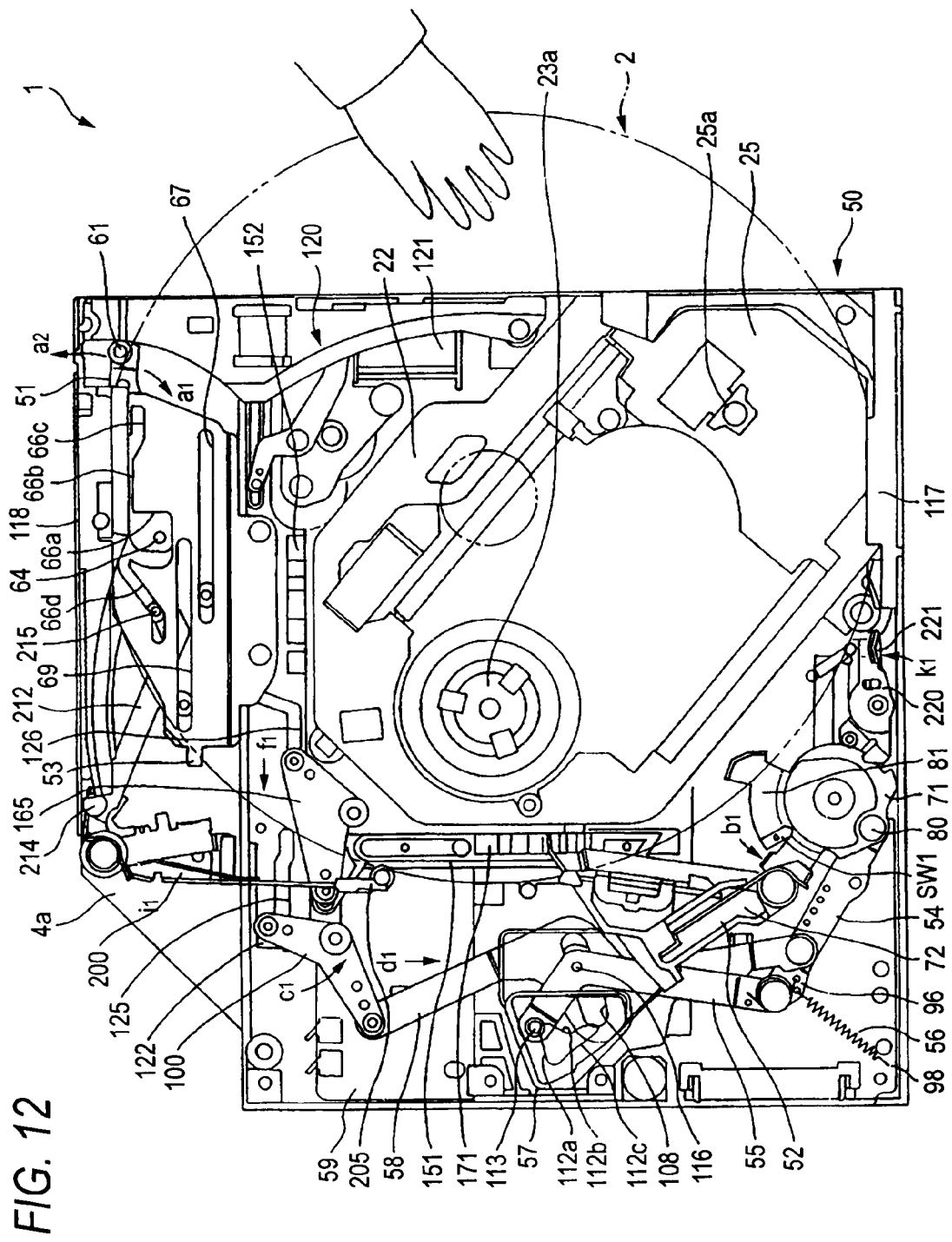
FIG. 12 is a plan view showing the disk drive device that is transitioning from an insertion operation to a draw-in operation.

When the optical disk 2 is inserted from the disk slot 19 by the user, the support section 88 of the eject arm 52 is pressed against an insertion end face of the optical disk 2. As shown in FIG. 12, the eject arm 52 is rotated in the arrow $b_1$ direction in FIG. 12. At this point, in the eject arm 52, the rotation support member 71 is rotated in the arrow $b_1$ direction with the attaching port 71b as a fulcrum. Thus, one end 54a of the first link arm 54 engaged with the rotation support member 71 is moved in the same direction. On the other hand, in the second link arm 55 engaged with the first link arm 54, since the first link arm 54 is moved in the arrow $b_1$ direction, the guide protrusion 113 engaged with the guide groove 114 of the loop cam 57 is moved to the front surface side of the housing 3 along the insertion guide wall 112a. Since the insertion guide wall 112a of the loop cam 57 is extended to the front surface side of the housing 3 toward the right guide wall 118 side, when the second link arm 55 is guided by the insertion guide wall 112a, the other end 54b of the first link arm 54 engaged with the second link arm 55 is moved to the right guide wall 118 side and moved in a direction opposite to the direction of one end 54a of the first link arm 54 rotated in the arrow $b_1$ direction together with the rotation support member 71.

In other words, in the first link arm 54, the locking section 96 near the other end 54b engaged with the second link arm 55 is moved in a direction apart from the locking section 98 of the main chassis 6. Therefore, as the optical disk 2 is inserted and the eject arm 52 is rotated in the arrow $b_1$ direction in FIG. 12, the helical tension spring 56 laid over between the first link arm 54 and the main chassis 6 is extended and urges the locking section 96 of the first link arm 54 to be closer to the locking section 98 of the main chassis 6. Since the engaging hole 80 of the rotation support member 71 is rotated to the front surface side of the housing 3, the first link arm 54 is urged by the helical tension spring 56. Consequently, a force to the rear surface side of the housing 3, i.e., an urging force in a direction opposite to the rotating direction of the rotation support member 71 acts on the first link arm 54. Therefore, the eject arm 52 is urged in the arrow $b_2$ direction in FIG. 12, which is the ejecting direction of the optical disk 2.

Consequently, the optical disk 2 is inserted while resisting against the urging force in the ejecting direction acting on the eject arm 52. Thus, even when the insertion of the optical disk 2 is stopped halfway by the user, since the optical disk 3 is ejected to the outside of the housing 3, it is possible to prevent a situation in which the optical disk 2 remains in the housing 3 in a halfway state.

When the optical disk 2 is inserted by the user while resisting the urging force and the eject arm 52 is rotated to a predetermined angle, the first switch SW1 disposed on the circuit board 59 is pressed by the bent piece 81 of the rotation support member 71 and the driving mechanism 120 is started. The driving mechanism 120 is subjected to the driving force of the driving motor 121 to slide the slider 122 in the arrow $f_1$ direction in FIG. 14. Consequently, since the loading cam plate 53 is slid in the same direction together with the slider 122, in the loading arm 51, the engaging protrusion 64 is brought into contact with the first guide section 66a of the cam groove 66. In the loading arm 51, the engaging protrusion 64 is pressed in the arrow $f_1$ direction by the first guide section 66a. Thus, the contact section 61 rotates in the arrow $a_1$ direction in FIG. 14 around the insert-through holes 60 and performs draw-in of the optical disk 2.

When the slider 122 is slid in the arrow $f_1$ direction and the optical disk 2 is conveyed to the centering position located on the disk mounting unit 23 by the loading arm 51, as shown in FIG. 15, the engaging protrusion 64 moves the first cam groove 66 of the loading cam plate 53 from the first guide section 66a to the second guide section 66b. Since the second guide section 66b is formed in parallel to the slide direction of the slider 122, guide operation of the engaging protrusion 64 following the movement of the slider 122 is not performed and the loading arm 51 holds the optical disk 2 in the centering position. In the operation for drawing in the optical disk 2, since the depression states of the first to the fourth switches SW1 to SW4 are detected, it is seen that the base unit 22 is lowered to the chucking release position. Therefore, it is possible to safely convey the optical disk 2.

The optical disk 2 is loaded by the loading arm 51 and guided by the left and the right guide walls 117 and 118. Further, the optical disk 2 is brought into contact with the deck arm 200 and the centering guide 220 described later to be centered on the disk mounting unit 23.

When the slider 122 is slid in the arrow $f_1$ direction, the third link arm 100 is guided by the first guide groove 125 of the slider 122 and rotated in the arrow $c_1$ direction in FIG. 14. The operation arm 58 engaged with the third link arm 100 is moved in the arrow $d_1$ direction in the figure. Therefore, the first link arm 54 engaged with the other end 58b of the operation arm 58 is pressed by the operation arm 58 and moved in the arrow $d_1$ direction.

As shown in FIG. 12, when the eject arm 52 is rotated to a start position of the driving mechanism 120, the guide protrusion 113 of the second link arm 55 is allowed to move from the insertion guide wall 112a of the loop cam 57 to the draw-in guide wall 112b. Thus, when the first link arm 54 is moved in the arrow $d_1$ direction by the operation arm 58, the second link arm 55 is moved in the same direction. The first link arm 54 and the second link arm 55 are moved in the arrow $d_1$ direction. Thus, in the first link arm 54, the locking section 96 formed at the other end 54b is brought close to the locking section 98 formed in the main chassis 6 and the helical tension spring 56 contracts. Therefore, in the operation for drawing in the optical disk 2, the urging force in the arrow $b_2$ direction acting on the eject arm 52 gradually disappears. The eject arm 52 is rotated in the arrow $b_1$ direction by the operation arm 58 subjected to the driving force of the driving mechanism 120.

Thus, the disk conveying mechanism 50 can smoothly perform the operation for drawing in the optical disk 2 by the loading arm 51 without being hindered by the urging force in the ejecting direction acting on the eject arm 52 and without applying a load to the optical disk 2.

The second link arm 55 is urged to rotate in the arrow $g_2$ direction by the helical torsion spring 119 locked between the second link arm 55 and the first link arm 54. Thus, when the guide protrusion 113 is moved to a boundary between the draw-in guide wall 112b and the ejection guide wall 112c, the guide protrusion 113 can easily overcome the projection 112e provided in this boundary and does not move backward to the draw-in guide wall 112b side at the time of ejection of the optical disk 2.

In the eject arm 52, since the first link arm 54 is moved in the arrow $d_1$ direction by the operation arm 58 and the guide protrusion 113 of the second link arm 55 is moved in the arrow $d_1$ direction while being guided by the draw-in guide wall 112b, the urging force of the helical tension spring 56 disappears. The optical disk 2 is drawn in to the rear surface side of the housing 3 by the loading arm 51. Thus, the push-out arm 72 and the rotation support member 71 are rotated in the arrow $b_1$ direction in FIG. 12.

When the slider 122 is slid in the arrow $f_1$ direction, since a coupling arm 165 engaged with the slider 122 is rotated, the sub-slider 151 is also slid in an arrow $h_1$ direction in FIG. 15. After centering of the optical disk 2 is realized, the base unit 22 is lifted from the chucking release position to the chucking position by the slider 122 and the sub-slider 151. Consequently, the optical disk 2 conveyed to the centering position is held in the periphery of the center hole 2a by the turntable 23a and the contact protrusion 8 formed around the opening 7 of the top plate section 5a and chucked to the turntable 23a.

At this point, depression states of the first to the fourth switches SW1 to SW4 are detected. Thus, it is seen that the base unit 22 is lifted to the chucking position and it is seen that the optical disk 2 is chucked to the turntable 23a.

When the slider 122 moves in the arrow $f_1$ direction and the sub-slider 151 is further slid in the arrow $h_1$ direction, the base unit 22 is lowered from the chucking position to the recording and reproducing position. At this point, depression states of the first to the fourth switches SW1 to SW4 are detected. Thus, it is seen that the base unit 22 is lowered to the recording and reproducing position.

When the optical disk 2 is chucked to the turntable 23a, the third link arm 100 is further rotated in the arrow $c_1$ direction by the slider 122 slid in the arrow $f_1$ direction and the operation arm 58 is further moved in the arrow $d_1$ direction. Consequently, the eject arm 52 is rotated in the arrow $b_1$ direction via the first link arm 54. A contact protrusion 168 at a leading end of the sub-slider 151 is bumped against the bent piece 81 of the rotation support member 71 and the rotation support member 71 is rotated in the arrow $b_1$ direction. Therefore, in the eject arm 52, the support section 88 of the push-out arm 72 is spaced apart from the optical disk 2. Since the eject arm 52 is rotated in the arrow $b_1$ direction, the rotation piece 82 formed in the rotation support member 71 presses the centering guide 220 urged to rotate onto the disk conveyance area and spaces apart the centering guide 220 from the side of the optical disk 2. Moreover, since the slider 122 is slid in the arrow $f_1$ direction, the engaging protrusion 64 is moved from the second guide section 66b to the third guide section 66c of the loading cam plate 53. Thus, the loading arm 51 is rotated in the arrow $a_2$ direction in FIG. 16 and the contact section 61 is spaced apart from the side of the optical disk 2. Moreover, according to depression by the loading cam plate 53, the deck arm 200 that realizes the centering of the optical disk 2 is spaced apart from the side of the optical disk 2.

Consequently, the optical disk 2 is released from the various arms and the centering guide 220 and allowed to rotate freely and stands by for recording or reproducing operation by the user.

The sub-slider 151 is moved in the arrow $h_1$ direction. Thus, as shown in FIG. 16, the tip thereof is bumped against the bent piece 81 of the rotation support member 71 and regulates the rotation in the arrow $b_2$ direction of the rotation support member 71. Consequently, it is possible to prevent a situation in which the rotation support member 71 is rotated in the arrow $b_2$ direction and the push-out arm 72 and the centering guide 220 come into contact with the optical disk 2 that is being driven to rotate.

In a process for loading the optical disk 2 by the disk drive device 1, so-called double chucking for, after the optical disk 2 is chucked to the turntable 23a, driving the spindle motor 24a to rotate the optical disk 2 by half and reversely rotating the driving motor 121 to lift the base unit 22 to the chucking position again is performed. Consequently, it is possible to prevent a situation in which the optical disk 2 is recorded and reproduced while the optical disk 2 is kept engaged with the turntable 23a halfway.

When the recording and reproducing operation is finished and operation for ejecting the optical disk 2 is performed by the user, first, the driving motor 121 of the driving mechanism 120 is reversely rotated and the slider 122 is slid in the arrow $f_2$ direction in FIG. 17. Consequently, since the engaging protrusion 64 moves from the third guide section 66c to the second guide section 66b of the loading cam plate 53, the loading arm 51 is rotated in the arrow $a_1$ direction in FIG. 17 and the contact section 61 is brought into contact with the side of the optical disk 2.

After the sub-slider 151 is slid in the arrow $h_2$ direction in the figure and the pressing on the rotation support member 71 is released, the third link arm 100 is rotated in the arrow $c_2$ direction by the slider 122 and the operation arm 58 is moved in the arrow $d_2$ direction. Consequently, since the other end 54b of the first link arm 54 is also moved in the arrow $d_2$ direction, in the eject arm 52, the rotation support member 71 engaged with one end 54a of the first link arm 54 is rotated in the arrow $b_2$ direction and the contact section 61 of the put-out arm 72 is brought into contact with the side of the optical disk 2. Here, since the guide protrusion 113 of the second link arm 55 is moved to the ejection guide wall 112c side of the loop cam 57, the eject arm 52 is rotated without the locking section 96 of the first link arm 54 and the locking section 98 of the main chassis 6 being spaced apart from each other. An urging force in the ejecting direction by the helical tension spring 56 is not generated.

Moreover, according to the movement of the slider 122 in the arrow $f_2$ direction, the loading cam plate 53 is moved in the same direction. Thus, the deck arm 200 pressed against the loading cam plate 53 is also brought into contact with the side of the optical disk 2.

Subsequently, the slider 122 is further slid in the arrow $f_2$ direction and the sub-slider 151 is slid in the $h_2$ direction in FIG. 17. Thus, the base unit 22 is lowered from the recording and reproducing position to the chucking release position. Consequently, the optical disk 2 is pushed up by a guide pin 180 vertically provided from the bottom case 4 and the chucking to the turntable 23a is released. The guide pint 180 for releasing the chucking of the optical disk 2 will be described later.

AT this point, depression states of the first to the fourth switches SW1 to SW4 are detected. Thus, it is seen that the base unit 22 is lowered to the chucking release position and it is seen that it is possible to safely eject the optical disk 2.

Therefore, the third link arm 100 engaged with the slider 122 slides in the first guide groove 125 of the slider 122 to be further rotated in the arrow $c_2$ direction. Thus, the operation arm 58 is further moved in the arrow $d_2$ direction. As shown in FIG. 18, according to the movement of the operation arm 58 in the arrow $d_2$ direction, the first link arm 54 is moved in the same direction. Then, the eject arm 52 is rotated in the arrow $b_2$ direction in FIG. 18 according to an amount of movement of the operation arm 58 and ejects the optical disk 2.

At this point, the engaging protrusion 64 is engaged in the first cam groove 66 of the loading cam plate 53. Thus, the loading arm 51 is allowed to rotate according to only the slide of the loading cam plate 53 and regulated from rotating freely. The loading cam plate 53 is slid in the arrow $f_2$ direction in FIG. 18 together with the slider 122. Thus, the engaging protrusion 64 is guided from the second guide section 66b to the first guide section 66a. The loading arm 51 is regulated from rotating in the arrow $a_2$ direction by the first guide section 66a. However, since the optical disk 2 is ejected to the front surface side of the housing 3 by the eject arm 52 and the first guide section 66a moves to the front surface side of the housing 3 according to the slide of the slider 122, the loading arm 51 is allowed to rotate in the arrow $a_2$ direction. Thus, the loading arm 51 does not hinder ejection of the optical disk 2 by the eject arm 52.

In this way, since the engaging protrusion 64 is brought into contact with the first guide section 66a, the loading arm 51 is regulated from rotating in the arrow $a_2$ direction, which is the ejecting direction of the optical disk 2. The loading arm 51 is allowed to rotate in the arrow $a_2$ direction according to the slide of the slider 122 and the rotation of the eject arm 52. Thus, the loading arm 51 can prevent the optical disk 2 from suddenly springing out from the disk slot 19 according to urging in the ejecting direction by the deck arm 200.

Moreover, the loading arm 5 is typically urged in the arrow $a_1$ direction for urging the optical disk 2 into the housing 3 by the leaf spring 62 fixed to the deck section 4a. Therefore, when the loading arm 51 is rotated to a position where the engaging protrusion 64 is brought into contact with the first guide section 66a, the loading arm 51 is urged in the arrow $a_1$ direction by the leaf spring 62. Thus, when the optical disk 2 is moved in the ejecting direction by the eject arm 52 and the deck arm 200, the loading arm 51 gives an urging force in the inserting direction to the optical disk 2 and prevents the optical disk 2 from springing out. Since the urging force by the leaf spring 62 is very weak compared with a rotating force in the ejecting direction of the eject arm 52, the urging force does not hinder ejection of the optical disk 2 by the eject arm 52 and does not give an excessive load to the optical disk 2.

Since the first link arm 54 is moved in the arrow $d_2$ direction by the operation arm 58, in the second link arm 55, the guide protrusion 113 slides in an area surrounded by the ejection guide wall 112c and the outer peripheral wall 112d of the loop cam 57. At this point, the rotation support member 71 of the eject arm 52 is also rotated in the arrow $b_2$ direction by the operation arm 58 via the first link arm 54. Thus, the engaging hole 80 in which the first link arm 54 is engaged is moved to the rear surface side of the housing 3 and in the arrow $b_2$ direction. Consequently, the first link arm 54 engaged in the engaging hole 80 moves to the rear surface side of the housing 3 and in the arrow $d_2$ direction in substantially the same posture without practically changing an angle. The locking section 98 formed in the main chassis 6 is formed near a left side corner on the rear surface side to which the loop cam 57 is locked. Thus, the locking section 96 of the first link arm 54 moves while keeping a substantially equal distance to the locking section 98 of the main chassis 6 and the helical tension spring 56 is not extended. Therefore, the eject arm 52 is rotated in the arrow $b_2$ direction, which is the ejecting direction, by the driving force of the driving mechanism 120 without being urged by the helical tension spring 56 and rotated by an amount corresponding to the slide of the slider 122. Consequently, the eject arm 52 does not spring out the optical disk 2 with the urging force of the helical tension spring 56 and can stably eject the optical disk 2 to the predetermined ejecting position.

At this point, in the disk conveying mechanism 50, since the optical disk 2 is brought into slide contact with the panel curtains provided in the disk slot 19 of the front panel 18, an urging force in the arrow $b_1$ direction relatively acts on the eject arm 52 and the first link arm 54. In this case, as described above, since the engaging protrusion 116 of the second link arm 55 is brought into contact with the sidewall in the cam groove 108 of the operation arm 58, the rotation of the first link arm 54 in the arrow $d_2$ direction is regulated. Thus, the first link arm 54 and the eject arm 52 are rotated by an amount corresponding to a slide amount in the arrow $f_2$ direction of the slider 122 following the operation arm 58 moved in the arrow $d_2$ direction. Therefore, the disk conveying mechanism 50 can rotate the eject arm 52 by an amount corresponding to the slide action of the slider 122 against the urging force in the arrow $b_1$ direction.

Figure 19:
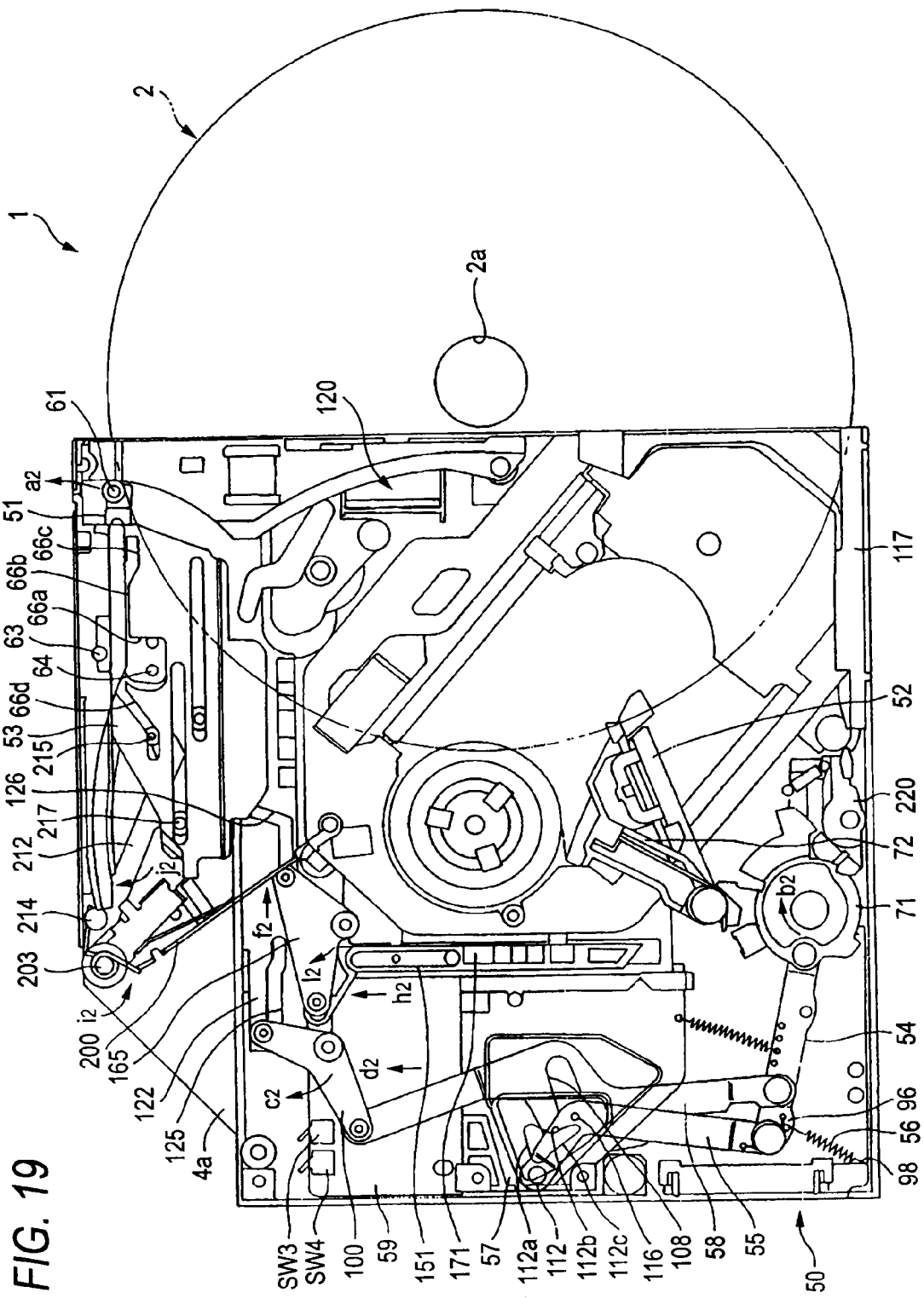
FIG. 19 is a plan view showing the disk drive device that has conveyed the optical disk to an ejecting position.

As shown in FIG. 19, when the slider 122 is moved to its initial position, the slide action is stopped according to depression of the detection switch. According to the stop of the slide action, the eject arm 52 is also moved to its initial position by the operation arm 58 and the first link arm 54 and stops the optical disk 2 in a position where the center hole 2a is ejected from the disk slot 19. At this point, depression states of the first to the fourth switches SW1 to SW4 are detected. Thus, it is seen that the optical disk 2 has been conveyed to the predetermined ejecting position by the eject arm 52 and the driving by the driving motor 121 is stopped.

Timing of the loading arm 51 for drawing in the optical disk 2 inserted by user and timing of the loading arm 51 for regulating ejection at the time of ejection of the optical disk 2 depend on a position in the slide direction of the loading cam plate 53 of the first guide section 66a and the length of the second guide section 66b.

As described above, since the engaging protrusion 64 is guided by the first cam groove 66 of the loading cam plate 53, the rotation of the loading arm 51 is regulated. When the eject arm 52 is rotated in the arrow $b_2$ direction and ejection of the optical disk 2 is started, the engaging protrusion 64 is brought into contact with the second guide section 66b and the first guide section 66a. Thus, the rotation of the optical disk 2 in the arrow $a_2$ direction, which is the ejecting direction, is regulated and an amount of rotation in the arrow $a_2$ direction is determined according to an amount of movement in the arrow $f_2$ direction of the first guide section 66a. Therefore, if the length of the second guide section 66b is reduced and the position of the first guide section 66a is moved to the front surface side in the slide direction of the loading cam plate 53 (the arrow $f_2$ direction) by the reduced length, timing when the engaging protrusion 64 is regulated from the second guide section 66b to the first guide section 66a is brought forward. Thus, it is possible to rotate the loading arm 51 in the arrow $a_2$ direction at early timing relatively to the rotation of the eject arm 52 in the arrow $b_2$ direction. Consequently, it is possible to prevent a situation in which the loading arm 51 hinders operation for ejecting the optical disk 2 because rotation timing of the loading arm 51 by the loading cam plate 53 is delayed with respect to the operation for ejecting the optical disk 2 by the eject arm 52.

On the other hand, timing for drawing in the optical disk 2 also depends on the position of the first guide section 66a of the loading cam plate 53 and the length of the second guide section 66b. When the optical disk 2 is inserted by user and the driving mechanism 120 is started, the slider 122 and the loading cam plate 53 are moved in the arrow $f_1$ direction. Consequently, the engaging protrusion 64 is brought into contact with the first guide section 66a moving in the arrow $f_1$ direction. Thus, the loading arm 51 is rotated in the arrow $a_1$ direction and draws in the optical disk 2 inserted by the user to the rear surface side of the housing 3. Therefore, if the second guide section 66b is set long and the position in the slide direction of the loading cam plate 53 of the first guide section 66a is formed on the rear surface side in the slide direction (the arrow $f_1$ direction), the loading arm 51 can start drawing in the optical disk 2 at a stage when insertion of the optical disk 2 from the disk slot 19 is shallow, i.e., even if the user does not insert the optical disk 2 deep.

Figure 13:
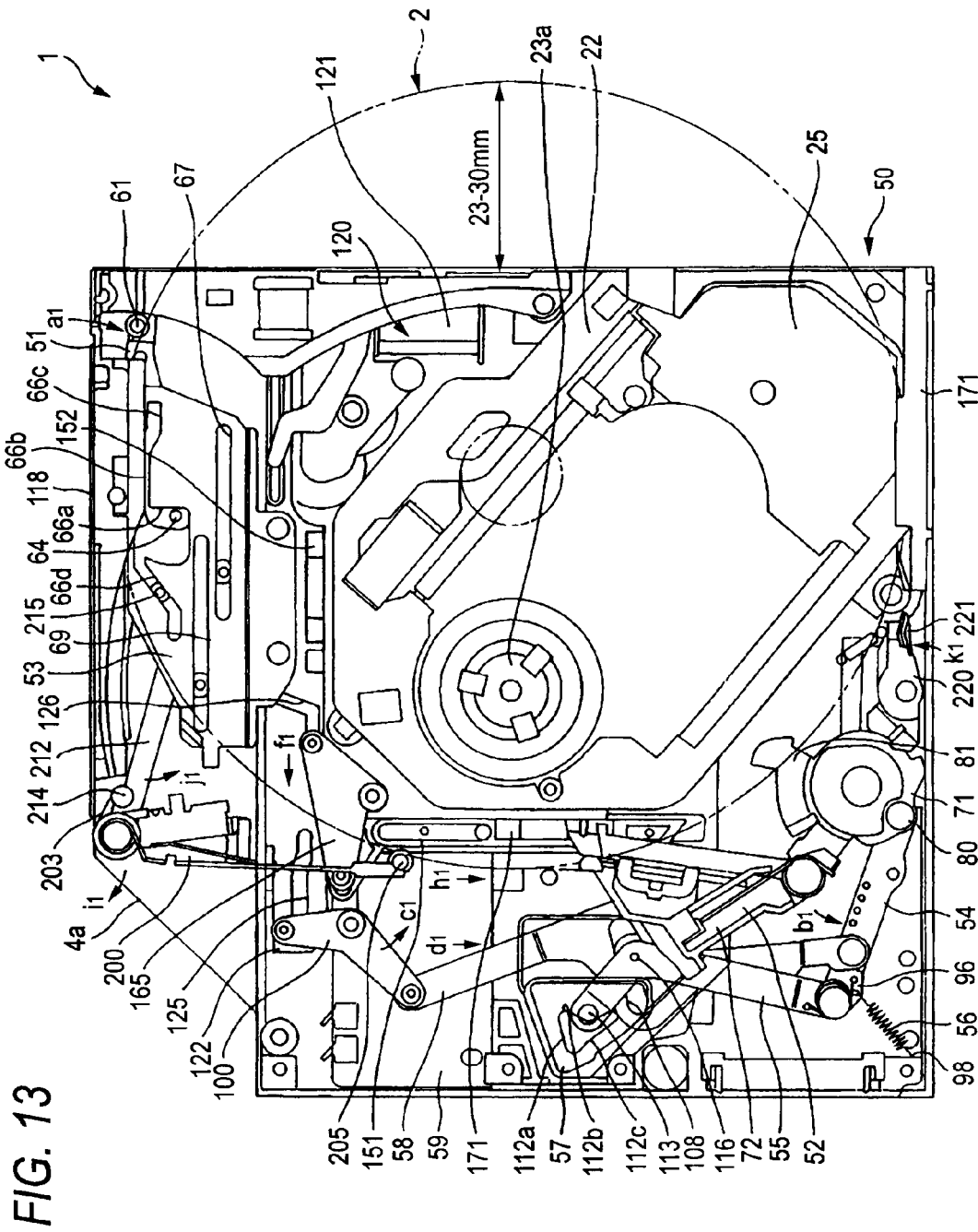
FIG. 13 is a plan view showing the disk drive device that has started draw-in of the optical disk with a loading arm.

Thus, in the disk conveying mechanism 50, the position of formation of the first guide section 66a of the loading cam plate 53 and the length of the second guide section 66b are determined to make it possible to prevent the loading arm 51 from hindering the operation for ejecting the optical disk 2 and draw in the optical disk 2 at an early stage. As shown in FIG. 13, for example, when an optical disk with a diameter of 12 cm is used, it is possible to design the disk drive device 1 to allow the loading arm 51 to draw in the optical disk when the optical disk is inserted to a position where a distance from the disk slot 19 to a side on a rear surface side in an inserting direction of the optical disk is about 23 mm to 30 mm. In this way, in the disk drive device 1, a position for drawing in the optical disk 2 is set in a position apart from the disk slot 19. Thus, it is possible to reduce a distance of insertion by the user and it is possible to draw in the optical disk 2 without inserting the optical disk to the inner part of the housing 3. As a result, it is possible to improve feeling of use.

It is possible to regulate, using the first cam groove 66 formed in the lading cam plate 53, the timing of the loading arm 51 for drawing in the optical disk 2 in the inserting direction (the arrow $a_1$ direction) at the time of draw-in of the optical disk 2 and the timing of the eject arm 52 for rotating the optical disk 2 in the ejecting direction (the arrow $a_2$ direction) at the time of the operation for ejecting the optical disk 2. The loading cam plate 53 is operated according to reciprocating driving of the slider 122 in the inserting and removing directions (the arrow $f_1$ and $f_2$ directions) of the slider 122 at the time of draw-in of the optical disk 2 and at the time of ejection of the optical disk 2. The slider 122 is slid on the identical route, by the same amount, and at the same speed both at the time of draw-in of the optical disk 2 and at the time of ejection of the optical disk 2. Therefore, at the time of draw-in of the optical disk 2 and at the time of ejection of the optical disk 2, amounts of rotation in the arrow $a_1$ direction and the arrow $a_2$ direction of the loading arm 51 with respect to amounts of slide of the slider 122 and the loading cam plate 53 are set the same. The rotation in the arrow $a_1$ direction and the rotation in the arrow $a_2$ direction of the loading arm 51 are unconditionally decided according to slide positions of the slider 122 and the loading cam plate 53.

On the other hand, in the eject arm 52 that rotates the optical disk 2 in the ejecting direction (the arrow $b_2$ direction), an amount of rotation in the inserting direction (the arrow $b_1$ direction) with respect to an amount of slide of the slider 122 at the time of insertion of the optical disk 2 and an amount of rotation in the ejecting direction (the arrow b₂ direction) with respect to an amount of slide of the slider 122 at the time of ejection of the optical disk 2 are different. This is because, whereas the eject arm 52 is rotated in the inserting direction (the arrow b₁ direction) to some degree by an inserting operation of the user before the slider 122 is inserted at the time of draw-in of the optical disk 2, the optical disk 2 is ejected by an amount including an amount of insertion by the user at the time of ejection of the optical disk 2. In other words, this is because, regardless of the fact that amounts of slide of the slider 122 are the same at the time of draw-in and at the time of ejection of the optical disk 2, amounts of rotation of the eject arm 52 rotated according to the slide of the slider 122 are different.

The difference in rotation timing of the eject arm 52 with respect to the movement of the slider 122 at the time of insertion and ejection of the optical disk 2 occurs because a moving locus of the second link arm 55 coupled to the rotation support member 71 of the eject arm 52 via the first link arm 54 is regulated by the loop cam 57 from the insertion to the ejection of the optical disk 2. In a state in which the slider 122 is not driven, when the optical disk 2 is inserted from the disk slot 19 and the eject arm 52 is rotated in the arrow b₁ direction, the second link arm 55 is guided by the insertion guide wall 112*a*. When the eject arm 52 is further rotated in the arrow b₁ direction and the optical disk 2 is drawn in to the disk mounting unit 23 because the slider 122 is driven from the front surface to the rear surface of the housing 3, the second link arm 55 is guided by the draw-in guide wall 112*b*. When the eject arm 52 is rotated in the arrow b₂ direction and the optical disk 2 is ejected from the disk mounting unit 23 to the disk slot 19 because the slider 122 is driven from the rear surface to the front surface of the housing 3, the second link arm 55 is guided by the ejection guide wall 112*c* and moved to the insertion guide wall 112*a*. In this way, an amount of movement of the second link arm 55 guided by the loop cam 57 with respect to an amount of movement of the slider 122 at the time of insertion and draw-in of the optical disk 2 and an amount of movement of the second link arm 55 guided by the loop cam 57 with respect to an amount of movement of the slider 122 at the time of ejection of the optical disk 2 are set to be different.

As described above, both the loading arm 51 and the eject arm 52 are rotated according to the slide action of the slider 122. However, whereas the loading arm 51 is operated by the loading cam plate 53 reciprocatingly driven linearly together with the slider 122, a moving locus of the eject arm 52 is controlled by the second link arm 55 that takes a revolving locus as opposed to a reciprocating locus of the slider 122. In such a disk conveying mechanism 50, it is also possible to unconditionally decide a locus of the guide protrusion 113 of the second link arm 55, which is guided through the guide groove 114 of the loop cam 57, with respect to the reciprocating locus of the slider 122. It is possible to adjust rotation timing of the loading arm 51 and the eject arm 52 to the reciprocating driving of the slider 122.

If a margin is not set for the guide groove 114 of the loop cam 57, in which the guide protrusion 113 of the second link arm 55 is slid, with respect to a locus of the guide protrusion 113 that moves according to the movement of the eject arm 52 and the slider 122 from insertion to ejection of the optical disk 2 and the guide groove 114 is formed narrow, it is likely that it is difficult to move the guide protrusion 113 smoothly or the guide protrusion 113 may be unable to be guided through the guide groove 114 because of an error in accuracy and an attachment error of the loop cam 57 and the various kinds of arms, aged deterioration, and the like. Thus, in the loop cam 57, it is necessary to give a certain degree of width to the guide groove 114 in which the guide protrusion 113 is guided through.

On the other hand, if the width is given to the guide groove 114, it is likely that the second link arm 55 and the eject arm 52 do not accurately follow the movement of the slider 122. For example, at the time of ejection of the optical disk 2, as the slider 122 is moved in the arrow f₂ direction, a shift could occur between timing of slide of the second link arm 55, which is moved via the operation arm 58 and the first link arm 54, to the ejection guide wall 112*c* and timing of slide of the loading cam plate 53 following the slide of the slider 122. A shift could occur between timing of rotation in the arrow b₂ direction of the eject arm 52 and timing of rotation of the loading arm 51 rotated in the arrow a₂ direction according to the slide of the slider 122. Therefore, it is likely that, when the optical disk 2 is about to be ejected by the eject arm 52, the loading arm 51 is not opened and prevents the ejection of the optical disk 2.

In order to absorb such shift between the ejection timing of the eject arm 52 and the open timing of the loading arm 51 and smoothly perform ejection of the optical disk 2 by the eject arm 52, the insert-throughholes 60 that is drilled in the loading arm 51 and through which the rotation support member 63 is inserted is formed in a long hole shape. Since the insert-throughholes 60 is formed in a long hole shape, a rotation fulcrum of the loading arm 51 moves along the longitudinal direction of the insert-through holes 60. Consequently, when the loading arm 51 is urged in the arrow a₂ direction by the optical disk 2 pressed by the eject arm 52, the rotation fulcrum moves and the loading arm 51 is allowed to rotate in the same direction. Therefore, even when a shift in rotation timing occurs between the eject arm 52 and the loading arm 51 according to a stroke of the slider 122, the ejection of the optical disk 2 is not hindered.

By forming the insert-through holes 60 of the loading arm 51 in a long hole shape, when timing for drawing in the optical disk 2 is brought forward by providing the first guide section 66*a* of the first cam groove 66 formed in the loading cam plate 53 on the rear surface side of the housing 3 to extend the second guide section 66*b*, it is also possible to prevent timing for opening the loading arm 51 in the arrow a₂ direction at the time of ejection of the optical disk 2.

In other words, since the engaging protrusion 64 is pressed by the first guide section 66*a* of the first cam groove 66, the loading arm 51 is rotated in the arrow a₁ direction for drawing in the optical disk 2 into the housing 3. Thus, if the loading arm 51 comes into contact with the first guide section 66*a* as early as possible from the start of the slide of the slider 122, it is possible to reduce a distance of manual insertion of the optical disk 2 by the user. On the other hand, after the engaging recess 64 is guided by the second section 66*b* of the first cam groove 66, the loading arm 51 is moved along the first guide section 66*a* to be capable of rotating in the arrow a₂ direction for ejecting the optical disk 2 to the outside of the housing 3. Thus, since the second guide section 66*b* is set long, if the engaging recess 64 is not moved to the first guide section 66*a* side in a state in which the eject arm 52 is rotated in the arrow b₂ direction for ejecting the optical disk 2, the loading arm 51 may be unable to rotate in the arrow a₂ direction and the ejection of the optical disk 2 is hindered.

In this case, by forming the insert-through holes 60 in a long hole shape, since the rotation fulcrum deviates, the loading arm 51 can rotate in the arrow a₂ direction. It is possible to prevent the timing for opening the loading arm 51 in the arrow a₂ direction from being delayed at the time of ejection of the optical disk 2.

Other than providing the insert-through hole 60 of a long hole shape in the loading arm 51 and providing the rotation support member 63 on the deck section 4a, it is also possible that the rotation support member 63 of a cylindrical shape is protrudingly provided in the loading arm 51 and the insert-through hole 60 of a long hole shape is drilled in the deck section 4a to rotatably support the loading arm 51.

In a state in which the optical disk 2 is inserted by a predetermined amount and the driving of the driving motor 121 is started, when the user suddenly grabs the optical disk 2 because, for example, the user notices that the user has inserted a wrong optical disk 2, the disk conveying mechanism 50 stops the driving motor 121 and, then, reversely drives the driving motor 121 to eject the optical disk 2.

Specifically, when the optical disk 2 is inserted from the disk slot 19 by the predetermined amount and the driving motor 121 is driven, the loading arm 51 is rotated in the arrow $a_1$ direction according to movement in the arrow $f_1$ direction of the slider 122 and the loading cam plate 53. Here, when the optical disk 2 is grabbed by the user, the rotation of the loading arm 51 is regulated. On the other hand, the loading cam plate 53 is slid in the arrow $f_1$ direction together with the slider 122. Thus, the engaging protrusion 64 protrudingly provided in the loading arm 51 is locked to the first guide section 66a of the loading cam plate 53. Consequently, the slide in the arrow $f_1$ direction of the slider 122 and the loading cam plate 53 is regulated. When a predetermined time elapses in this state, the driving motor 121 is reversely driven and the optical disk 2 is ejected in a process opposite to the process for inserting the optical disk 2 described above.

At this point, since the optical disk 2 is inserted by the predetermined amount, the guide protrusion 113 of the second link arm 55 is lid on the insertion guide wall 112a of the loop cam 57. Thus, the locking section 96 of the first link arm 54 and the locking section 98 of the main chassis 6 are moved in directions away from each other and the helical tension spring 56 laid over both the locking sections are extended. Therefore, when the driving motor 121 is reversely driven and the slider 122 is finished to be slid in the arrow $f_2$ direction, the first link arm 54 subjected to the urging force of the helical tension spring 56 is rotated and the eject arm 52 is rotated in the arrow $b_2$ direction. Therefore, in the disk drive device 1, the eject arm 52 is urged to rotate in the arrow $b_2$ direction for ejecting the optical disk 2 to the outside of the disk slot 19 by the helical tension spring 56 and ejects the optical disk 2 with the urging force of the helical tension spring 56.

Therefore, the guide protrusion 113 of the second link arm 55 moves backward on the insertion guide wall 112a without passing the ejection guide wall 112c. Thus, although it is difficult to rotate the eject arm 52 to the ejecting position with the slide in the arrow $f_2$ direction of the slider 122, it is possible to rotate the eject arm 52 to the ejecting position with the urging force of the helical tension spring 56 accumulated at the time of insertion of the optical disk 2. Therefore, it is possible to prevent a situation in which the driving of the driving motor 121 is stopped due to grabbing of the optical disk 2 by the user at the time of loading of the optical disk 2 and the optical disk 2 is left untouched in a state in which the optical disk 2 is exposed from the disk slot 19 halfway.

It is possible to detect such abnormal conveyance of the optical disk 2 by monitoring depression states of the first to the fourth switches SW1 to SW4 mounted on the circuit board 59 using a microcomputer. It is detected that the conveyance of the optical disk 2 is abnormal when time of movement of the slider 122 from a state in which the first switch SW1 is depressed by the eject arm 52 until it is detected that the base unit 22 is lowered to the chucking release position exceeds a predetermined time, for example, three seconds or when time of movement of the base unit 22 from the chucking release position to the recording and reproducing position through the chucking position exceeds a predetermined time. Then, the driving motor 121 is stopped or reversely rotated to eject the optical disk 2.

When an obstacle such as a book is placed in front of the disk slot 19 at the time of ejection of the optical disk 2, the optical disk 2 comes into contact with the obstacle to make it difficult to eject the optical disk 2 and an excessive load is applied to the driving motor 121 of the driving mechanism 120. Since the optical disk 2 is held between the eject arm 52 subjected to the driving force of the driving motor 121 and rotated and the obstacle, an excessive load is also given to the optical disk 2.

In the disk drive device 1, as shown in FIG. 23, the rotation support member 71 and the push-out arm 72 of the eject arm 52 are engaged to be rotatable in the arrow $b_1$ direction and the arrow $b_2$ direction around the opening 77 and the engaging protrusion 85 by the caulking shaft 89 and are urged in the arrow $b_2$ direction with a predetermined force by the coil spring 73. Therefore, even when an obstacle hindering ejection of the optical disk 2 is placed and a force in a direction opposite to the ejecting direction (the arrow $b_2$ direction) of the optical disk 2 is applied to the eject arm 52 at the time of ejection of the optical disk 2, the push-out arm 72 subjected to the force in the opposite direction rotates in the arrow $b_1$ direction. Thus, it is possible to prevent a situation in which an excess load is applied to the driving motor 121 and the optical disk 2.

When the push-out arm 72 of the eject arm 52 is rotated in the arrow $b_1$ direction, the disk drive device 1 stops the driving of the driving motor 121. When a predetermined time elapses in a state in which the obstacle is placed in front of the disk slot 19 and ejection of the optical disk 2 is hindered, the disk drive device 1 draws in the optical disk 2 to the disk mounting unit 23 side again. In other words, when the optical disk 2 is ejected to the outside from the disk slot 19, one side of the optical disk 2 comes into contact with the obstacle, and the ejection of the optical disk 2 is stopped for the predetermined time, the driving motor 121 is rotated reversely. Therefore, the first and the second link arms 54 and 55 and the operation arm 58 are moved reversely to perform an operation for loading the optical disk 2. In this case, since the guide protrusion 113 of the second link arm 55 also moves backward on the ejection guide wall 112c, the first link arm 54 and the locking section 98 of the main chassis 6 are moved without being spaced apart from each other. Thus, the helical tension sprig 56 is not extended and an urging force in the ejecting direction does not act on the eject arm 52.

Consequently, the disk drive device 1 can prevent a situation in which the optical disk 2 is left untouched in a state in which the optical disk 2 is placed between the eject arm 52 rotated in the ejecting direction and the obstacle and can prevent an excessive load from being applied to the driving motor 121 and the optical disk 2.

It is possible to detect such abnormal conveyance of the optical disk 2 by monitoring depression states of the first to the fourth switches SW1 to SW4 mounted on the circuit board 59 using a microcomputer. It is detected that the conveyance of the optical disk 2 is abnormal when time of movement of the slider 122 during a period in which the driving motor 121 is reversely rotated and the base unit 22 is lowered from the recording and reproducing position to the chucking release position through the chucking position exceeds a predetermined time, for example, three seconds or when time of movement of the slider 122 from the time when the base unit 22 is lowered to the chucking release position until all the first to fourth switches SW1 to SW4 come into an un-depressed state exceeds a predetermined time. Then, the driving motor 121 is stopped or regularly rotated to load the optical disk 2.

In the loop cam 57, a movable area 114a of the guide protrusion 113 is provided in a large area in respective extending directions of the insertion guide wall 112a and the draw-in guide wall 112b of the guide groove 114. The movable area 114a is an area for preventing, when the optical disk 2 is inserted to the innermost part of the housing 3 in a state in which a power supply of the disk drive device 1 is not on, the guide protrusion 113 and the outer periphery 112d of the loop cam 57 from colliding with each other to damage the disk conveying mechanism 50. A maximum movable range of the guide protrusion 113 according to insertion of the optical disk 2 is secured.

Figure 35:
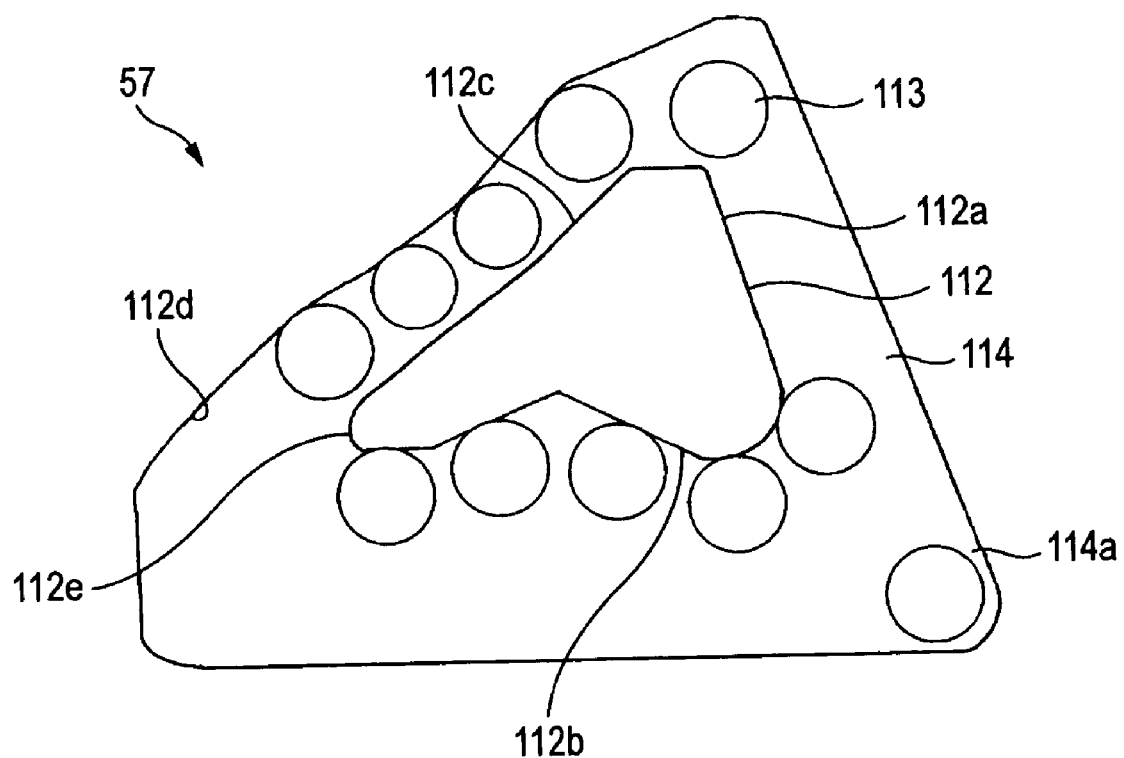
FIG. 35 is a plan view showing a moving path of a guide protrusion in a loop cam.

As shown in FIG. 35, in a state in which the power supply of the disk drive device 1 is on, when the optical disk 2 is inserted, the driving motor 121 is driven and the guide protrusion 113 moves the draw-in guide wall 112b to the ejection guide wall 112c side according to slide in the arrow $f_1$ direction of the slider 122 and movement in the arrow $d_1$ direction of the operation arm 58. However, in a state in which the power supply of the disk drive device 1 is off, since the driving motor 121 is not driven even if the optical disk 2 is inserted to the inner part of the housing 3, the guide protrusion 113 is not moved to the ejection guide wall 112c side by the operation arm 58 and the second link arm 55. Therefore, when the user pushes in the optical disk 2 further to the inner part than an original draw-in start position, since the eject arm 52 is further rotated in the arrow $b_1$ direction, the guide protrusion 113 of the second link arm 55 deviates from an original route of the guide groove 114 and collides with the outer periphery 112d. As a result, the guide protrusion 113 gives an excessive load to the loop cam 57, the first and the second link arms 54 and 55, or the eject arm 52.

Thus, in the loop cam 57, the maximum movable range of the guide protrusion 113 at the time when the optical disk 2 is inserted to the innermost part of the housing 3 in a state in which the power supply is not on is secured as the movable area 114a. Consequently, the disk drive device 1 can prevent damage to the disk conveying mechanism 50 due to collision of the guide protrusion 113 and the loop cam 57 even when the optical disk 2 is inserted to the innermost part of the housing 3 in a state in which the power supply is not on or when, in a state in which the power supply is on, the user pushes in the optical disk to the innermost part of the housing 3 without waiting for draw-in of the optical disk 2 by the loading arm 51.

As described above, according to the disk conveying mechanism 50 of the disk drive device 1 according to the embodiment of the invention, at the time of insertion of the optical disk 2, the guide protrusion 113 of the second link arm 55 is slid on the insertion guide wall 112a of the loop cam 57 in a process in which the optical disk 2 is inserted to the predetermined position by the user. Thus, the first link arm 54 and the locking section 98 of the main chassis 6 are guided in directions away from each other to make it possible to cause the urging force in the ejecting direction by the helical tension spring 56 laid over the first link arm 54 and the locking section 98 to act on the eject arm 52. Therefore, it is possible to prevent the optical disk 2 from being left untouched in a state in which the optical disk 2 is inserted into the housing 3 halfway because the insertion of the optical disk 2 by the user is stopped.

At the time of draw-in of the optical disk 2, since the guide protrusion 113 is slid on the draw-in guide wall 112b of the loop cam 57, the first link arm 54 and the locking section 98 are brought close to each other. Since the eject arm 52 is further rotated in the draw-in direction by the operation arm 58, the urging force in the ejecting direction by the helical tension spring 56 given to the eject arm 52 is eliminated. Thus, it is possible to rotate the eject arm 52 according to operation of the slider 122 and the operation arm 58 subjected to the driving force of the driving mechanism 120.

At the time of ejection of the optical disk 2, the guide protrusion 113 is slid on the ejection guide wall 112c of the loop cam 57. Thus, it is possible to rotate the eject arm 52 in the ejecting direction by an amount corresponding to operation of the slider 122 and the operation arm 58 without the first link arm 54 and the locking section 98 being spaced apart from each other.

Therefore, the disk conveying mechanism 50 can stably eject, using the driving force of the driving mechanism 120 without relying on an elastic force, the optical disk 2 to the predetermined stop position where the center hole 2a of the optical disk 2 is ejected to the outside of the housing 3.

Moreover, the disk conveying mechanism 50 does not adopt a mechanism for rotating the eject arm 52 with the urging force of the helical tension spring 56 at the time of ejection of the optical disk 2. Thus, contact sound generated when an eject lever subjected to such an urging force comes into contact with an optical disk is not generated. Therefore, the disk drive device 1 can also improve feeling of use without causing noise at the time of ejection of the optical disk 2.

The deck arm 200 that prevents wrong insertion of the small-diameter optical disk 101 and realizes centering of the large-diameter optical disk 2 will be explained. Since the disk drive device 1 is formed exclusively for the optical disk 2 with a large diameter (e.g., a diameter of 12 cm), the deck arm 200 is provided to cope with a situation in which the user inserts the optical disk 101 with a small-diameter (e.g., a diameter of 8 cm) by mistake.

Figure 36:
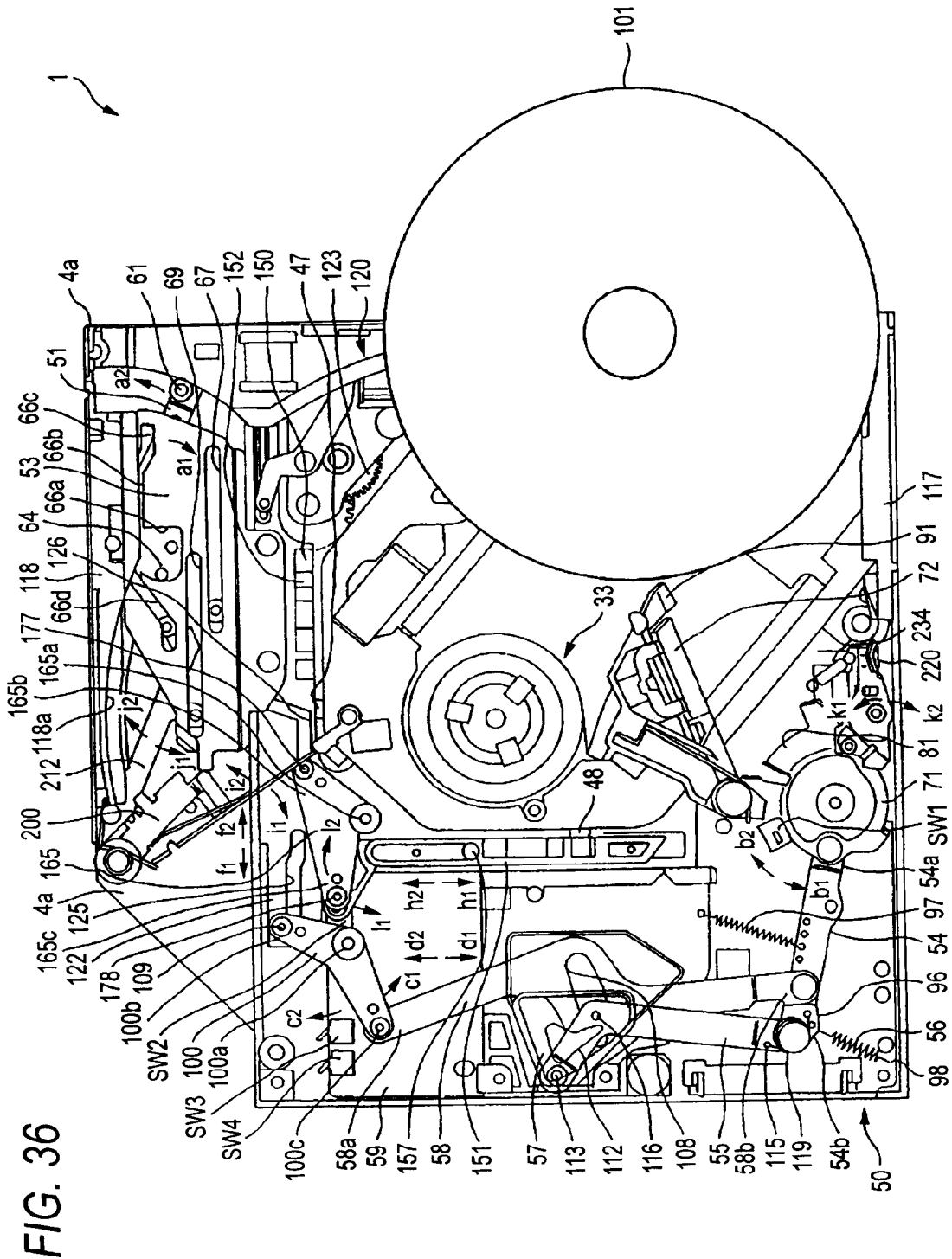
FIG. 36 is a plan view showing the disk drive device that is preventing wrong insertion of a small-diameter disk with the eject arm.

When the small-diameter disk 101 is brought into contact with the push-out arm 72 of the eject arm 52, as shown in FIG. 36, the small-diameter disk 101 is pushed back to the outside of the disk slot 19 by an urging force in the arrow $b_2$ direction by the helical tension spring 56 locked to the first link arm 54 or the coil spring 73 engaged with the push-out arm 72. The small-diameter disk 101 does not rotate the eject arm 52 to a position where the driving mechanism 120 is driven. On the other hand, when the small-diameter disk 101 is inserted while being biased to the loading arm 51 side, it is likely that the small-diameter disk 101 is inserted to the inner part of the housing 3 without being brought into contact with the push-out arm 72 of the eject arm 52 and remains in a position outside a rotation area of the eject arm 52.

Thus, the deck arm 200 is provided in the deck section 4a on the opposite side of the eject arm 52 to prevent the small-diameter disk 101 from being inserted to the inner part of the housing 3 even when the small-diameter disk 101 is inserted while being biased to the loading arm 51 side.

Figure 37:
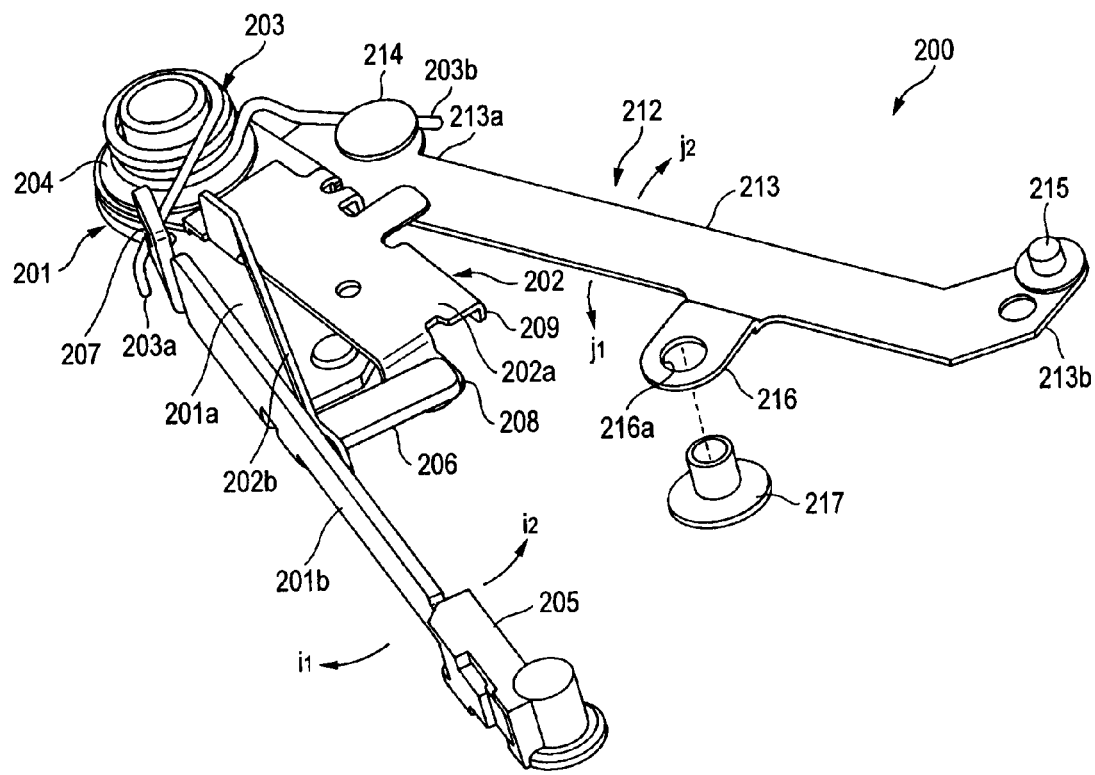
FIG. 37 is a perspective view showing a deck arm and a regulation arm.

As shown in FIG. 11, the deck arm 200 is rotatably provided on the deck section 4a of the bottom case 4 and on the rear surface side of the housing 3. In a state of standby for insertion of the optical disk 2, the deck arm 200 is urged to rotate to the disk slot 19 side. When the small-diameter disk 101 is inserted, the deck arm 200 can eject the small-diameter disk 101 to the outside of the disk slot 19 using this urging force. Specifically, as shown in FIG. 37, the deck arm 200 has an arm member 201 that is rotatably supported by the deck section 4a to be brought into contact with the optical disk 2 and the small-diameter disk 101, a pressing plate 202 that is supported coaxially with the arm member 201 and presses the arm member 201, and a coil spring 203 that urges to rotate the arm member 201. The arm member 201 and the pressing plate 202 are rotatably attached to the deck section 4a by a caulking shaft 204.

The arm member 201 includes a rotating plate 201a of a substantially rectangular plate shape and an arm section 201b that is vertically provided from one side edge in the longitudinal direction of the rotating plate 201a and extended in the longitudinal direction. A contact member 205 that brought into contact with the optical disk 2 or the small-diameter disk 101 is provided at a tip of this arm section 201b. In the rotating plate 201a, a rotation support section supported by the deck section 4a is provided at one end in the longitudinal direction and a guide piece 206 that guides the rotation of the pressing plate 202 is provided at the other end side. In the arm section 201b, a slit 207 to which one end 203a of the coil spring 203 is locked is formed at an end on the rotation support section side in the longitudinal direction.

The pressing plate 202 supported coaxially with the arm member 201 is a plate for surely spacing apart the arm member 201 from the disk outer circumference when the optical disk 2 is mounted on the turntable 23a. The pressing plate 202 includes a principal surface section 202a disposed on the rotating plate 201a of the arm member 201 and a pressing arm 202b that is formed to rise from one side edge on the arm section 201b side of the principal surface section 202a and presses the arm section 201b. The principal surface section 202a is formed in a substantially rectangular shape. In the principal surface section 202a, a rotation support section supported by the deck section 4a together with the arm member 201 is provided at one end in the longitudinal direction and a guide protrusion 208 guided by the guide piece 206 formed in the rotating plate 201a of the arm member 201 is protrudingly provided on the other end side. Since this guide protrusion 208 is guided by the guide piece 206, the pressing plate 202 is prevented from floating from the rotating plate 201a. In the pressing plate 202, a contact piece 209 brought into contact with the leading end of the loading cam plate 53 slid in the arrow $f_1$ direction is formed at a side edge on the opposite side of the side edge where the pressing arm 202b is provided. Since the contact piece 209 is pressed by the loading cam plate 53, the deck arm 200 is rotated in an arrow $i_1$ direction and the contact member 205 provided at the tip of the arm section 201b is spaced apart from the outer circumference of the optical disk 2.

The pressing arm 202b vertically provided from the principal surface section 202a is extended to the arm member 201 side and a tip thereof is set in contact with the arm section 201b of the arm member 201. Such a pressing arm 202b presses the arm section 201b in the arrow $i_1$ direction when the principal surface section 202a of the pressing plate 202 is pressed by the loading cam plate 53.

The arm member 201 and the pressing plate 202 are rotatably supported by the caulking shaft 204 on the deck section 4a. The spring coil 203 is wound around the caulking shaft 204. The arm member 201 and the pressing plate 202 are typically urged to rotate in an arrow $i_2$ direction, which is the ejecting direction of the optical disk 2, by the coil spring 203. The coil spring 203 is locked to the slit 207 of the arm section 201b at one end 203a and locked to the regulation arm 212, which regulates an urging force of the coil spring 203, at the other end 203b.

The regulation arm 212 is an arm for preventing, when the deck arm 200 is rotated in the arrow $i_1$ direction to the rear surface side of the housing 3, an urging force in the arrow $i_2$ direction from increasing by moving the other end 203b of the coil spring 203. The regulation arm 212 includes an arm main body 213 rotatably attached on the deck section 4a in the same manner as the deck arm 200, the spring locking section 214 that is provided on one end 213a side of the arm main body 213 and to which the other end 203b of the coil spring 203 is locked, and the rotation guide section 215 that is provided on the other end 213b side of the arm main body 213 and engaged with the fourth guide section 66d of the first cam groove 66 formed in the loading cam plate 53.

The arm main body 213 is formed in a long shape. An insert-through piece 216 through which the rotation support pin 217, which rotatably locks the arm main body 213 to the deck section 4a, is inserted is provided substantially in the middle in the longitudinal direction. An insert-through hole 216a through which the rotation support pin 217 is inserted is drilled in the insert-through piece 216. Since the rotation support pin 217 is inserted through the insert-through piece 216, the arm main body 213 is rotatably locked to the deck section 4a with the insert-through piece 216 as a fulcrum. Since the rotation support pin 217 is protrudingly provided on the deck section 4a via the insert-through hole 216a, the rotation support pin 217 is inserted through the third cam groove 69 formed in parallel to the slide direction in the loading cam plate 53 and guides the slide of the loading cam plate 53.

The other end 203b of the coil spring 203 is locked to the spring locking section 214 formed at one end 213a of the arm main body 213. Consequently, the coil spring 203 keeps a predetermined interval between the arm member 201, to the slit 207 of the arm section 201b of which one end 203a is locked, and the regulation arm 212. Since the arm member 201 is rotated in the arrow $i_1$ direction according to insertion of the optical disk 2, when the rotation of the regulation arm 212 is regulated, in the coil spring 203, one end 203a locked to the slit 207 of the arm section 201b is moved in a direction away from the other end 203b around the winding section 203c inserted through the caulking shaft 204. Consequently, since one end 203a of the coil spring 203 is urged to the other end 203b side, the arm section 201b of the arm member 201 subjected to this urging force is also urged in the arrow $i_2$ direction to the front surface side of the housing 3 as the optical disk 2 is inserted into the housing 3. Therefore, an urging force in the ejecting direction is given to the deck arm 200 subjected to the urging force of the coil spring 203. Thus, the deck arm 200 can eject the small-diameter disk 101 inserted by mistake to the outside of the housing 3.

The rotation guide section 215 provided at the other end 203b of the arm main body 213 is, as shown in FIG. 21, inserted through the fourth guide section 66d of the loading cam plate 53 to rotate the regulation arm 212 according to the slide in the arrow $f_1$ direction and the arrow $f_2$ direction of the loading cam plate 53 and controls the urging force of the coil spring 203. In other words, as shown in FIGS. 13, 14, and 15, when the loading cam plate 53 is slid in the arrow $f_1$ direction together with the slider 122 according to insertion of the optical disk 2, the rotation guide section 215 guides such that the arm main body 213 is guided by the fourth guide section 66d to be rotated with the insert-through piece 216 as a fulcrum and the spring locking section 214 is rotated in an arrow $j_1$ direction following the deck arm 200 that rotates in the arrow $i_1$ direction. Since the spring locking section 214 follows the deck arm 200, in the coil spring 203, one end 203a locked to the arm section 201b and the other end 203b locked to the spring locking section 214 are not spaced apart from each other. Thus, the urging force does not increase according to the rotation in the arrow $i_1$ direction of the deck arm 200. Therefore, since the regulation arm 212 follows the deck arm 200 according to the rotation of the deck arm 200, the urging force of the coil spring 203, which urges the arm member 201 in the ejecting direction, can maintain a fixed state and does not substantially hinder the operation for drawing in the optical disk 2 by the loading arm 51.

When the loading cam plate 53 is slid in the arrow $f_2$ direction, as shown in FIG. 18, the rotation guide section 215 is guided by the fourth guide section 66d to be rotated and the spring locking section 214 is rotated in an arrow $j_2$ direction. At this point, since the deck arm 200 is also urged in a direction in which one end 203a comes close to the other end 203b by the urging force of the coil spring 203, the arm member 201 is rotated in the arrow $i_2$ direction. When the optical disk 2 is ejected and the rotation in the arrow $j_2$ direction of the spring locking section 214 is stopped, the deck arm 200 is rotated to its initial position and stands by for insertion of the optical disk 2.

The contact member 205 provided at the tip of the arm section 201b is made of resin softer than the optical disk 2. A center portion of the contact member 205 brought into contact with the outer circumference of the optical disk 2 inserted from the disk slot 19 is curved to the inner side. A flange section expanded in diameter is formed at a lower end of the contact member 205 to make it possible to regulate movement in a height direction of the optical disk 2.

Operations in the processes for inserting, drawing in, and ejecting the optical disk 2 by the deck arm 200 and the regulation arm 212 described above will be explained. In a state of standby for insertion of the optical disk 2 shown in FIG. 11, in the regulation arm 212, since the rotation guide section 215 is guided by the fourth guide section 66d of the loading cam plate 53, the spring locking section 214 is rotated in the arrow $i_2$ direction. In the deck arm 200, since the spring locking section 214 is rotated in the arrow $j_2$ direction, the arm member 201 is urged by one end 203a of the coil spring 203 to be rotated in the arrow $i_2$ direction. At this point, since the leading end of the guide piece 206 comes into contact with the leading end of the loading cam plate 53, the deck arm 200 is regulated from rotating in the arrow $i_2$ direction.

Figure 38:
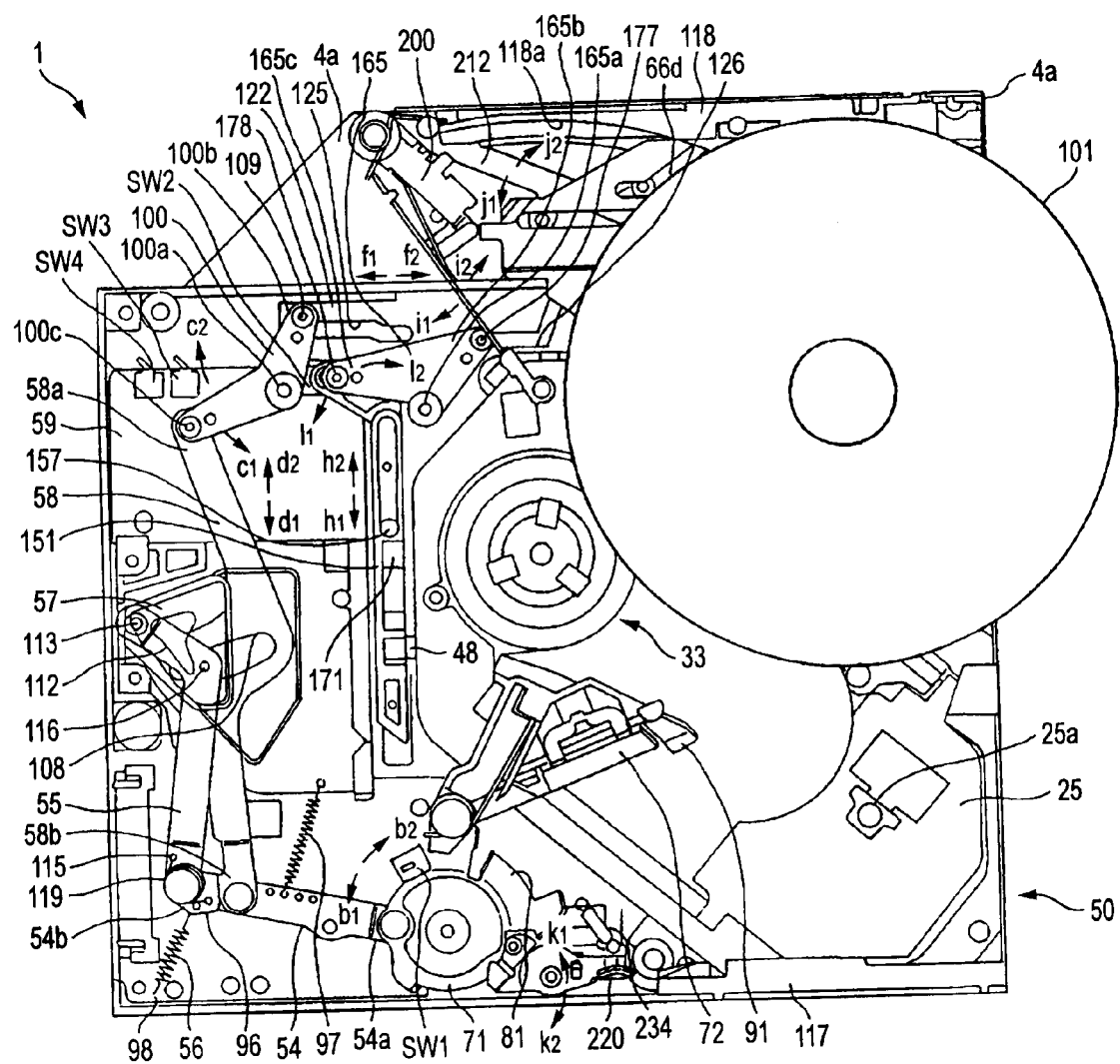
FIG. 38 is a plan view showing the disk drive device that is preventing wrong insertion of the small-diameter disk with the deck arm.

In the state of standby for insertion of the optical disk 2, in the eject arm 52 and the deck arm 200, at least one of the push-out arm 72 and the contact member 205 is allowed to come into contact with the small-diameter disk 101 inserted from the disk slot 19. As shown in FIG. 38, when the small-diameter disk 101 is inserted into the housing 3 while being biased to the deck section 4a, in the deck arm 200, since the contact member 205 is pressed by the small-diameter disk 101, the arm section 201b is rotated in the arrow $i_1$ direction. Therefore, one end 203a of the coil spring 203 locked to the arm section 201b is spaced apart from the other end 203b locked to the spring locking section 214. Thus, an urging force of the coil spring 203 in the arrow $i_2$ direction, which is the ejecting direction, is generated in the deck arm 200. Since the driving mechanism 120 is not driven even when the small-diameter disk 101 is entirely inserted from the disk slot 19, the small-diameter disk 101 is ejected to the outside of the housing 3 by the deck arm 200. Consequently, even when the small-diameter disk 101 is inserted by mistake, the small-diameter disk 101 can be surely ejected without remaining in the housing 3.

When the large-diameter optical disk 2 is inserted, in the deck arm 200, the arm member 201 is pressed by the optical disk 2 to rotate in the arrow $i_1$ direction. As shown in FIG. 12, in the process for inserting the optical disk 2, since the driving mechanism 120 is not driven and the slider 122 and the loading cam plate 53 are not slid, the spring locking section 214 of the regulation arm 212 is not rotated. Therefore, when the arm member 201 is rotated in the arrow $i_1$ direction, in the coil spring 203, one end 203a locked to the arm member 201 and the other end 203b locked to the spring locking section 214 are spaced apart from each other to give an urging force in the arrow $i_2$ direction to the deck arm 200.

In the process for drawing in the optical disk 2, according to the slide in the arrow $f_1$ direction of the slider 122, the loading cam plate 53 is slid in the same direction. When the loading cam plate 53 is slid, as shown in FIGS. 13, 14, and 15, the deck arm 200 is further rotated in the arrow $i_1$ direction according to draw-in of the optical disk 2 by the loading arm 51. The regulation arm 212 is guided by the fourth guide section 66d of the first cam groove 66 to be rotated with the insert-through piece 216 as a fulcrum. The spring locking section 214 is rotated in the arrow $j_1$ direction to follow the deck arm 200. Therefore, in the coil spring 203 attached to the deck arm 200, one end 203a locked to the arm member 201 and the other end 203b locked to the spring locking section 214 are not spaced apart from each other and the urging force acting on the deck arm 200 does not increase. Consequently, it is possible to prevent the urging force in the arrow $i_2$ direction by the coil spring 203 acting on the deck arm 200 from increasing as the optical disk 2 is drawn in to hinder the draw-in operation by the loading arm 51. In the process for drawing in the optical disk 2, since the urging force in the arrow $i_2$ direction by the coil spring 203 also acts on the deck arm 200, the contact member 205 urges the outer circumference of the optical disk 2 in the same direction with a predetermined force.

When the optical disk 2 is drawn substantially onto the disk mounting unit 23, as shown in FIG. 16, in the deck arm 200, the contact piece 209 of the pressing plate 202 is bumped against the leading end of the loading cam plate 53 and further rotated in the arrow $i_1$ direction. When the pressing plate 202 is pressed by the loading cam plate 53, the pressing arm 202b extended from the principal surface section 202a urges the arm section 201b of the arm member 201 in the arrow $i_1$ direction. Consequently, the deck arm 200 can surely space apart the contact member 205 attached to the arm section 201b from the outer circumference of the optical disk 2 mounted on the turntable 23a.

In the process for ejecting the optical disk 2, the loading cam plate 53 is moved in the arrow $f_2$ direction by the slider 122. When the loading cam plate 53 is slid, since the loading arm 51 is rotated in the arrow $a_2$ direction to the front surface side of the housing 3 and the eject arm 52 is rotated in the arrow $b_2$ direction, the optical disk 2 is ejected. As shown in FIG. 18, since the Loading cam plate 53 is slid, in the regulation arm 212, the rotation guide section 215 is guided by the fourth guide section 66d and rotated with the insert-through piece 216 as a fulcrum and the spring locking section 214 is rotated in the arrow $j_2$ direction. Consequently, since the other end 203b of the coil spring 203 is rotated in the arrow $j_2$ direction together with the spring locking section 214, one end 203a of the coil spring 203 and the arm member 201 locked to one end 203a are rotated in the same direction by the urging force of the coil spring 203. Since the coil spring 203 is rotated according to the rotation of the regulation arm 212, the urging force of the coil spring 203 is not increased. Thus, the deck arm 200 does not spring out the optical disk 2 with the urging force of the coil spring 203.

When the slide of the loading cam plate 53 is stopped, the rotation of the regulation arm 212 is also stopped. Thus, the rotation of the deck arm 200 by the urging force of the coil spring 203 is also stopped and the deck arm 200 returns to the initial position for standing by for insertion of the optical disk 2.

When the contact member 205 comes into contact with the outer circumference of the optical disk 2 and is rotated to the rear surface side of the housing 3 and the optical disk 2 is drawn in to substantially the vicinity of the disk mounting unit 23, the deck arm 200 urges the optical disk 2 in the arrow $i_2$ direction with a fixed force using the coil spring 203. The centering guide 220 locked to the main chassis 6 is provided in the urging direction of the contact member 205. The optical disk 2 is centered right above the turntable 23a of the disk mounting unit 23 by the loading arm 51 that draws the optical disk 2 into the housing 3, the deck arm 200, and the centering guide 220.

In this way, since the deck arm 200 is rotatably supported in a position on the deck section 4a and further on the rear surface side of the housing 3 than the disk mounting unit 23, the deck arm 200 can play both functions of prevention of wrong insertion of the small-diameter disk 101 and centering guide for the optical disk 2. An area on the rear surface side of the housing 3 of the deck section 4a is secured as a free space even when the optical disk 2 is mounted on the disk mounting section 23. Since the deck arm 200 has a rotation fulcrum in this area, the deck arm 200 can effectively make use of a space in the housing 3. Thus, an increase in size of the housing 3 is not caused.

Figure 39:
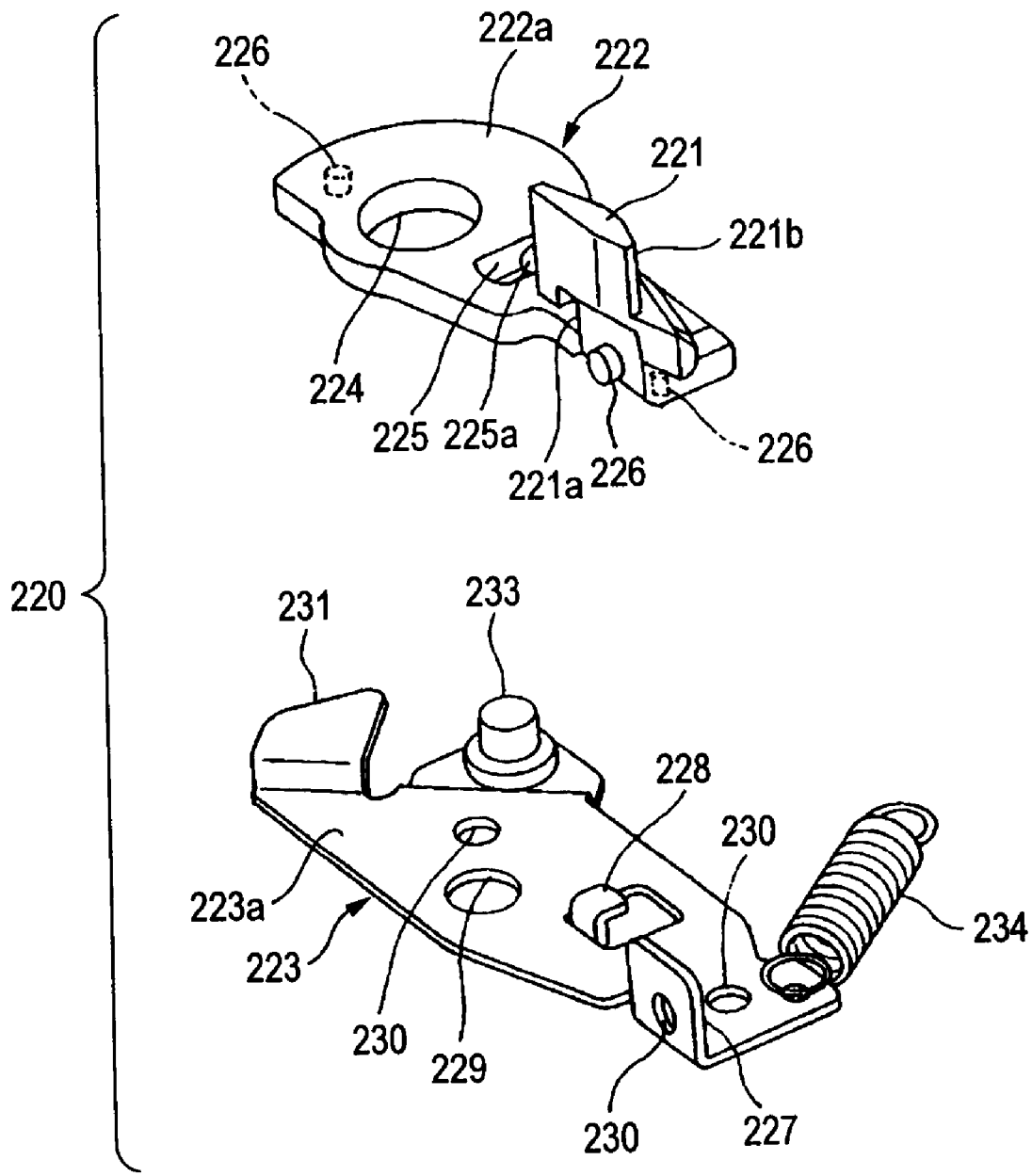
FIG. 39 is a disassembled perspective view showing a centering guide.
Figure 40:
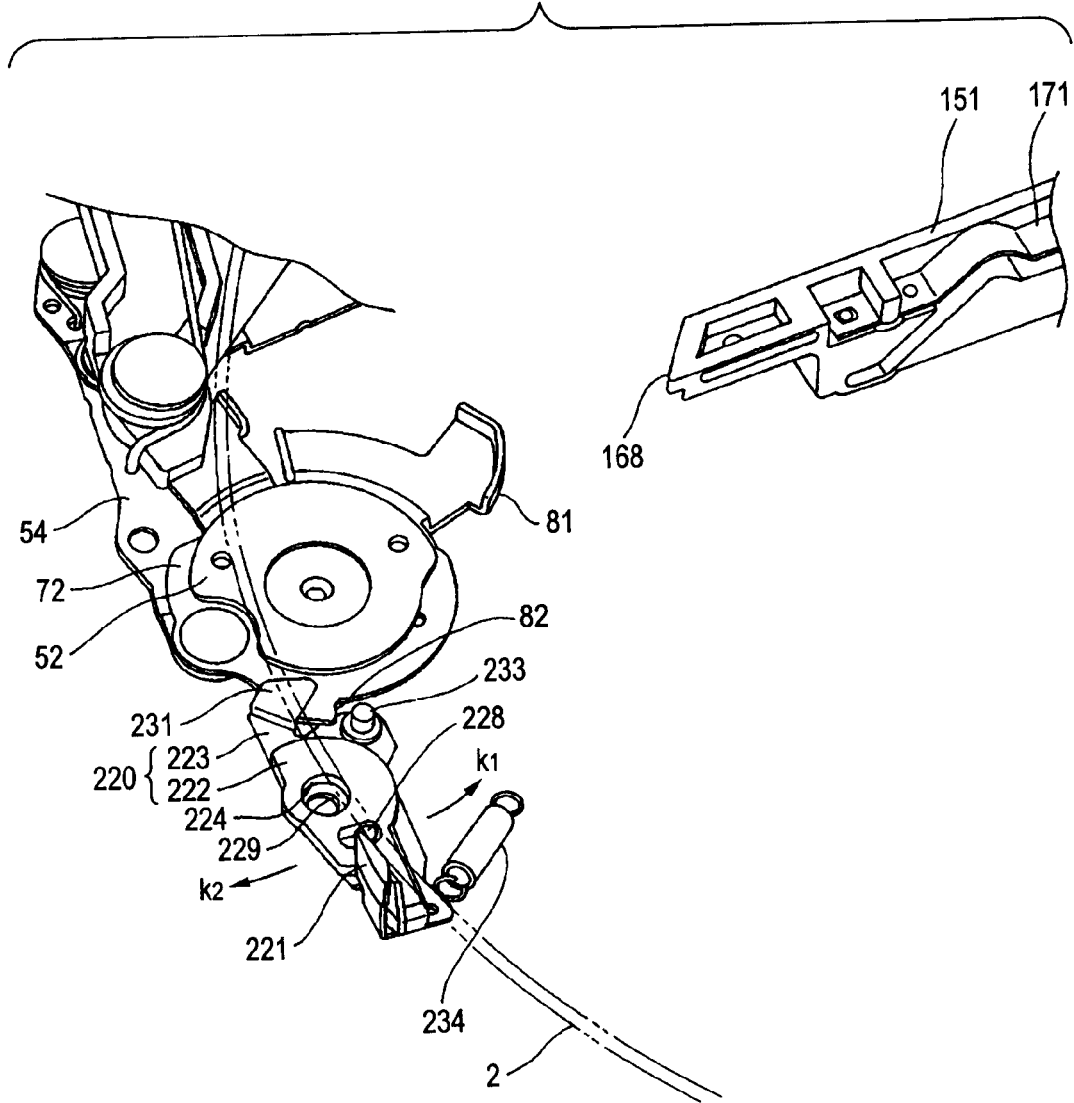
FIG. 40 is a perspective view showing the centering guide.

The centering guide 220 that realizes centering of the optical disk 2 in conjunction with the deck arm 200 will be explained. As shown in FIG. 3, the centering guide 220 is projected from the centering guide opening 6h to the upper surface 6a side of the main chassis 6 and supports the side of the optical disk 2 to guide centering of the optical disk 2. As shown in FIGS. 39 and 40, the centering guide 220 includes a guide plate 222 on which the guide piece 221 that supports the side of the optical disk 2 is provided and a rotating plate 223 that rotates the guide plate 222. The guide plate 222 and the rotating plate 223 are integrally attached to the centering guide 220. The centering guide 220 is rotatably attached to the upper surface 6a of the main chassis 6 from the rear surface side thereof.

The guide plate 222 is formed by a resin molded product. The guide piece 221 that guides the outer circumference of the optical disk 2 from one end of a principal surface section 222a is vertically provided on the guide plate 222. An insert-through hole 224 that is continued to an opening 229 formed in the rotating plate 223 and through which a caulking pin is inserted is formed in the principal surface section 222a. A locking hole 225 in which a locking section 225a locked to a locking piece 228 vertically provided on the rotating plate 223 is formed is formed in the principal surface section 222a. Moreover, coupling protrusions 226 inserted into coupling holes 230 of the rotating plate 223 are protrudingly provided on a rear surface and a side of the principal surface section 222a. The locking section 225a is locked to the locking piece 228 and the coupling protrusions 226 are inserted into the coupling holes 230 to allow the guide plate 222 to rotate integrally with the rotating plate 223.

The guide piece 221 includes a contact wall 221a that is vertically provided from a principal surface of the guide plate 222 and brought into contact with a side edge of the centering guide opening 6h and a guide section 221b that is projected on the main chassis 6 and comes into contact with the outer circumference of the optical disk 2 to guide centering of the optical disk 2. Since the guide plate 222 is urged to rotate to the outer circumference side of the optical disk 2, which is drawn into the housing 3, together with the rotating plate 223, the contact wall 221a is brought into contact with the side edge of the centering guide opening 6h and positioning of the guide section 221b is realized. The guide piece 221 supports the outer circumferential surface of the optical disk 2 with the guide section 221b.

The rotating plate 223 is formed by a sheet metal member. In a principal surface section 223a thereof, a support wall 227 that supports the guide piece 221 vertically provided on the guide plate 222, the locking piece 228 inserted through the locking hole 225, the opening 229 coaxially continued to the insert-through hole 224, and the coupling holes 230 through which the coupling protrusions 226 are inserted are formed.

The coupling hole 230 through which the coupling protrusion 226 protrudingly provided from the contact wall 221a of the guide piece 221 to the side is inserted is formed in the support wall 227. The support wall 227 supports the contact wall 221a. Since the rotating plate 223 is urged to rotate by a helical tension spring 234 described later, the support wall 227 urges the guide piece 221 to the outer circumferential surface side of the optical disk 2. The locking piece 228 is vertically provided from the principal surface section 223a of the rotating plate 223. Since a leading end of the locking piece 228 is bent in a substantially orthogonal direction, the locking piece 228 is locked to the locking section 225a of the locking hole 225 of the guide plate 222. Consequently, the locking piece 228 urges the guide plate 222 to the outer circumferential surface side of the optical disk 2 in conjunction with the support wall 227.

The opening 229 is continued to the insert-through hole 224 of the guide plate 222. A not-shown caulking pin is inserted through the opening 229. Consequently, the centering guide 220 is rotatably supported on the upper surface 6a of the main chassis 6 and allowed to rotate in an arrow $k_1$ direction in FIG. 40 in which the guide piece 221 rotates to the outer circumferential surface side of the optical disk 2 and an arrow $k_2$ direction in which the guide piece 221 is spaced apart from the outer peripheral surface of the optical disk 2.

In the rotating plate 223, a cam shaft 233 rotated by the rotation piece 82 formed in the rotation support member 71 of the eject arm 52 is formed on the principal surface section 223a. The cam shaft 233 is formed by attaching the caulking pin to the principal surface 223a of the rotating plate 223. Since the eject arm 52 is rotated in the arrow $b_1$ direction for drawing in the optical disk 2, the rotation piece 82 of the rotation support member 71 comes into contact with and presses the cam shaft 233. The centering guide 220 is rotated, with the caulking pin that is inserted through the insert-through hole 224 and the opening 229 as a fulcrum, in the arrow $k_2$ direction in which the guide piece 221 is spaced apart from the outer circumferential surface of the optical disk 2.

In the rotating plate 223, a locking piece 231 that is engaged with the rotation support member 71 of the eject arm 52 is formed on the principal surface section 223a. As shown in FIG. 40, the engaging piece 231 is bent upward from the principal surface section 223a and, then, bent to the rotation support member 71 side to be formed in a position higher than the principal surface section 223a and extended on to the rotation support member 71. Consequently, the rotating plate 223 is engaged with the principal surface of the rotation support member 71 and it is possible to bring the cam shaft 233 and the rotation piece 82 into contact with each other.

Moreover, in the rotating plate 223, the helical tension spring 234 that urges to rotate the centering guide 220 in the arrow $k_1$ direction in which the guide piece 221 comes into contact with the outer circumferential surface of the optical disk 2 is locked to the principal surface section 223a. The helical tension spring 234 is locked to the rotating plate 223 at one end and locked to the main chassis 6 at the other end to typically urge to rotate the guide piece 221 of the centering guide 220 in the arrow $k_1$ direction. Since the guide piece 221 is urged to rotate in the arrow $k_1$ direction, the contact wall 221a is pressed against the side edge of the centering guide opening 6h provided in the main chassis 6 and positioning of the guide section 221b is realized. Since the contact wall 221a is urged to the centering guide opening 6h and positioned by the urging force of the helical tension spring 234, it is possible to prevent the centering guide 220 from swinging in the arrow $k_2$ direction in which the guide section 221b is spaced apart from the outer circumferential surface of the optical disk 2.

The process for centering the optical disk 2 using the centering guide 220 will be explained. As described above, in the process for inserting and drawing in the optical disk 2, until the cam shaft 233 of the rotating plate 223 is pressed by the rotation piece 82 formed in the rotation support member 71 of the eject arm 52, the guide piece 221 is urged to rotate in the arrow $k_1$ direction by the urging force of the helical tension spring 234, which is the outer circumferential surface direction of the optical disk 2, to allow the guide section 221b to guide the outer circumferential surface of the optical disk 2.

Since the engaging protrusion 64 is guided by the first cam groove 66 of the loading cam plate 53, the loading arm 51 draws in the optical disk 2 to the centering position where the center hole 2 is located right above the turntable 23a. Specifically, since the engaging protrusion 64 is guided by the first guide section 66a of the first cam groove 66, the loading arm 51 is rotated in the arrow $a_1$ direction for drawing in the optical disk and conveys the optical disk 2 to substantially the centering position. Since the engaging protrusion 64 is guided by the second guide section 66b, the loading arm 51 is regulated from rotating in the arrow $a_1$ direction and the arrow $a_2$ direction.

Moreover, when the optical disk 2 is conveyed to substantially the centering position, the deck arm 200 is pressed by the outer circumferential surface of the optical disk 2 to be rotated in the arrow $i_1$ direction. At this point, the deck arm 200 gives an urging force in the arrow $i_2$ direction to the arm member 201 with the coil spring 203. This urging force acts on the optical disk 2 from the contact member 205 attached to the arm member 201 in the direction of the turntable 23a. As described above, the urging force is kept at a fixed amount without increasing according to the movement of the spring locking section 214 following the rotation of the regulation arm 212.

In other words, in the disk drive device 1, when the optical disk 2 is drawn into the housing 3 as shown in FIG. 15, swinging of the loading arm 51 and the centering guide 220 is regulated and the fixed urging force is given to the optical disk 2 by the deck arm 200. In the disk drive device 1, the contact section 61 of the loading arm 51, a guide piece 221 of the centering guide 220, and the contact member 205 of the deck arm 200 support the outer circumferential surface of the optical disk 2 at three points around the turntable 23a of the disk mounting unit 23. The optical disk 2 is supported in a rigid state in which the swinging is regulated at two points of the contact section 61 and the guide piece 221 among the three points. The urging force is given from the remaining one point to the turntable 23a by the contact member 205.

In this way, since the loading arm 51 that draws in the optical disk 2 onto the disk mounting unit 23 is rigidly positioned according to the centering position for the optical disk 2, the disk drive device 1 can surely realize centering of the optical disk 2.

Since the centering guide 220 is rigidly located according to the centering position for the optical disk 2 in addition to the loading arm 51, the disk drive device 1 can more surely realize centering of the optical disk 2.

Moreover, since two of the contact section 61, the contact member 205, and the guide piece 221 substantially equally arranged around the turntable 23a are set rigid according to the centering position for the optical disk 2 and the optical disk 2 is urged to the turntable 23a side by the remaining one, the disk drive device can more surely perform centering. Consequently, when the base unit 22 is lifted to the chucking position by the slider 122 and the sub-slider 151 described later, it is possible to smoothly chuck the optical disk 2 and the turntable 23a. Therefore, it is possible to eliminate sound generated by chucking the optical disk 2 and the turntable 23a in a state in which the center hole 2a of the optical disk 2 and the turntable 23a deviate from each other and a load applied on the optical disk 2 or the turntable 23a.

When centering is performed, if all the three points of the contact section 61, the guide piece 221, and the contact member 205 that supports the outer circumferential surface of the optical disk 2 are rigidly regulated, it is likely that centering position deviation of the optical disk 2 is caused by an error in outside dimensions of the optical disk 2, an error in accuracy of the components, and the like and it is difficult to perform smooth chucking for all kinds of optical disks. On the other hand, if the contact member 205 is rotatably urged instead of being formed rigid, it is possible to absorb an error in accuracy of the optical disk 2 and the components and surely perform centering of the optical disk 2.

In this case, the loading cam plate 53 that guides the engaging protrusion 64 is integrated with the slider 122 and the slider 122 is supported over the slide direction by the bottom case 4 as described later. Thus, the loading arm 51 rotatably supported by the deck section 4a is positioned with respect to the main chassis 6 also disposed in the bottom case 4 via the loading cam plate 53 and the slider 122. Since the guide piece 221 is urged to rotate to the centering guide opening 6h of the main chassis 6, the centering guide 220 is positioned with respect to the main chassis 6. The base unit 22 on which the turntable 23a is provided is supported to freely rise and fall with respect to the main chassis 6 as described later. In other words, the loading arm 51 and the centering guide 220 are positioned with respect to the main chassis 6 on the one hand and the turntable 23a is positioned with respect to the main chassis 6 on the other.

Therefore, the optical disk 2 is centered on the turntable 23a positioned with respect to the main chassis 6 by the loading arm 51 and the centering guide 220 also positioned with respect to the main chassis 6. Thus, the optical disk 2 is surely centered.

When the centering is performed, in the eject arm 52, in the process for drawing in the optical disk 2, the guide protrusion 113 of the second link arm 55 is guided by the draw-in guide wall 112b of the loop cam 57. Thus, the locking section 96 of the first link arm 54 and the locking section 98 formed in the main chassis 6 are brought close to each other and the helical tension spring 56 is returned from an extended state. At this point, the eject arm 52 may cause an urging force in the arrow $b_2$ direction to the disk mounting unit 23 side if the urging force is very weak for the optical disk 2. Consequently, the disk drive device 1 can perform centering of the optical disk 2 by supporting the optical disk 2 at three points around the disk mounting unit 23 with the eject arm 52 that urges the optical disk 2 to the disk mounting unit 23 side and the loading arm 51 and the centering guide 220 regulated to the centering position for the optical disk 2

As shown in FIG. 16, when the chucking of the optical disk 2 is performed, in the centering guide 220, the cam shaft 233 formed in the rotating plate 223 is pressed by the rotation piece 82 provided in the rotation support member 71 of the eject arm 52. Thus, the rotating plate 223 and the guide plate 222 are rotated around the insert-through hole 224 against the urging force of the coil spring 234 and the guide piece 221 is moved in the arrow $k_2$ direction. Consequently, in the guide piece 221, the guide section 221b is spaced apart from the outer circumferential surface of the optical disk 2.

As described above, in the loading arm 51, the engaging protrusion 64 is guided by the third guide section 66c of the first cam groove 66 of the loading cam plate 53 to be rotated in the arrow $a_2$ direction and the contact section 61 is spaced apart from the outer circumferential surface of the optical disk 2. In the deck arm 200, since the contact piece 209 of the pressing plate 202 is pressed in the arrow $f_1$ direction by the leading end of the loading cam plate 53, the arm member 201 urged by the pressing arm 202b is rotated in the arrow $i_1$ direction. The contact member 205 attached to the arm member 201 is spaced apart from the outer circumference of the optical disk 2. The eject arm 52 is also rotated in the arrow $b_1$ direction via the operation arm 58 according to the slide of the slider 122. The support section 88 and the pickup unit 90 are spaced apart from the outer circumference of the optical disk 2.

Consequently, the optical disk 2 chucked to the turntable 23a is released from the arms and the centering guide 220 that support the outer circumference and allowed to rotate by the disk rotation driving mechanism 24.

The driving mechanism 120 that supplies a driving force to the disk conveying mechanism 50 includes, as shown in FIG. 11, the driving motor 121, the slider 122 that is subjected to the driving force of the driving motor 121 and slides in the bottom case 4, and a gear train 123 that transmits the driving force of the driving motor 121 to the slider 122. These are disposed on the bottom case 4 side of the main chassis 6. The driving mechanism 120 slides the slider 122 with the driving motor 121 to drive the disk conveying mechanism 50 and the base elevating mechanism 150.

When the optical disk 2 is inserted to the predetermined position and the first switch SW1 is pressed by the rotation support member 71 of the eject arm 52, the driving motor 121 is driven in a regular rotation direction for moving the slider 122 in the arrow $f_1$ direction. When eject operation is performed, the driving motor 121 is driven in a reverse rotation direction for moving the slider 122 in the arrow $f_2$ direction. The slider 122 is moved in the arrow $f_1$ direction or the arrow $f_2$ direction in FIG. 11 according to loading and ejection of the optical disk 2 to drive the arms of the disk conveying mechanism 50 and the base elevating mechanism 150. The gear train 123 transmits the driving force of the driving motor 121 to the slider 122 via a rack section 131.

Figure 41:
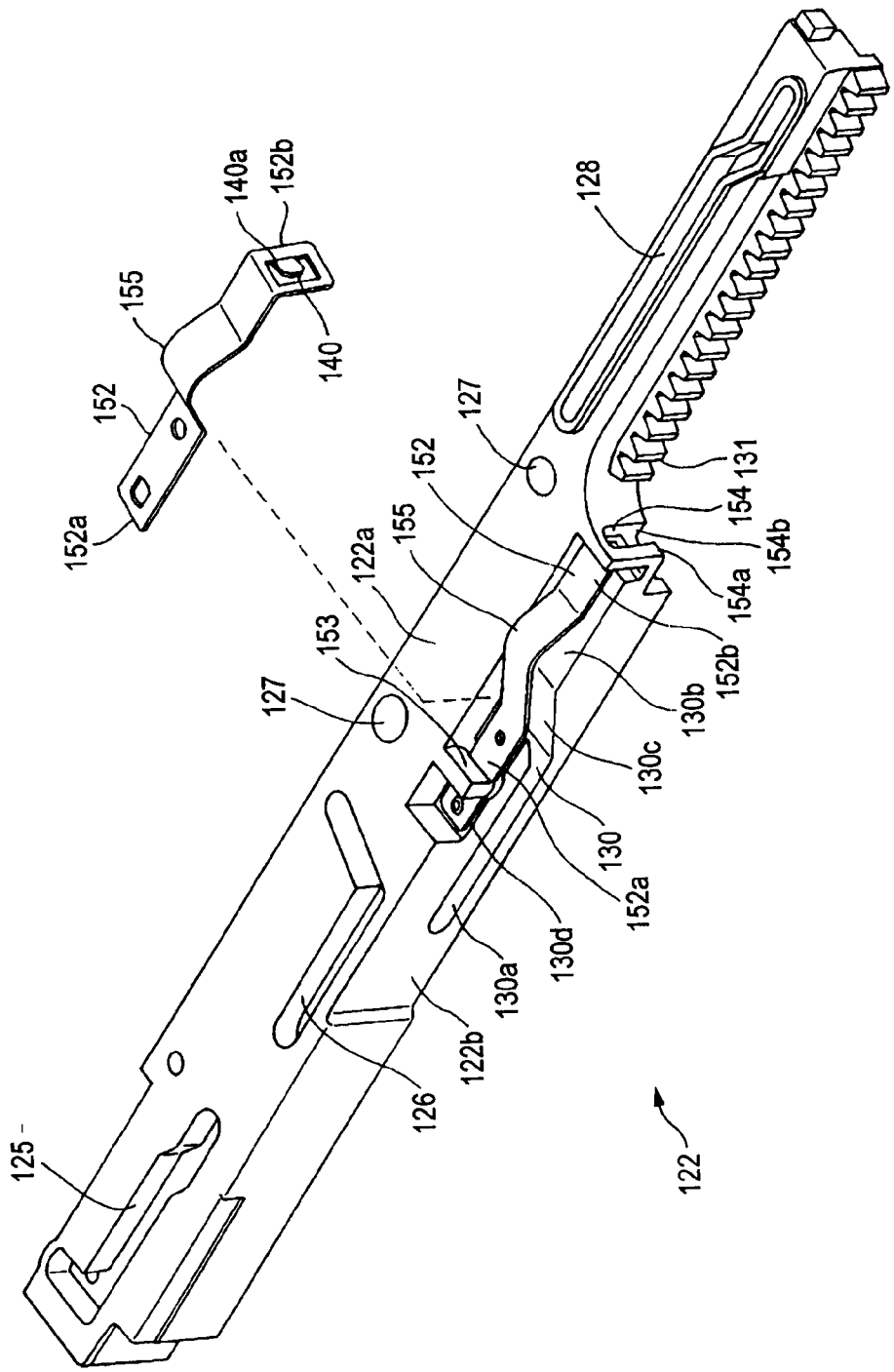
FIG. 41 is a perspective view showing a first guide plate and a slider.

As shown in FIG. 41, the slider 122 is formed by a resin member formed in a substantially rectangular parallelepiped shape as a whole. The first guide groove 125 with which the engaging protrusion 109 formed in the third link arm 100 is engaged, a second guide groove 126 with which the coupling arm 165 that drives the sub-slider 151 of the base elevating mechanism 150 described later is engaged, the pair of engaging recesses 127 that engages with the pair of engaging protrusions 68 formed in the loading cam plate 53, and a third guide groove 128 with which one end of an opening and closing arm not explained in detail that regulates double insertion of the optical disk 2 is engaged are formed in the upper surface 122a.

In the slider 122, the first cam slit 130 through which the first support shaft 47 protrudingly provided in the sub-chassis 29 of the base unit 22 is inserted and the rack section 131 that engages with the gear train 123 are formed in the side 122b on the base unit 22 side. A first guide plate 152 that prevents backlash of the first support shaft 47 of the sub-chassis 29 and stably operates the disk rotation driving mechanism 24 is assembled to the first cam slit 130. In the slider 122, a slide guide groove 129, a slide direction of which is guided by the pair of guide projections 124 protrudingly provided from the bottom case 4, is formed along the longitudinal direction in the lower surface 122c (refer to FIG. 9).

Such a slider 122 is arranged, on the bottom surface of the bottom case 4, between one side surface on which the deck section 4a of the bottom case 4 is provided and the base unit 22.

The slider 122 is located below the optical disk 2 inserted into the housing 3 from the disk slot 19 and the upper surface thereof is slightly lower than the deck section 4a. The slider 122 is covered by the main chassis 6 and driven to slide in the arrow $f_1$ and the arrow $f_2$ directions, which are front and rear directions, via the driving motor 121 and the gear train 123 provided on the bottom surface of the bottom case 4.

In the driving mechanism 120, the third link arm 100 and the operation arm 58 engaged with the third link arm 100 are moved in association with the slide action of the slider 122 to regulate the rotation of the eject arm 52 and the loading cam plate 53 is moved back and forth to rotate the loading arm 51. Consequently, the driving mechanism 120 performs the loading operation for drawing the optical disk 2 into the housing 3 and the eject operation for ejecting the optical disk 2 from the disk mounting unit 23 to the outside of the disk slot 19 according to the slide of the slider 122.

The base elevating mechanism 150 that lifts and lowers the base unit 22 in association with the slide action of the slider 122 will be explained. The base elevating mechanism 150 lifts and lowers the base unit 22 among the chucking position for lifting the base unit 22 and mounting the optical disk 2 centered in the disk mounting position on the turntable 23a of the disk mounting unit 23, the chucking release position for lowering the base unit 22 and releasing the optical disk 2 from the turntable 23a, and the recording and reproducing position for locating the base unit 22 between the chucking position and the chucking release position and recording a signal in and reproducing the signal from the optical disk 2.

Specifically, the base elevating mechanism 150 lifts and lowers the first support shaft 47 and the second support shaft 48 formed in the base unit 22 using the slider 122 and the sub-slider 151, which is slid according to the slide action of the slider 122, to lift and lower the base unit 22. As shown in FIG. 41, the first cam slit 130 that lifts and lowers the base unit 22 between the chucking release position and the recording and reproducing position is formed over the longitudinal direction in the side of the base 122 opposed to the base unit 22. In the first cam slit 130, a lower horizontal plane section 130a corresponding to the chucking release position, an upper horizontal plane section 130b corresponding to the recording and reproducing position, a slope section 130c that connects the lower horizontal plane section 130a and the upper horizontal plane section 130b, and an attaching section 130d to which the first guide plate 152 described later is attached are formed. The first support shaft 47 protrudingly provided in the sub-chassis 29 of the base unit 22 is slidably inserted through the first cam slit 130.

In the first cam slit 130, the first guide plate 152 that guides the movement of the first support shaft 47 and prevents backlash of the first support shaft 47 in the recording and reproducing position to cause the disk rotation driving mechanism 24 to stably operate is disposed. The first guide plate 152 is formed by a leaf spring member and an engaging hole is provided at one end 152a thereof. This engaging hole is engaged with an engaging protrusion protrudingly provided in the attaching section 130d of the first cam slit 130. One end 152a is locked to a projected piece 153 formed from the upper surface 122a of the slider 122 to the attaching section 130d side. In the first guide plate 152, a locking piece 140 locked to a locking section 154 provided in the first cam slit 130 is formed at the other end 152b. In the first guide plate 152, in an upper part at a contact of the upper horizontal plane section 130b and the slope section 130c, a projected section 155 on which the first support shaft 47 moves when the base unit 22 is lifted to the chucking position and that projects to the upper surface 122a side of the slider 122 when the first support shaft 47 is moved to the upper horizontal plane section 130b is formed.

The lower horizontal plane section 130a of the first cam slit 130 has height slightly larger than the diameter of the first support shaft 47 and is slidably formed. On the other hand, the upper horizontal plane section 130b is formed such that height between the upper horizontal plane section 130b and the first guide plate 152 is identical with or slightly smaller than the diameter of the first support shaft 47. Therefore, when the first support shaft 47 moves to the upper horizontal plane section 130b, the first support shaft 47 is pressed into and held in a space between the first guide plate 152 and the upper horizontal plane section 130b. Therefore, the first guide plate 152 can control vibration caused by the spindle motor 24a of the disk rotation driving mechanism 24 provided in the base unit 22 and stably rotate the optical disk 2.

Since the first support shaft 47 is held between the first guide plate 152 and the upper horizontal plane section 130b, the projected section 155 projects on the upper surface 122a of the slider 122 and is pressed against the upper surface 6a of the main chassis 6. Therefore, during recording and playing of the optical disk 2, the slider 122 is pressed against the bottom case 4 side by the first guide plate 152 and can control influences of vibration and disturbance due to the driving of the base unit 22.

Figure 42:
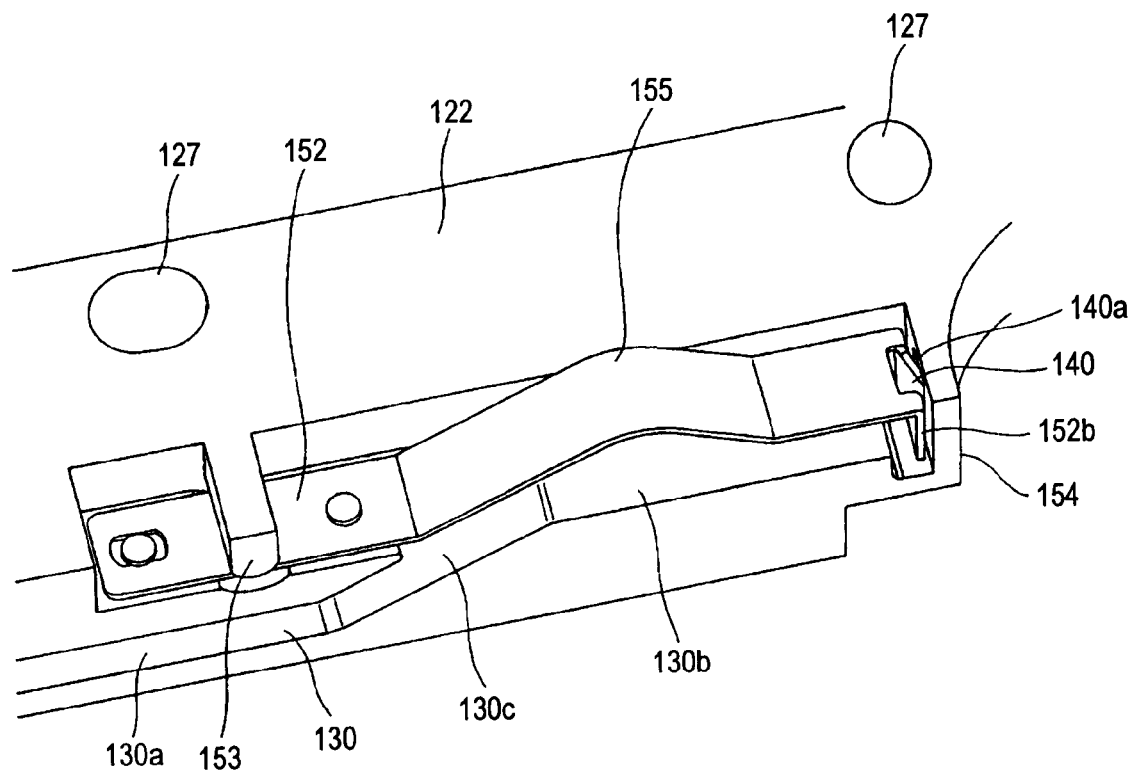
FIG. 42 is a perspective view showing the slider to which the first guide plate is locked.

The locking piece 140 formed at the other end 152b of the first guide plate 152 is formed by bending the other end 152b in a direction orthogonal to the longitudinal direction of the slider 122 and projecting a part of a principal surface of the other end 152b in a substantially rectangular shape along the bending direction of the other end 152b. The locking section 154 to which the locking piece 140 is locked is provided in the front of the upper horizontal plane section 130b of the first cam slit 130. A slit 154b extending over a thickness direction of the slider 122 is provided in a sidewall 154a extending in the thickness direction from the upper surface 122a of the slider 122. Since the first guide plate 152 is locked to the first cam slit 130, as shown in FIG. 42, the other end 152b of the first guide plate 152 is opposed to the sidewall 154a and the locking piece 140 is inserted through the slit 154b to allow the upper surface 140a of the locking piece 140 to come into contact with an upper part of the slit 154b.

Since the locking piece 140 is inserted through the slit 154b, when a shock is applied in a surface direction of the first guide plate 152, the upper surface 140a of the locking piece 140 and the upper part of the slit 154b are brought into contact with each other. Thus, it is possible to receive such a shock in the slider 122 via the upper surface 140a of the locking piece 140. Therefore, even when a shock in the surface direction is applied to the first guide plate 152 because of a drop accident of the disk drive device 1, it is possible to prevent plastic deformation of the first guide plate 152.

In particular, since the first guide plate 152 is formed by an elastic member of a long shape, it is likely that plastic deformation of the first guide plate 152 occurs when a shock in the surface direction is applied. When the disk drive device 1 is shipped from a manufacturer or when an electronic apparatus mounted with the disk drive device 1 is transported, since packing is simplified, it is necessary to cope with a shock applied to the disk drive device 1 when a drop accident or the like occurs. It is possible to prevent deformation of the first guide plate 152 by forming the locking piece 140 to be capable of locking to the slider 122.

The sub-slider 151 supports the second support shaft 48 protrudingly provided from the sub-chassis 29 of the base unit 22 and is engaged with the slider 122. The sub-slider 151 is disposed to be slidable in the arrow $h_1$ direction or the arrow $h_2$ direction in FIG. 11 orthogonal to the loading direction of the optical disk 2 according to the slide action of the slider 122.

Figure 43:
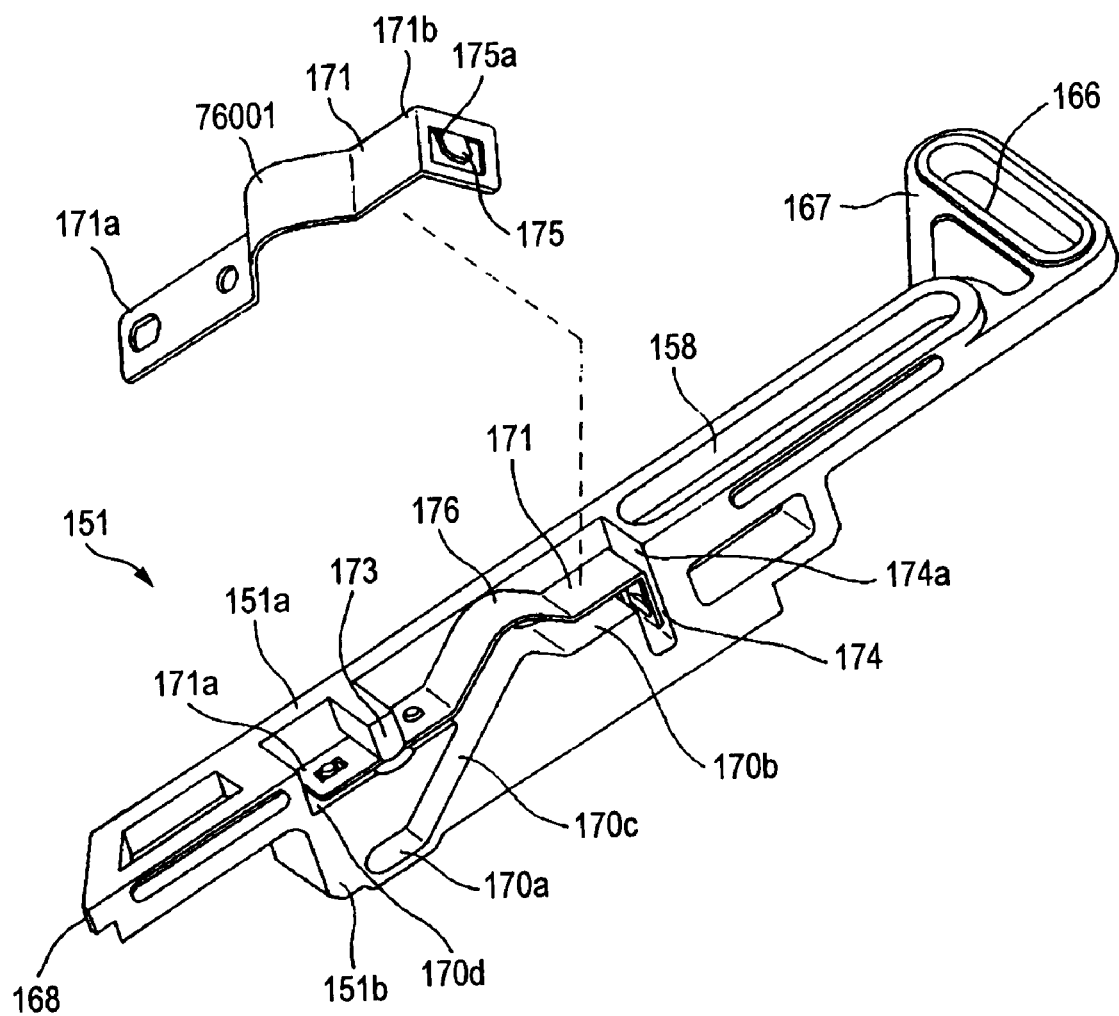
FIG. 43 is a perspective view showing a second guide plate and a sub-slider.

As shown in FIGS. 11 and 43, the sub-slider 151 is formed by a flat member of a long shape made of synthetic resin. An upper guide groove 158 with which a guide protrusion 157 projected from the main chassis 6 is engaged is formed over the longitudinal direction on an upper surface 151a of the sub-slider 151. A lower guide groove 160 with which a guide protrusion 159 projected from the bottom case 4 is engaged is formed over the longitudinal direction in a position of a lower surface 151c of the sub-slider 151 partially deviating from the upper guide groove 158 (see FIG. 9). Since the guide protrusion 157 projected from the main chassis 6 is engaged with the upper guide groove 158, the guide protrusion 157 slides in the upper guide groove 158. Since the guide protrusion 159 projected from the bottom case 4 is engaged with the lower guide groove 160, the guide protrusion 159 slides in the lower guide groove 160. Thus, the sub-slider 151 is slid in the arrow $h_1$ direction or the arrow $h_2$ direction in association with the slide action of the slider 122.

In the sub-slider 151, an engaging groove 166 with which the coupling arm 165 coupled to the slider 122 is engaged is formed at one end in the longitudinal direction located on the slider 122 side. The engaging groove 166 is provided in an engaging piece 167 extended in a direction orthogonal to the longitudinal direction of the sub-slider 151. In the sub-slider 151, the other end on the opposite side of one end where the engaging piece 167 is formed is set as the contact protrusion 168 brought into contact with the rotation support member 71 of the eject arm 52 at the time of loading of the optical disk 2. As shown in FIG. 16, when the optical disk 2 is loaded, the contact protrusion 168 is brought into contact with the bent piece 81 of the rotation support member 71 to rotate the rotation support member 71 in a direction for releasing the push-out arm 72 from the side of the optical disk 2 and regulate the rotation of the rotation support member 71 to prevent the push-out arm 72 rotated to the position of release from the side of the optical disk 2 from rotating in the direction of the side of the optical disk 2. Therefore, the sub-slider 151 keeps a state in which the push-out arm 72 of the eject arm 52 is released from the side of the optical disk 2.

In the sub-slider 151, a second cam slit 170 that lifts and lowers the base unit 22 among the chucking position, the chucking release position, and the recording and reproducing position is formed over the longitudinal direction in a side 151b on the disk slot 19 side together with the first cam slit 130. In the second cam slit 170, a lower horizontal plane section 170a corresponding to the chucking release position, an upper horizontal plane section 170b corresponding to the recording and reproducing position, a slope section 170c that connects the lower horizontal plane section 170a and the upper horizontal plane section 170b and corresponds to the chucking position, and an attaching section 170d to which a second guide plate 171 described later is attached are formed. The second support shaft 48 protrudingly provided in the sub-chassis 29 of the base unit 22 is slidably inserted through the second cam slit 170.

The slope section 170c of the second cam slit 170 is provided up to a position higher than a position of the upper horizontal plane section 170b and slightly falls to guide the base unit 22 to the upper horizontal plane section 170b. Consequently, since the sub-slider 151 slides in the arrow $h_1$ direction, the second support shaft 48 rises on the slope section 170c from the lower horizontal plane section 170a and the base unit 22 guided by the second cam slit 170 is moved from the chucking release position to the chucking position. At this point, in the base unit 22, the turntable 23a and the contact protrusion 8 provided in the top plate section 5a of the top cover 5 hold the section around the center hole 2a of the optical disk 2 centered on the disk mounting unit 23 to perform chucking of the optical disk 2. When the sub-slider 151 is further slid in the arrow $h_1$ direction, since the second support shaft 48 falls from the slope section 170c to the upper horizontal plane section 170b, the base unit 22 is moved from the chucking position to the recording and reproducing position.

In the second cam slit 170, as in the first cam slit 130, the second guide plate 171 that guides the movement of the second support shaft 48 and prevents backlash of the second support shaft 48 in the recording and reproducing position to cause the disk rotation driving mechanism 24 to stably operate is disposed. The second guide plate 171 is formed by a leaf spring member and an engaging hole is provided at one end 171a thereof. This engaging hole is engaged with an engaging protrusion protrudingly provided in the attaching section 170d of the second cam slit 170. One end 171a is locked to a projected piece 173 formed from the upper surface 151a of the sub-slider 151 to the attaching section 170d side. In the second guide plate 171, a locking piece 175 locked to a locking section 174 provided in the second cam slit 170 is formed at the other end 171b. In the second guide plate 171, in an upper part at a contact of the upper horizontal plane section 170b and the slope section 170c, a projected section 176 on which the second support shaft 48 moves when the base unit 22 is lifted to the chucking position and that projects to the upper surface 151a side of the sub-slider 151 when the second support shaft 48 is moved to the upper horizontal plane section 170b is formed.

The lower horizontal plane section 170a of the second cam slit 170 has height slightly larger than the diameter of the second support shaft 48 and is slidably formed. On the other hand, the upper horizontal plane section 170b is formed such that height between the upper horizontal plane section 170b and the second guide plate 171 is identical with or slightly smaller than the diameter of the second support shaft 48. Therefore, when the second support shaft 48 is moved to the upper horizontal plane section 170b, the second support shaft 48 is pressed into and held in a space between the second guide plate 171 and the upper horizontal plane section 170b. Therefore, the second guide plate 171 can control vibration caused by the spindle motor 24a of the disk rotation driving mechanism 24 provided in the base unit 22 and stably rotate the optical disk 2 in conjunction with the first guide plate 152.

Since the second support shaft 48 is held between the second guide plate 171 and the upper horizontal plane section 170b, the projected section 176 projects on the upper surface 151a of the sub-slider 151 and is pressed against the upper surface 6a of the main chassis 6. Therefore, during recording and playing of the optical disk 2, the sub-slider 151 is pressed against the bottom case 4 side by the second guide plate 171 and can control influences of vibration and disturbance due to the driving of the base unit 22.

Figure 44:
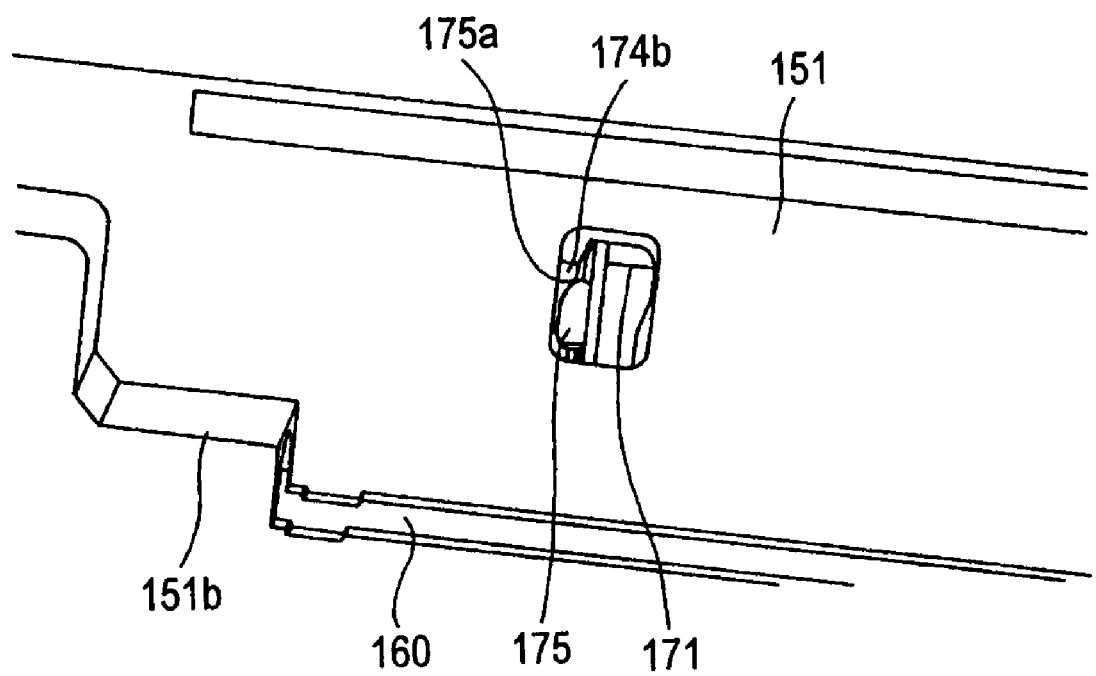
FIG. 44 is a perspective view showing the sub-slider to which the second guide plate is locked.

The locking piece 175 formed at the other end 171b of the second guide plate 171 is formed by bending the other end 171b in a direction orthogonal to the longitudinal direction of the sub-slider 151 and projecting a part of a principal surface of the other end 171b to the front in the longitudinal direction in a substantially rectangular shape along the bending direction of the other end 171b. As shown in FIGS. 43 and 44, the locking section 174 to which the locking piece 175 is locked is provided in the front of the upper horizontal plane section 170b of the second cam slit 170. A slit 174b extending over a thickness direction of the sub-slider 151 is provided in a sidewall 174a extending in the thickness direction from the upper surface 151a of the sub-slider 151. Since the second guide plate 171 is locked to the second cam slit 170, the other end 171b of the second guide plate 171 is opposed to the sidewall 174a and the locking piece 175 is inserted through the slit 174b to allow the upper surface 175a of the locking piece 175 to come into contact with an upper part of the slit 174b.

Since the locking piece 175 is inserted through the slit 174b, when a shock is applied in a surface direction of the second guide plate 171, the upper surface 175a of the locking piece 175 and the upper part of the slit 174b are brought into contact with each other. Thus, it is possible to receive such a shock in the sub-slider 151 via the upper surface 175a of the locking piece 175. Therefore, as in the first guide plate 152, even when a shock in the surface direction is applied to the second guide plate 171 because of a drop accident of the disk drive device 1, it is possible to prevent plastic deformation of the second guide plate 171.

In the coupling arm 165 engaged with the engaging groove 166 of the sub-slider 151 and couples the slider 122 and the sub-slider 151, a support section 165a provided in substantially the middle thereof is rotatably attached to the main chassis 6. An engaging protrusion 177 formed at one end 165b of the support section 165a is movably engaged with the second guide groove 126 of the slider 122. An engaging protrusion 178 formed at the other end 165c is movably engaged with the engaging groove 166 of the sub-slider 151.

When the slider 122 is moved in the arrow $f_1$ direction, as shown in FIG. 15, since the engaging protrusion 177 moves in the second guide groove 126 of the slider 122, the coupling arm 165 is rotated in an arrow $l_1$ direction with the support section 165a as a fulcrum. The engaging protrusion 178 slides the sub-slider 151 in the arrow $h_1$ direction while moving in the engaging groove 166. When the slider 122 is moved in the arrow $f_2$ direction, as shown in FIG. 18, since the engaging protrusion 177 moves in the second guide groove 126, the coupling arm 165 is rotated in an allow $l_2$ direction with the support section 165a as a fulcrum. The engaging protrusion 178 slides the sub-slider 151 in the arrow $h_2$ direction while moving in the engaging groove 166.

Figure 45:
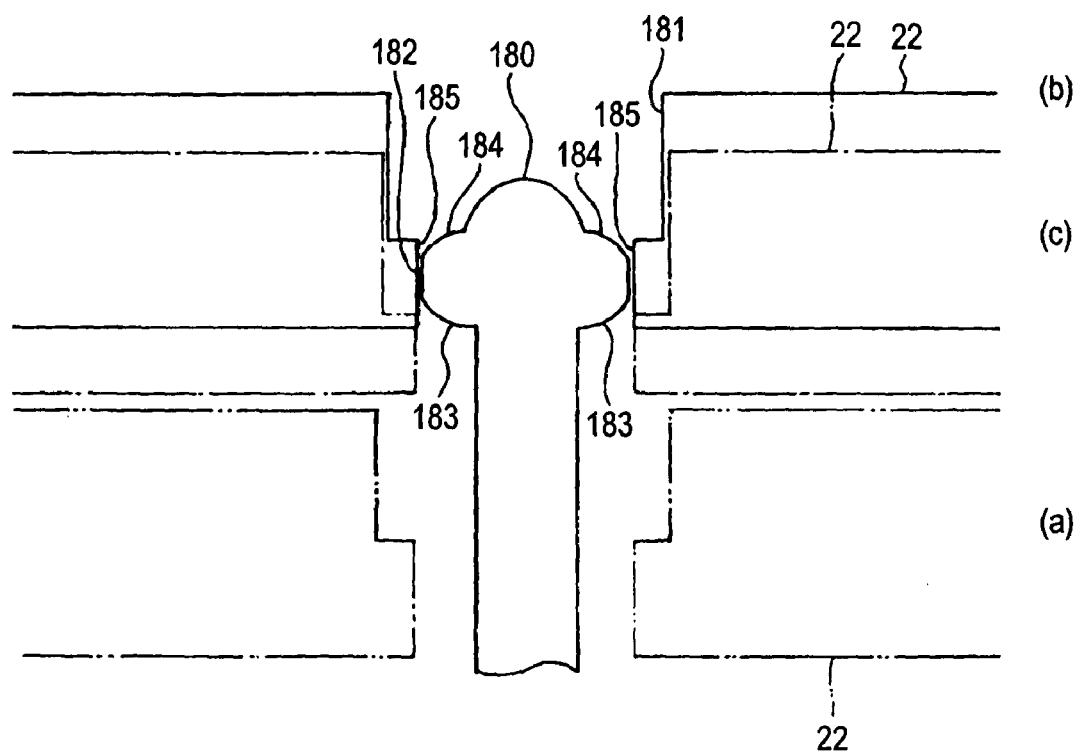
FIG. 45 is a sectional view showing positional relations between a guide pin and a guide hole, wherein (a) shows a positional relation in a chucking release position, (b) shows a positional relation in a disk insertion position, and (c) shows a positional relation in a recording and reproducing position.

In the disk drive device 1, as shown in FIGS. 3 and 45, the guide pin 180 is provided to guide the base unit 22 such that positioning of the center hole 2a of the optical disk 2 conveyed to the centering position by the disk conveying mechanism 50 and the turntable 23a of the disk mounting unit 23 provided in the base chassis 27 is performed when the base unit 22 is lifted to the chucking position.

The guide pint 180 is vertically provided from the bottom surface of the bottom case 4. As shown in FIG. 45, a flange section 182 inserted through a guide hole 181 formed in the base chassis 27 is formed in an upper part of the guide pint 180. The flange section 182 has a diameter slightly larger than the diameter of the guide hole 181 of the base chassis 27. A first guide section 183 formed by a slope expanded in diameter toward an upper end thereof and a second guide section 184 formed by a slope reduced in diameter toward an upper end thereof are formed in the flange section 182. When the base chassis 27 is lifted and lowered, the flange section 182 is inserted through the guide hole 181 with the first and the second guide sections 183 and 184 being in slide contact with a guide wall 185 formed in the guide hole 181. In this way, the flange section 182 guides the base unit 22 to the chucking position or the chucking release position.

The guide hole 181 of the base chassis 27 through which the guide pin 180 is inserted is drilled near the turntable 23a away from the third support shaft 49 serving as a rotation fulcrum of the base unit 22. In the guide hole 181, as shown in FIG. 45, the guide wall 185 is formed to swell below the base chassis 27. In the guide wall 185, a clearance slightly larger than the diameter of the flange section 182 of the guide pin 180 is formed. Since the flange section 182 is inserted through this clearance, the base unit 22 is guided such that positioning of the center hole 2a of the optical disk 2 and the turntable 23a of the disk mounting unit 23 is performed.

Figure 46:
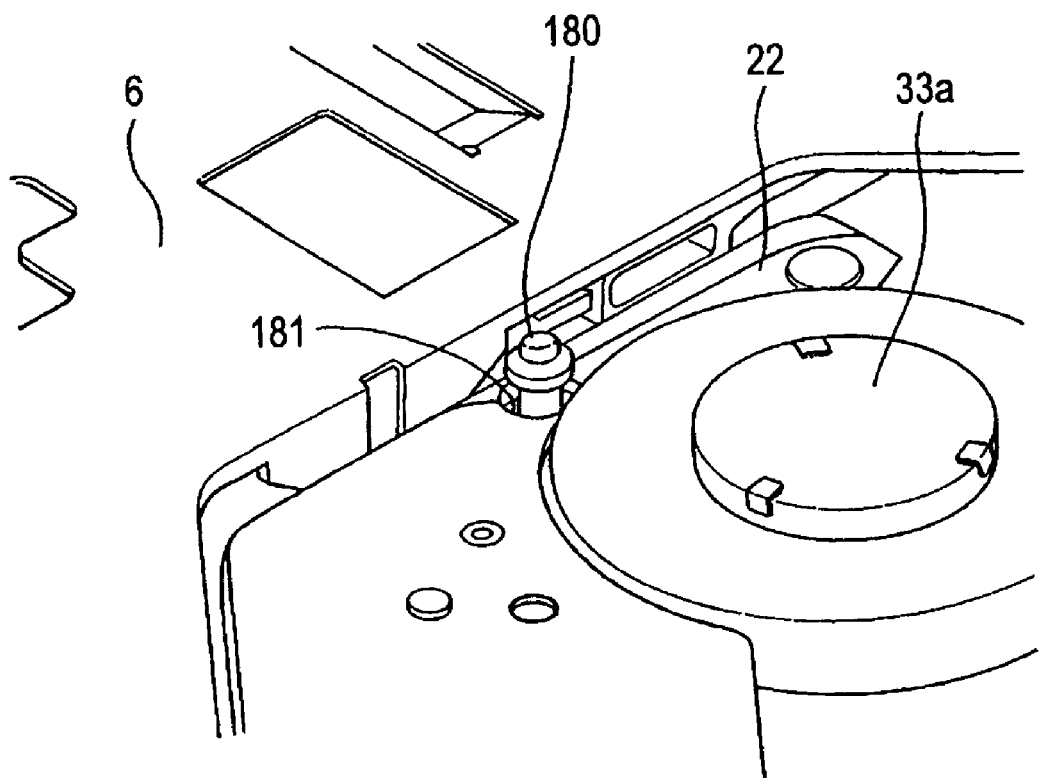
FIG. 46 is a perspective view showing the guide pin and the guide hole in a state in which the base unit is lowered to the chucking release position.
Figure 47:
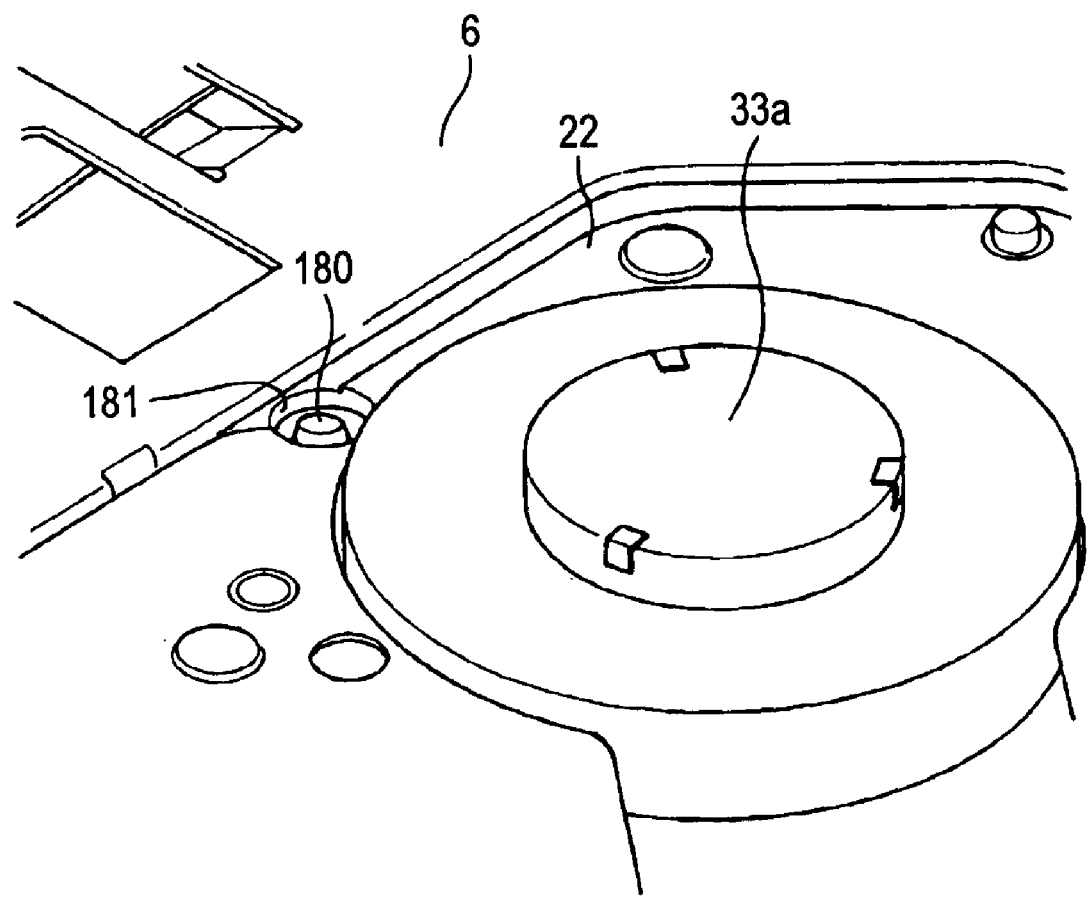
FIG. 47 is a perspective view showing the guide pin and the guide hole in a state in which the base unit is lifted to a chucking position.

Specifically, as indicated by alternate long and two dashes lines in FIG. 46 and (a) in FIG. 45, when the base unit 22 is lowered to the chucking release position, in the guide pin 180, the flange section 182 is located above the guide hole 181. When the optical disk 2 is conveyed to the centering position, the base chassis 27 is lifted and the flange section 182 is inserted through the guide hole 181. When the base chassis 27 is lifted to the chucking position for the optical disk 2, as indicated by solid lines in FIG. 47 and (b) in FIG. 45, the guide wall 185 formed to swell in the guide hole 181 slides on the first guide section 183 of the guide pin 180 and the flange section 182 is inserted through the clearance of the guide wall 185. In this way, since the base chassis 27 is lifted while being guided by the guide pin 180, positioning of the turntable 23a of the disk mounting unit 23 with the center hole 2a of the optical disk 2 conveyed to the centering position is performed. Thus, it is possible to smoothly perform chucking without applying an excessive load to the optical disk 2 and the turntable 23a.

The guide pin 180 and the guide hole 181 are formed at the other end side on the opposite side of one end in the longitudinal direction where the third support shaft 49 that supports the rotation of the base unit 22 is provided and near the disk mounting unit 23 in association with each other. Thus, it is possible to most efficiently correct deviation of the optical disk 2 conveyed to the centering position and the turntable 23a and surely perform positioning of the center hole 2a of the optical disk 2 and the engaging protrusion 33a of the turntable 23a.

Figure 48:
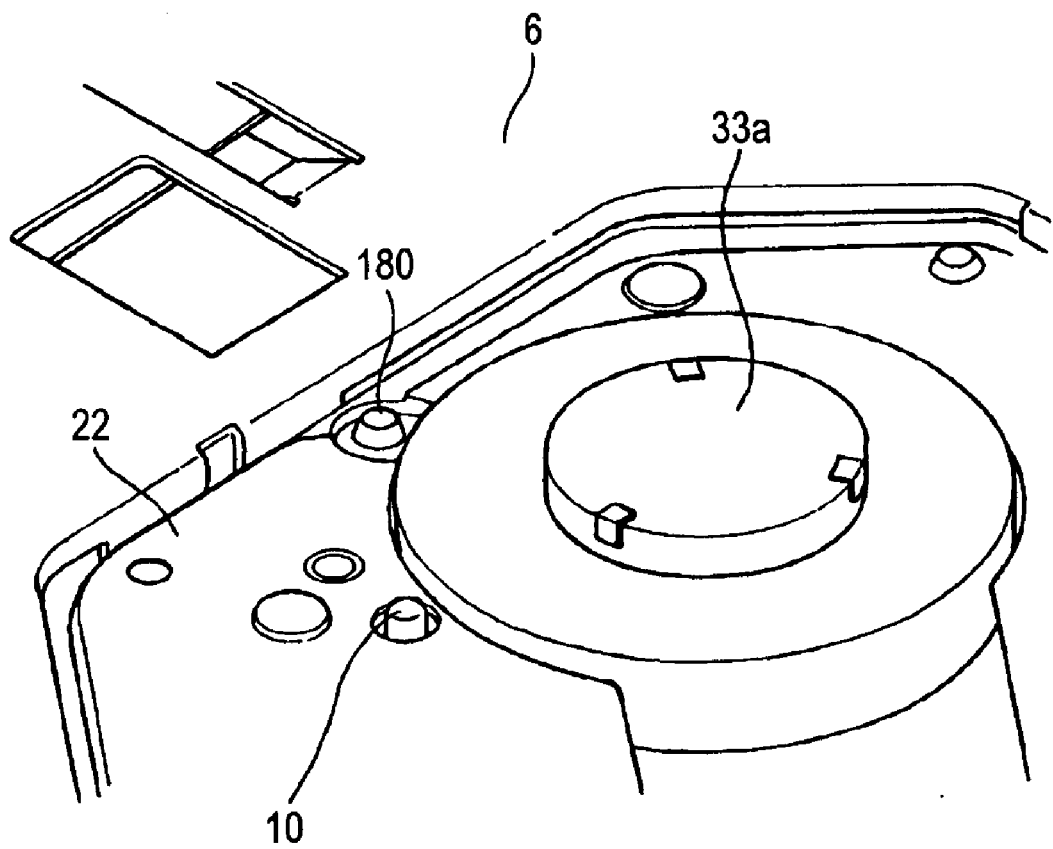
FIG. 48 is a perspective view showing the guide pin and the guide hole in a state in which the base unit is lifted to the recording and reproducing position.

As indicated by alternate long and short dash lines in FIG. 48 and (c) in FIG. 45, when the base unit 22 is lowered to the recording and reproducing position, after the guide wall 185 of the guide hole 181 of the base chassis 27 slides on the second guide section 184 of the flange section 182 and the flange section 182 is guided to be insertable through the guide hole 181, the guide wall 185 is lowered to a position where the guide wall 185 is spaced apart from the flange section 182. In this way, in a state in which the base unit 22 is lowered to the recording and reproducing position, since the guide pin 180 and the guide hole 181 are not in contact with each other, disturbance such as vibration is prevented from being transmitted from the bottom case 4 to the base chassis 27 side via the guide pin 180. Therefore, it is possible to prevent the disturbance from being transmitted to the disk rotation driving mechanism 24 and the optical pickup 25 through guide pin 180 to adversely affect recording and reproduction characteristics.

The guide pin 180 is formed at height not coming into contact with the lower surface of the optical disk 2 driven to rotate by the disk rotation driving mechanism 24. Thus, it is unlikely that the guide pin 180 scratches the information recording surface of the optical disk 2.

When the recording and reproducing operation is finished, in the process for ejecting the optical disk 2, since the base unit 22 is lowered to the chucking release position and the optical disk 2 is pushed up from the turntable 23a by the guide pin 180, the chucking is released. At this point, in the base chassis 27, the guide hole 181 is located in a lower part of the guide pin 180.

In the disk drive device 1 according to the embodiment of the invention, the guide pin 180 also functions as a chucking release pin that releases chucking of the optical disk 2. In the guide pin 180, an upper end thereof is formed in a semispherical shape. The guide pin 180 and the guide hole 181 of the base chassis 27 are formed in association with a non-recording area formed near the center hole 2a of the optical disk 2 mounted on the turntable 23a. Consequently, when the base unit 22 is lowered to the chucking release position for the optical disk 2, the optical disk 2 is pushed up by the upper end of the guide pin 180 and the chucking with the turntable 23a is released. According to such a constitution, since it is unnecessary to use a chucking release pin for releasing the chucking of the optical disk 2 other than the guide pin 180, it is possible to realize a reduction in the number of components and a reduction in weight of the disk drive device 1.

It should be understood by those skilled in the art that various modifications, combinations, sub-combinations, and alterations may occur depending on design requirements and other factors insofar as they are within the scope of the appended claims or the equivalents thereof.

What is claimed is:

1. A disk drive device, comprising:
a device main body having a front surface side, a rear surface side, a first lateral side, and a second lateral side, the device main body including a disk slot for inserting and removing a disk-like recording medium provided on the front surface side thereof;
a disk holding unit that is provided in the device main body and rotatably holds the disk-like recording medium in a direction orthogonal to an inserting and removing direction of the disk-like recording medium;
a main chassis that is fixedly arranged in the device main body and supports the disk holding unit and a base unit provided with an optical pickup for recording an information signal in and/or reproducing the information signal from the disk-like recording medium;
an arm unit rotatably supported on the first or second lateral sides of the device main body in a plane parallel to the disk-like recording medium held by the disk holding unit;
an urging arm that is provided at a tip of the arm unit, has a support section that supports a side of the disk-like recording medium when the disk-like recording medium is inserted, and urges the disk-like recording medium;
a first centering member that is provided on the first lateral side of the device main body and supports the side of the disk-like recording medium when the disk-like recording medium is inserted; and
a second centering member that is provided on the second lateral side of the device main body in the plane parallel to the disk-like recording medium held by the disk holding unit and supports the side of the disk-like recording medium, wherein
the first centering member and the second centering member are regulated in positions with respect to the main chassis to support the side of the disk-like recording medium during an insertion of the disk, the first centering member and the second centering member support the disk-like recording medium in a centering position at three points around the disk holding unit in conjunction with the urging arm, and of the urging arm and the first and second centering members, only the urging arm urges the disk-like recording medium during the insertion of the disk.

2. A disk drive device according to claim 1, wherein the first centering member includes:

an arm section rotatably supported and disposed closer to the device main body front surface side than the disk holding unit; and a support section that is provided at a tip of the arm section and, when the disk-like recording medium is inserted, supports a rear portion of the disk-like recording medium with respect to an inserting direction and draws the disk-like recording medium into the device main body, wherein the first centering member is regulated in a position with respect to the main chassis when the disk-like recording medium is drawn in until a center hole of the disk-like recording medium is located near the disk holding unit.

3. A disk drive device according to claim 1, wherein the support section of the urging arm is arranged in a position to which a small-diameter disk, which is a type of the disk-like recording medium, inserted into the device main body by mistake comes into contact at a time of standby for insertion of the disk-like recording medium and prevents insertion of the small-diameter disk, when a large-diameter disk, which is another type of the disk-like recording medium, is inserted, supports a front portion of the disk-like recording medium with respect to an inserting direction, and urges the disk-like recording medium towards the disk slot.

4. A disk drive device according to claim 1, wherein the arm unit is supported on the second lateral side of the device main body and further toward the rear side surface of the device main body than the disk holding unit and, when the disk-like recording medium is inserted, the support section supports a front portion of the disk-like recording medium with respect to an inserting direction and urges the disk-like recording medium towards the disk slot, and, at during ejection of the disk-like recording medium, the urging arm is rotated to the front surface side of the device main body to eject the disk-like recording medium from the device main body.

5. A disk drive device according to claim 1, further comprising, in the device main body, a deck arm including a deck section in the direction orthogonal to the inserting and removing direction of the disk-like recording medium, wherein on one side in a plane parallel to the disk-like recording medium over an inserting and removing direction of the disk-like recording medium, the deck arm includes a fulcrum section on a side of the deck section facing the rear surface side of the device main body, and includes the urging arm urged to rotate towards the front surface side of the device main body and the support section formed at a tip of the urging arm and supports a front portion side of the disk-like recording medium with respect to an inserting direction, and wherein the support section of the deck arm is arranged in a position to which a small-diameter disk, which is a type of the disk-like recording medium, inserted into the device main body by mistake contacts at a time of standby for insertion of the disk-like recording medium.

6. A disk drive device according to claim 5, comprising:
the first centering member that is rotatably provided on a side of the deck section facing towards the front surface side of the device main body and supports the side of the disk-like recording medium on a rear portion thereof in the inserting direction; and the second centering member that is provided in the direction orthogonal to the inserting and removing direction of the disk-like recording medium and on the second lateral side of the device main body in the plane parallel to the disk-like recording medium and supports the side of the disk-like recording medium, wherein in the deck arm, when the disk-like recording medium is drawn into the device main body, the support section supports, in conjunction with the first centering member and the second centering member, an outer circumference of the disk-like recording medium at three points around the disk holding unit that holds a center of the disk-like recording medium.

7. A disk drive device according to claim 5, further comprising:

a rotating arm that is rotatably provided on the second lateral side of the device main body and is urged to rotate towards the front surface side of the device main body at the time of standby for insertion of the disk-like recording medium, wherein at least one of the rotating arm and the deck arm contact the small-diameter disk inserted from the disk slot at the time of standby for insertion of the disk-like recording medium.

8. A disk drive device according to claim 6, wherein the first centering member is a loading arm that has an arm section formed to be rotatable to the rear surface side of the device main body with a front side of the deck section as a fulcrum and a support section that is provided at a tip of the arm section and supports the side of the disk-like recording medium, the loading arm drawing the disk-like recording medium into the device main body.

9. A disk drive device according to claim 6, comprising:

a base unit that is provided with the disk holding unit and attached with the optical pickup that records the information signal in and/or reproduces the information signal from the disk-like recording medium; and the main chassis that allows the base unit to freely rise and fall, wherein the first centering unit is regulated in a position thereof to support the side of the disk-like recording medium when the disk-like recording medium is drawn into a vicinity of the disk holding unit, and the second centering member is locked to the main chassis to be regulated in a support position for the disk-like recording medium.

10. A disk drive device according to claim 5, wherein, in an urging member that urges to rotate the deck arm, an other end on an opposite side of an end locked to the deck arm moves in a rotating direction of the urging arm as the urging arm is rotated.

11. A disk drive device according to claim 3, wherein the small-diameter disk has a diameter of 8 cm.

12. A disk drive device according to claim 5, wherein the small-diameter disk has a diameter of 8 cm.

13. A disk drive device according to claim 3, wherein the large-diameter disk has a diameter of 12 cm.

14. A disk drive device according to claim 1, wherein the urging arm and the first and second centering members are respectively substantially equally spaced around the disk holding unit.

* * * * *